United States Patent
Beckerle et al.

(10) Patent No.: US 6,311,265 B1
(45) Date of Patent: *Oct. 30, 2001

(54) APPARATUSES AND METHODS FOR PROGRAMMING PARALLEL COMPUTERS

(75) Inventors: Michael J. Beckerle, Needham; James Richard Burns, Brookline; Jerry L. Callen; Jeffrey D. Ives, both of Cambridge; Robert L. Krawitz, Belmont, all of MA (US); Daniel L. Leary, New Ipswich, NH (US); Seven Rosenthal, Cambridge; Edward S. A. Zyzkowski, Newton, both of MA (US)

(73) Assignee: Torrent Systems, Inc., Cambridge, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/627,801

(22) Filed: Mar. 25, 1996

(51) Int. Cl.⁷ .................................................. G06F 9/38
(52) U.S. Cl. ............................................................ 712/203
(58) Field of Search ............................... 395/800.01, 706, 395/683; 712/203; 717/6

(56) References Cited

U.S. PATENT DOCUMENTS 4,298,954  11/1981  Bigelow et al. ...................... 710/53

(List continued on next page.)

OTHER PUBLICATIONS

Sodan, Communications of the ACM, "Yin and Yang in Computer Science", vol. 41, No. 4, pp. 103–111, Apr. 1998.

(List continued on next page.)

Primary Examiner—Eric Coleman
(74) Attorney, Agent, or Firm—Wolf Greenfield & Sacks, P.C.

(57) ABSTRACT

A system provides an environment for parallel programming by providing a plurality of modular parallelizable operators stored in a computer readable memory. Each operator defines operation programming for performing an operation, one or more communication ports, each of which is either an input port for providing the operation programming a data stream of records, or an output port for receiving a data stream of records from the operation programming and an indication for each of the operator's input ports, if any, of a partitioning method to be applied to the data stream supplied to the input port. An interface enables users to define a data flow graph by giving instructions to select a specific one of the operators for inclusion in the graph, or instructions to select a specific data object, which is capable of supplying or receiving a data stream of one or more records, for inclusion in the graph, or instructions to associate a data link with a specific communication port of an operator in the graph, which data link defines a path for the communication of a data stream of one or more records between its associated communications port and either a specific data object or the specific communication port of another specific operator in said graph. The execution of a data flow graph equivalent to that defined by the users is automatically parallelized by causing a separate instance of each such operator, including its associated operation programming, to be run on each of multiple processors, with each instance of a given operator having a corresponding input and output port for each input and output port of the given operator, and by automatically partitioning the data stream supplied to the corresponding inputs of the instances of a given operator as a function of the partitioning method indication for the given operator's corresponding input.

66 Claims, 71 Drawing Sheets

U.S. PATENT DOCUMENTS

| | | | |
|---|---|---|---|
| 4,823,256 | | 4/1989 | Bishop et al. .......................... 714/10 |
| 4,937,777 | * | 6/1990 | Flood .................................. 395/287 |
| 5,237,691 | * | 8/1993 | Robinson ............................ 395/700 |
| 5,355,492 | * | 10/1994 | Frankel ................................ 395/700 |
| 5,381,548 | * | 1/1995 | Matsuo ................................ 395/700 |
| 5,450,313 | * | 9/1995 | Gilbert ................................ 364/133 |
| 5,487,167 | | 1/1996 | Dinallo et al. ........................ 345/30 |
| 5,557,797 | * | 9/1996 | Yano .................................... 395/650 |
| 5,568,614 | | 10/1996 | Mendelson et al. ................. 709/231 |
| 5,721,928 | * | 2/1998 | Umehara ............................. 395/706 |
| 5,903,703 | | 5/1999 | Okada .................................. 386/95 |
| 5,903,730 | | 5/1999 | Asai et al. ...................... 395/200.54 |
| 6,021,457 | | 2/2000 | Archer et al. ........................ 710/260 |

OTHER PUBLICATIONS

Zaki et al, SPAA, "A Localized Algorithm for Parallel Association Mining", pp321–330, 1997.

Morrison, Flow–Based Programming, "A New Approach to Application Development", Chapters 1–29, 1994.

Barclay et al., Sigmod Record, "Loading Databases Using Dataflow Parallelism", vol. 23, No. 4, pp. 72–83, Dec. 1994.

Cummings et al., IEEE, "Checkpoint/Rollback in a Distibuted System Using Coarse–Grained Dataflow", pp. 424–433, 1994.

DeWitt et al., Communications of the ACM, "Parallel Database Systems: The Future of High Performance Database Systems", vol. 35, No. 6, pp. 85–98, Jun. 1992.

DeWitt et al., Computer Sciences Technical Report #1079, "Parallel Database Systems: The Future of High Performance Database Systems", pp. 1–27, Feb. 1992.

Gray et al., Morgan Kaufmann Publishers, "Transaction Processing: Concepts and Techniques", 1993. pp. 211–217.

Lau et al., IEEE, Propagating Buffer: A New Approach to Deadlock Freedom in Store–and Forward Networks, pp. 804–807, 1991.

Lucco et al., ACM, "Parallel Programming With Coordination Structures", pp. 197–208, 1990.

DeWitt et al., IEEE Transactions on Knowledge and Data Engineering,. "The Gamma Database Machine Project", vol. 2, No. 1, pp. 44–63, Mar. 1990.

DeWitt et al., The Gamma Database Machine Project,. "The Gamma Database Machine Project", pp. 609–626.

Li et al., ACM, "Real–Time, Concurrent Checkpoint for Parallel Programs", pp. 79–88, 1990.

Morison, R., The Third Conference on Hypercube Concurrent Computers and Applications, ACM press, Interactive performance display and debugging using the nCUBE real–time graphics system, , vol. 1, pp. 760–765, Jan. 1988.

* cited by examiner

```
int APT_ORCHESTRATE_main(){
264
     ┌#include <iostream.h>
266 ┤ #include <APT_framework/orchestrate.h>
     └#include "userHeaderFile.h"
    //Declare data sets
268A APT_DataSet customerDS(APT_DataSet::Oracle, "customerTable,
       APT_DataSet::Input);
268B APT_Dataset importOutDS ;
268B APT_DataSet filter1OutDS ;
268B APT_DataSet filter2OutDS;
268B APT_DataSet funnelOutDS;
268B APT_DataSet RemoveDupsOutDS;
268C APT_DataSet customerDS("customerDS, APT_DataSet::Output);

//Declare Operators
270A APT_ImportOperator APT_ImportOperator_1(filter1InputSchema,
       "customerFile");
270B Filter1Operator Filter1Operator_1;
270C Filter2Operator Filter2Operator_1;
270D APT_FunnelOperator APT_FunnelOperator_1;
270E RemoveDuplicatesOperator RemoveDuplicatesOperator_1;
270F APT_BasicStatisticsOperator APT_BasicStatisticsOperator_1(
       "APT_BasicStatisticsResults_1");

//Tie data sets to operators
272  APT_ImportOperator_1.attachOutput(importoutDS);
272  Filter1Operator_1.attachInput(importOutDS);
272  Filter1Operator_1.attachOutput(filter1OutDS);
272  Filter2Operator_1.attachInput(customerTableDS);
272  Filter2Operator_1.attachOutput(filter2OutDS);
272A APT_FunnelOperator_1.attachInput(filter1OutDS, 0);
272B APT_FunnelOperator_1.attachInput(filter2OutDS, 1);
272  APT_FunnelOperator_1.attachOutput(funnelOutDS);
272  RemoveDuplicatesoperator_1.attachInput(funnelOutDS);
272  RemoveDuplicatesOperator_1.attachOutput(RemoveDupsOutDS);
272  APT_ BasicStatisticsOperator_1.attachInput(RemoveDupsOutDS);
272  APT_BasicStatisticsOperator_1.attachOutput(customerDS);
     //define adapters
279  ...
```

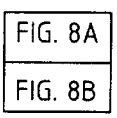

*FIG. 8A*

```
        //attach adapters
280 ——Filter1Operator_1.setInput Adapter(Filter1Adapter,0);
284 ——Filter2Operator_1.setInputAdapter(Filter2Adapter,0);
286 ——RemoveDuplicatesOperator_1.setInputAdapter(removeDupsAdapter,0);

//Tie operators to step and run step
208 —— APT_Step step;
210 —— step.attachOperator(&APT_ImportOperator_1);
210 —— step.attachOperator(&Filter1Operator_1);
210 —— step.attachOperator(&Filter2Operator_1);
210 —— step.attachOperator(&APT_FunnelOperator_1);
210 —— step.attachOperator(&RemoveDuplicatesOperator_1);
210 —— step.attachOperator(&APT_BasicStatisticsOperator);

212 —— APT_Status status = step.run();
288 —— return (int) status;

```
APT_ORCHESTRATE_main(argc, argv) {
    ...
    ┌ APT_DataSet InputDS("customerFile", APT_DataSet::Input);
    │ APT_DataSet OutputDS("selectedCustomerFile",
    │ APT_DataSet::Output);
    │ if(argv[1]=="Operator1") Operator1 Operator;  ─290A
290┤ if(argv[1]=="Operator2") Operator2 Operator; ─290B
    │ Operator.attachInput(InputDS);
    │ Operator.attachOutput(OutputDS);
    │ APT_Step step;
    └ step.attachOperator(Operator);
291 ─step.run();
    return;
}
```

FIG. 11

```
APT_ORCHESTRATE_main(argc, argv) {
    ...
296 ─for(n=1; n=<(argc); n++){
    ┌ APT_DataSet tempInputDS(argv[n],
    │ APT_DataSet::Input); ─292A
    │ APT_DataSet tempOutputDS(strcat(argv[n],"Output")
    │ , APT_DataSet::Output); ─292B
292┤ UserOperator UserOperator_1;
    │ UserOperator_1.attachInput(tempInputDS);
    │ UserOperator_1.attachOutput(tempOutputDS);
    │ APT_Step step1;
    └ step.attachOperator(UserOperator_1);
294 ─step1.run();
    }
    return;
}
```

FIG. 12

```
APT_ORCHESTRATE_main(argc, argv){
    ...
300—define step1
    if (argv[1]==value1){
298—   step1.run();
                      —302
    };
    if (argv[1]==value2){
304—   define step2—306
       step2.run();—308
    };
}
```

FIG. 13

```
APT_ORCHESTRATE_main(){
    ...
    subRoutine1()
    subRoutine2()
    ...
};
310—subRoutine1(){
    define step2
    step1.run();
};
312—subRoutine2(){
    define step2
    step2.run();
};
```

FIG. 14

—Main() —178

—...
—if command line arguments indicate program has been called to be a section leader process —630
    —call sectionLeader() —631
    —return —633

—...
—initialize —453
—call APT_ORCHESTRATE_main(), passing command line args to it —454
—finish up and return —456

FIG. 34

—APT_Step.run() —204

—if current step object has not been previously checked, call APT_Step.check() —458
    —if step.check returns with an error, return with that error message —620
    —if RUNTYPE environmental variable is PARALLEL call parallelRun() —621
    —else call simulatedParallelRun() —625
    —return —629

FIG. 35

—APT_step.check() —202

—call APICheck() —466
    —if APICheck() returns with error message, return with error message —552
    —call composer() —554
    —call APICheck() to re-check flow graph with any repartitioning operators which may have been inserted by composer() —612
    —if APICheck() returns with error message, return with error message —614
    —else call createOutputFiles() to create output files for each data set in score —616
    —return —618

FIG. 36

-APICheck()~460
- decompose each composite operator in step by placing its sub-graph in step's graph, connecting any data links connected to ports of composite operator to corresponding ports of the sub-graph operators, and then deleting composite operator from the step ~469
- for each operator in the graph~470
    - if there is loop or if more than a single data set arc between It and any other operator in the graph, without regard to direction of data flow, place an error indication on check list~472
    - if operator is to be parallelized and it has a plurality of input ports receiving data sets from one or more other operators, insert a buffer operator between each such input port and each such other operator~474
- for each operator input port in the graph~492
    - for each field defined in the schema associated with that input port~494
        - if the schema of the data set connected to the port has a field with the name of that input schema field, taking into account any field adapters which might correspond to that schema field~496
            - map that data set schema field to the input schema field~498
            - if the type of the data set field cannot be converted into the type of the input field, given any conversion specified in an adapter, add an error to check list~500
            - if the data set field data type can be converted into the type of the input field, but with a loss of accuracy or by conversion of string to number or number to string, add a warning to the check list, unless that conversion is performed in an adapter and the adapter specified no warnings~502
        - else indicate an error in checklist~504
    - for each output port in the graph~506
        - if output port is connected to a persistent data set having a pre-defined schema definition, check and map defined fields of output schema with defined fields of data set schema~508
        - if the output is linked to the input of another operator, select a partitioner for the putRecord() of each operator's output cursor based on down stream operator's partitioner~510
- if there are any entries in check list~544
    - display check list~546
    - if check list contains any error, return with an error message~548
- else, return~550

*FIG. 38*

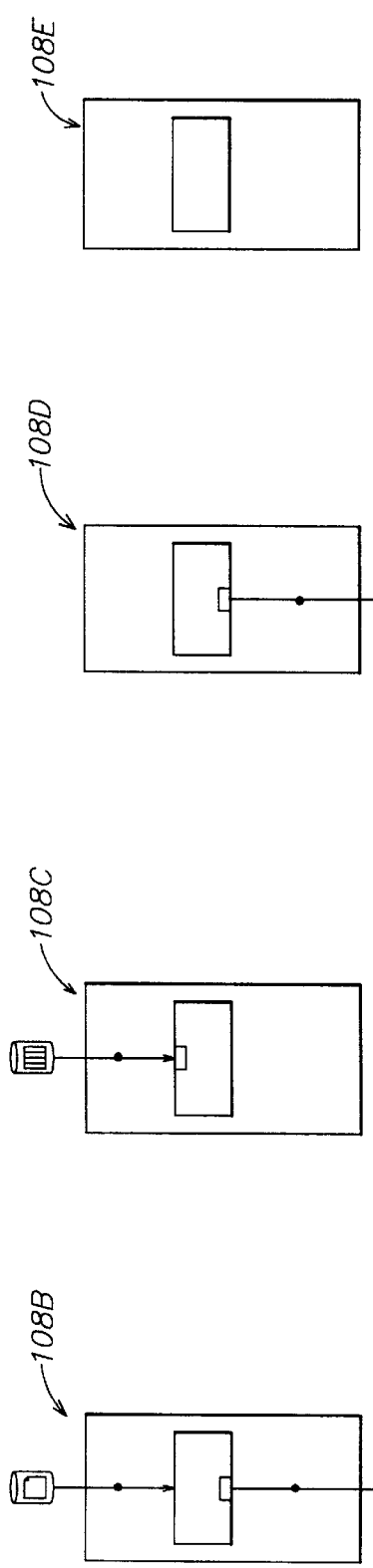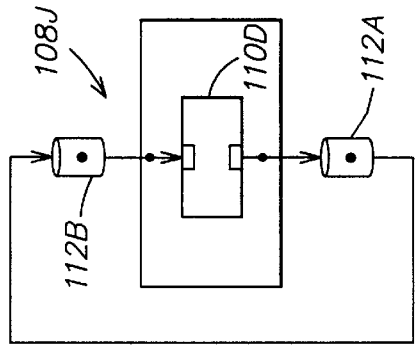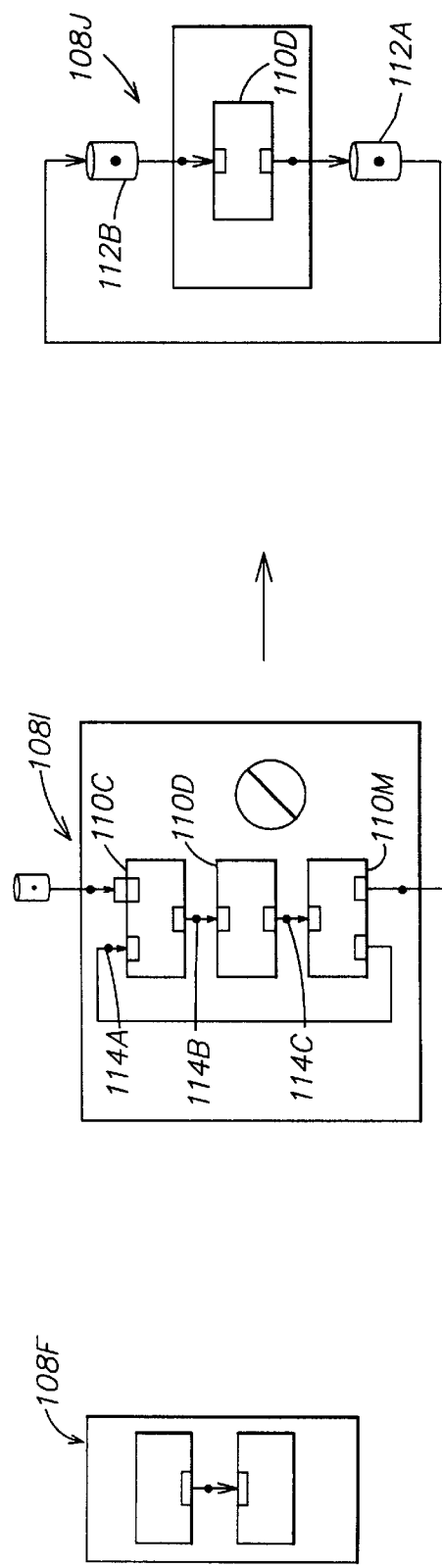

```
...
inputDS = "DataSetA";
outputDS = "DataSetB";
for(x=1; x<=3; x++){
    lastInputD = inputDS;
    inputDS = outputDS;
    outputDS = lastInputDS;
    APT_DataSet inputData (inputDS,
    APT_DataSet::Input);
    APT_DataSet outputData (outputDS,
    APT_DataSet::Output);

//Declare Operator
    APT_SelectOperator selectOp;

//Tie data sets to operators
    selectOp.attachInput (&inputData);
    selectOp.attachOutput (&outputData);
...

//Tie operators to step and run step
    APT_Step loopStep;
    loopStep.attachOperator (&selectOp);

APT_Status status = LoopStep.run();

APT_BufferOperator.runLocally —2161
— ...
480 — loop
482 — if recordsInQueue and if ableToDoOutput then
484 — dequeue a record and call
       nonBlockingPutRecord
486 — else
487 — call nonBlockingGetRecord
488 — if got record put it in queue
490 — if got endOfFile, 490A
```
{
while(recordsInQueue)
    if(ableToDoOutput)
        nonBlockingPutRecord
exit
}
```
— ...

FIG. 43

—composer()~ 462
    —initialize score data structure~ 558
    —list in score all operators attached to step~ 560
    —list in score all data sets attached to listed operators indicating ports they are connected to~562
    —list in score all nodes to be used by step, determined by environmental variables, number of nodes listed in config file, and whether or not step includes parallel operators~ 564
    —list in score all player processes, creating one separate player process for each sequential operator, and P player processes for each parallel operator~ 566
    —list in score for each operator, the one or more player processes to execute it~ 568
    —list in score for each node the player processes to run on it~ 570
    —set or reset flag for each operator produced data set as function of whether it has "same" partitioning method associated with it~ 572
    —For each persistent data set in step~ 574
        —if data set is constructed with a query string to an RDBMS table in table's RDBMS language~ 576
            —if operator receiving data set has more than one player~ 582
                —if the operator's partitioning method for the data set is other than "entire"~ 584
                    —insert a sequential repartition operator between data set and its input on the operator~ 586
                    —place the query string in the score in association with the data set~ 588
        —else if data set comprises an RDBMS table~ 578
            —if data set is inputing to operator~ 592
                —log onto database~ 594
                —lock table for read only access~ 596
                —find table's range of records~ 598
                —place a query string, written in the table's RDBMS language, in the score in association with the data set, with a predicate for defining a sub-range for requested records~ 600
                —divide table's total ranges of records into a number of sub-ranges corresponding to number of table's consuming input ports~602
                —if the given operator receiving data set has more than one player~ 603
                    —if the input port receiving data set requires repartitioning, insert a parallel repartitioning operator between the given port and data set~ 605

FIG. 52A (1)

| FIG. 52A(1) |
| FIG. 52A(2) |

—for each player having an input port receiving data from the data set~ *604*
    —place in the score, for the player's port, two values defining the specific sub-range of records from the query to be supplied to it~ *606*

*FIG. 52A(2)*

−it data set is output from an Operator~ *595*
    −place an RDBMS write string, written in the table's RDBMS language, in the score in association with the data set~ *608*
  −else if data set is a file persistent data set connected to a given input port and repartition is needed, connect a repartitioning operator between the data set and port~ *580*
−return~ *610*

FIG. 52B

−parallel run()~ *623*
  −serializes score~ *622*
  −call UNIX RSH to create duplicate of entire program executing on each node which has any players on it in score, with command line argument specifying that node should execute executable as a section leader, giving the conductor's host name and the conductor port address each section leader is to use for communications with the conductor~ *624*
  −message each section leader telling it its node number~ *636*
  −message each section leader to use same default directory as the conductor~ *640*
  −message each section leader to begin player execution~ *642*
  −broadcast scores to all section leaders over TCP/IP link~ *650*
  −message each player to reload the score~ *660*
  −message each player to set up the communication channels corresponding to virtual data links with corresponding supplier or consumer player process~ *664*
  −broadcast message to all players for all players to start executing their associated runLocally()s~ *670*
  −broadcast a sync message to all players~ *696*
  −...(step is run)...~ *698*
  −once receives a number of return sync messages equal to total number of players, message each section leader to kill all its players and then itself~ *708*
  −closes all connections to section leaders~ *710*
  −return~ *711*

FIG. 54

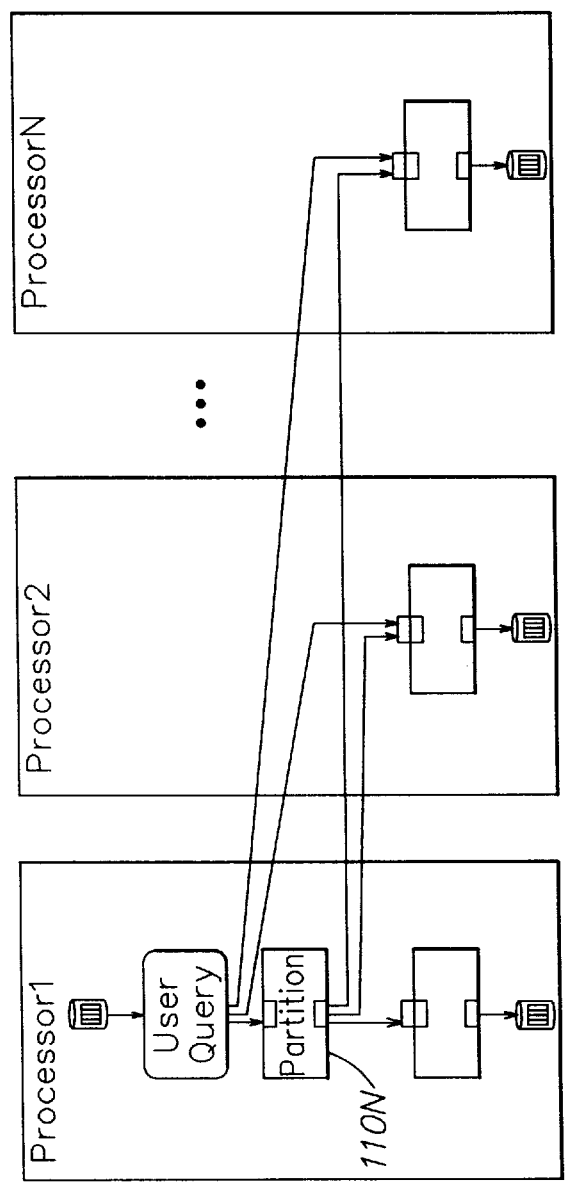
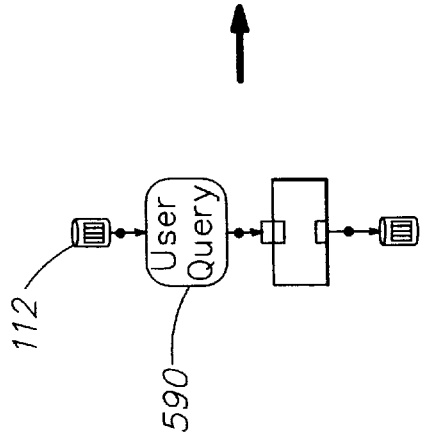
FIG. 53 sectionLeader()~ 635
    —establish communication link with conductor~ 632
    —upon receiving message from conductor telling it which node it is, section leader places this node number in its memory space~ 638
    —upon receiving instruction from conductor to begin player execution, for X = number of players associated with node in score~ 644
        —set playerInNode = X~ 641
        —set up socket pairs used for stdout/stderr of player and for control socket between player and section leader~ 654
        —fork~ 643
        —if child of fork~ 645
            —call player()~ 647
            —return()~ 649
    —upon receiving score broadcast from conductor over TCP/IP link, section leader writes score to a file~ 652
    —...(section leader relays message from conductor to players)...~ 659
    —section responds to message from conductor to kill all players and itsef by issuing a UNIX kill command for each of players and then for itself~692

FIG. 55

—player()~ 648
    —complete control connection with section leader~ 656
    —in response to conductor message, reconstitutes score by reading it into memory from file and unserializing it~662
    —in response to each conductor message to form a TCP/IP connection with another player, perform steps necessary to make each such connection~ 666
    —in response to a conductor message for all players to execute themselves find corresponding operator in score~672
    —for each persistent data set file, if any, associated in the score with an input or output port of the player's operator, open corresponding files for reading or writing, respectively~ 674
    —for each RDBMS statement string, if any, associated in the score with a port of the player's operator~ 676
        —issue a command to connect to the RDBMS associated with the statement by issuing a command to the RDBMS's API on the player's node, unless such connection has already been established~678
        —call RDBMS parser and send it the statement string~ 680
        —receive cursor handle returned by RDBMS~ 682
        —use cursor handle to send RDBMS values for any bind variables contained in the statement string~ 684
        —send execute command to RDBMS~ 686
—call player's operator's runLocally()~ 688
—release any read-only lock which may have been created for RDBMS tables in association with the player~ 694
—close any files opened by the player~ 704
—respond to conductor's request for sync message~ 706
—return~ 707

FIG. 56

```
                                                  ┌─216F
     ─SubProcessOperatorrunLocally
730 ──── ─establish stdin, stdout, and stderr socket pairs for fork
732 ──── ─do first fork
734 ──── ─if parent of fork
                 ─call InputForkCode()
738 ──── ─else if child of fork
         740 ──── ─fork
             742 ──── ─if parent of fork
                          ─call outputForkCode()
             744 ──── ─else if child of fork
                          ─call subProcForkCode()
         ─return ─inputFork Code()─736
754 ──── ─shut down output interface connection for process
756 ──── ─connect a pipe to the stdin of its child
760 ──── ─call runSource()
763 ──── ─return ┌─746
     ─subProcForkCode()
764 ──── ─shut down input and output interfaces for process
766 ──── ─connect stdin to the output of the runSource process
768 ──── ─connect stdout to the input pipe of the runSink
         process
772 ──── ─execute command line
776 ──── ─exit()

─outputForkCode()─748
778 ──── ─shut down input interface for process
780 ──── ─connect input pipe to the stdout of the subprocess
782 ──── ─call runSink()
784 ──── ─return

• • •
     ─runSource()─428

• • •
     ─runSink()─430

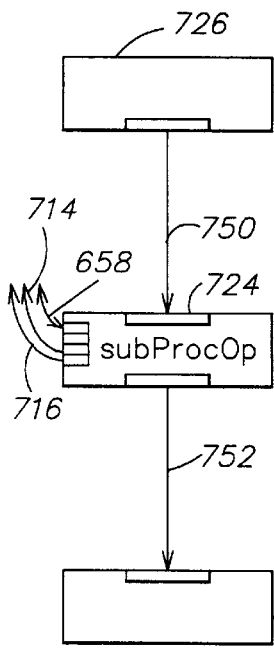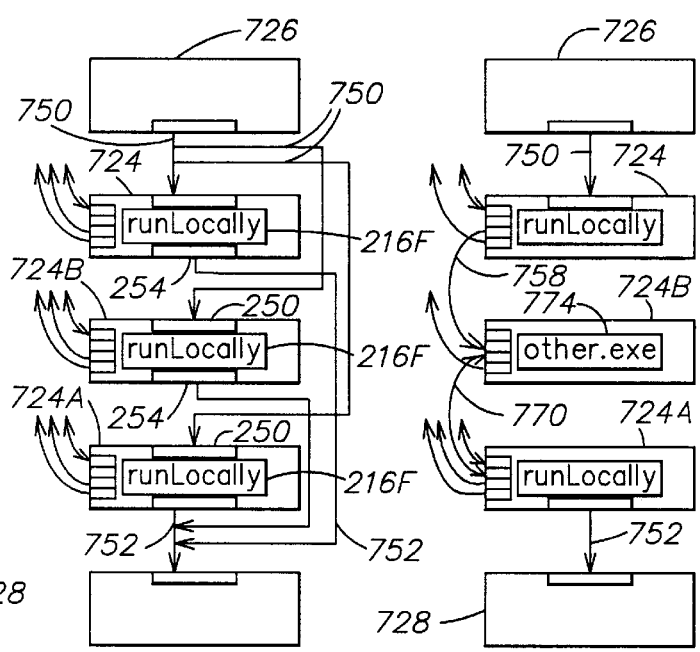
FIG. 61A   FIG. 61B   FIG. 61C
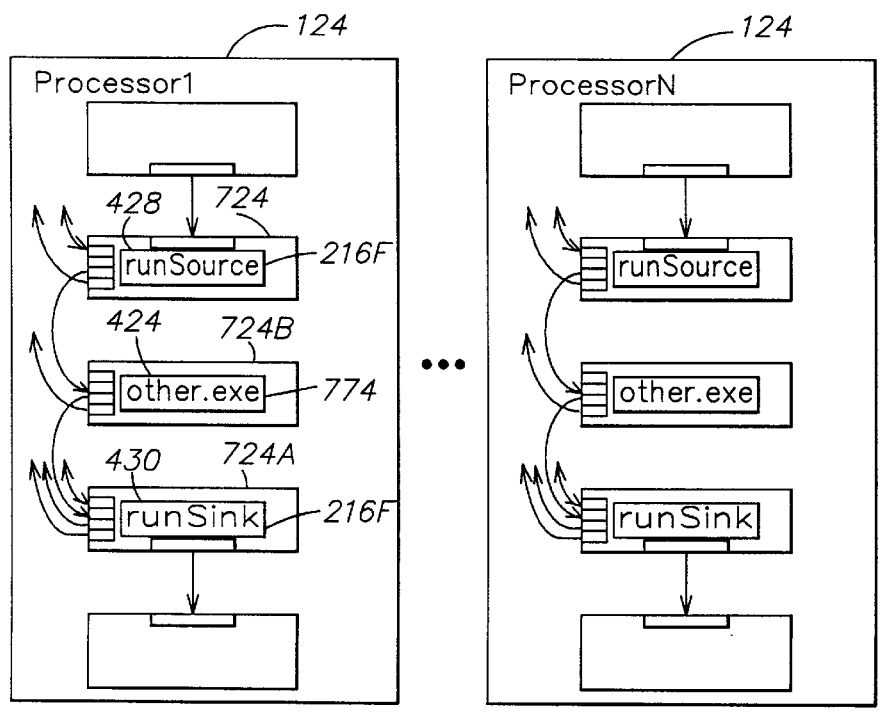
FIG. 61D

—simulatedParallelRun()~ 627
    —if RUNTYPE is not TWO_PROCESS_NO_SERIALIZE, then serialize score to disk~ 900
    —for each player listed in score, in data flow order~ 902
        —if RUNTYPE is ONE_PROCESS then~ 904
            —unserialize score from disk back into memory~ 906
            —executeSequentialPlayer(reloadedScore, playerID)~ 908
        —else~ 910
            —fork~ 912
            —if parent of fork then wait for child to complete~ 914
            —else~ 916
                —if RUNTYPE is TWO_PROCESS then unserialize score from disk back into memory~ 918
                —else use score still in memory from call to composer()~920
                —executeSequentialPlayer(score,playerID)~ 921
                —exit~ 922
    —return~ 923

FIG 62

—executeSequentialPlayer(score,playerID)~ 924
  —for each output dataset associated with the identified player in the score~ 926
    —if it is a RDBMS data set~ 928
      —connect the I/O manager to the RDBMS for I/O by the player~ 930
      —interface with appropriate RDBMS API using the data set's RDBMS command string, and the player's bind variables, if any, identified in the score~ 932
    —if it is a file data set~ 934
      —connect the I/O manager to data set for I/O by player~ 936
    —if it is a virtual data set~ 938
      —create separate disk file to store the player's output for each input port that consumes a part of the data set produced by the player~ 940
      —connect the I/O manager to files for I/O by the player~ 942
  —for each input dataset associated with the player in the score~ 944
    —if it is a RDBMS data set~ 946
      —connect the I/O manager to the RDBMS for I/O by the player~ 948
      —interface with appropriate RDBMS API using the data set's RDBMS command string identified in the score~ 950
    —if it is a file data set~ 952
      —connect the I/O manager to data set for I/O by player~ 954
    —if is is a virtual data set~ 956
      —connect the I/O manager to the disk files corresponding to the player's partition of the input data set which have been created by previously executed players~ 958
—call runLocally() of the operator associated with the player in the score~ 960
—delete all buffer disk files read by the runLocally~ 962
—return~ 964

*FIG. 63*

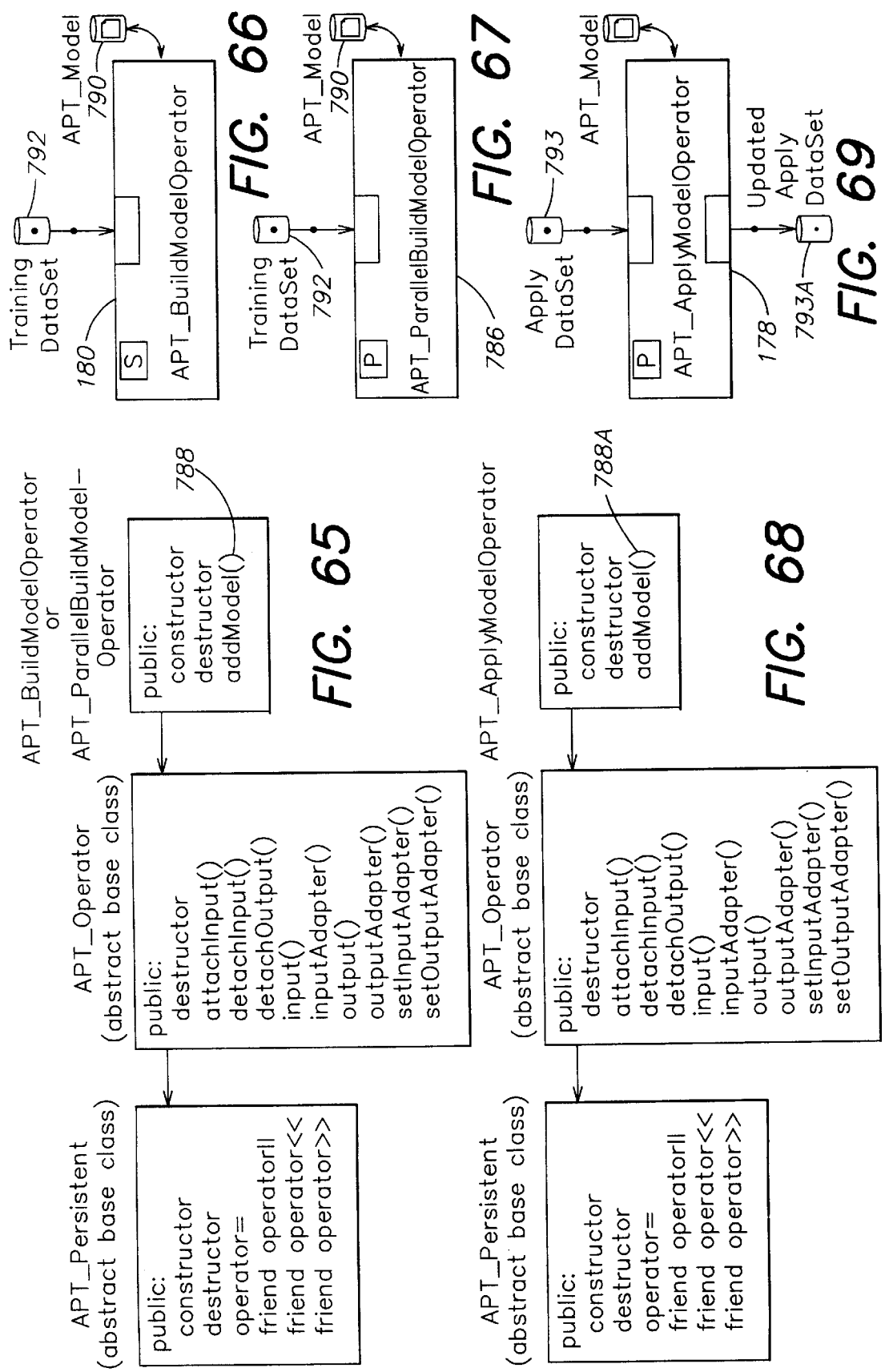

```
GuidanceFile          802A
  configuration config1{            804
    -ModelType: NeuralNetwork
    -ModelParameters
    -...
  }                   802B
  configuration config2 {
    -ModelType: NeuralNetwork
    -ModelParameters
    -...
  }                   802C
  configuration config3 {
    -ModelType: HybridTree
    -ModelParameters
    -...
  }                   802D
  configuration config4 {
    -ModelType: KDTree
    -ModelParameters
    -...
  }
  ...                 802E
  configuration configN {
    -ModelType: KohonenNetwork
    -ModelParameters
    -...
  }
  ...
```

FIG. 72

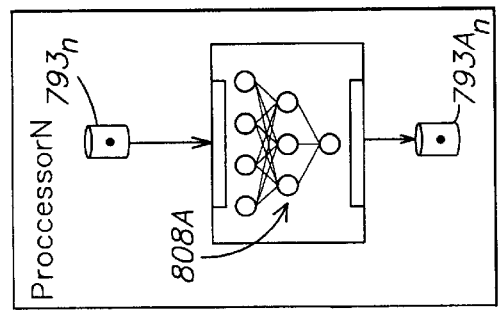
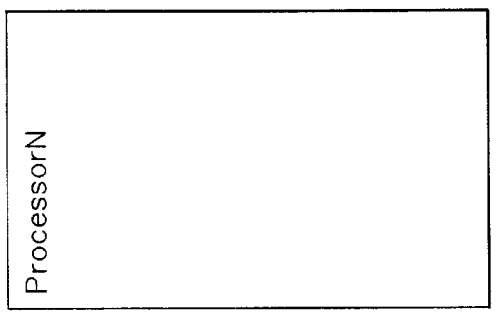
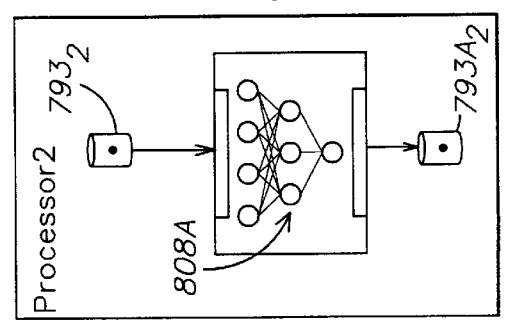
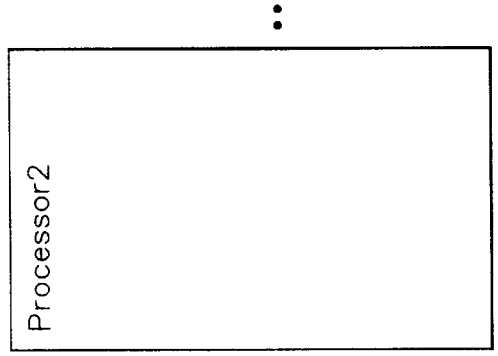
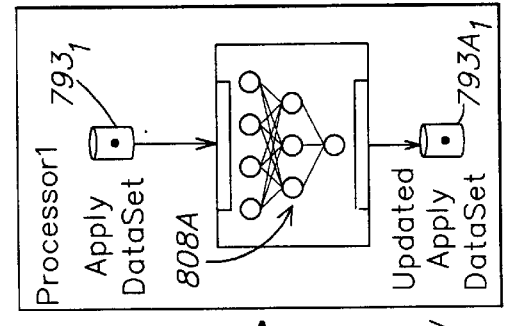
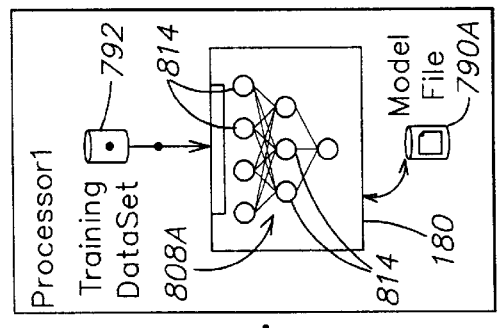
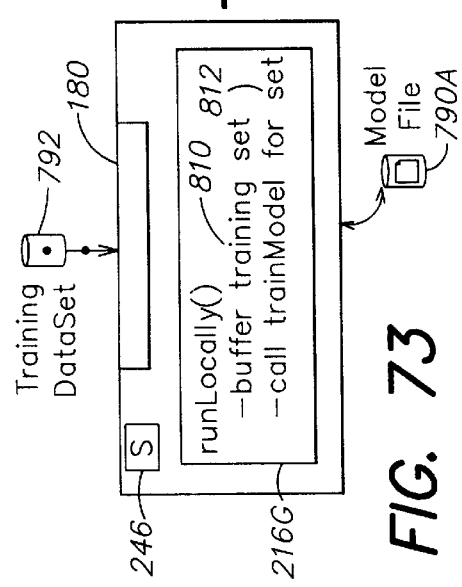
FIG. 73
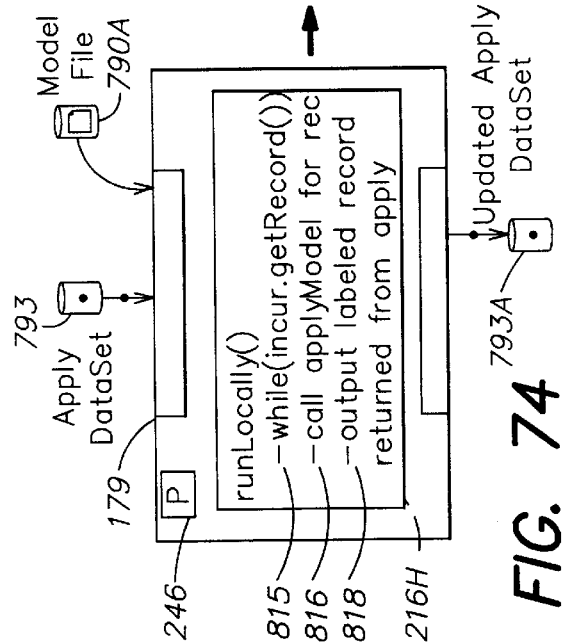
FIG. 74

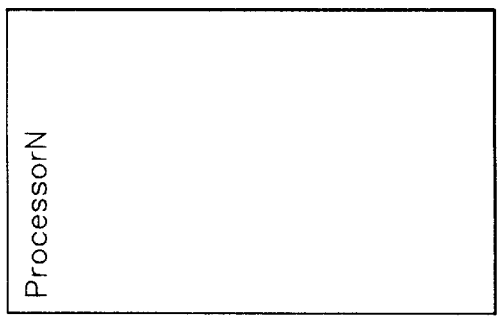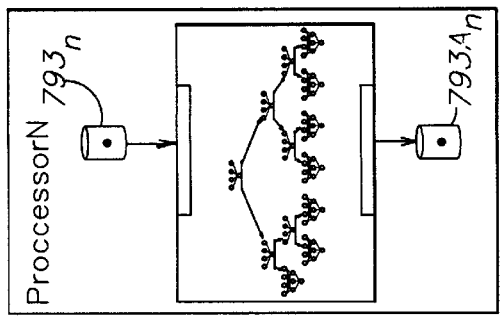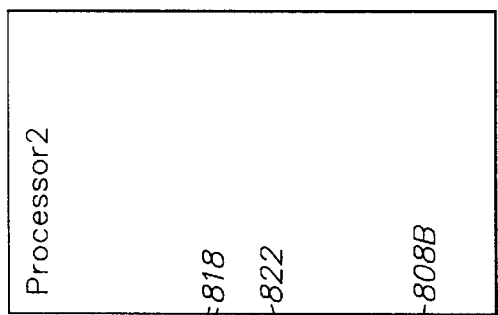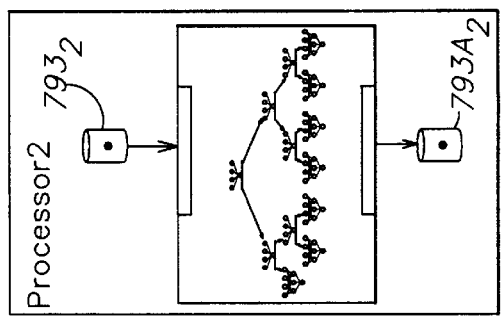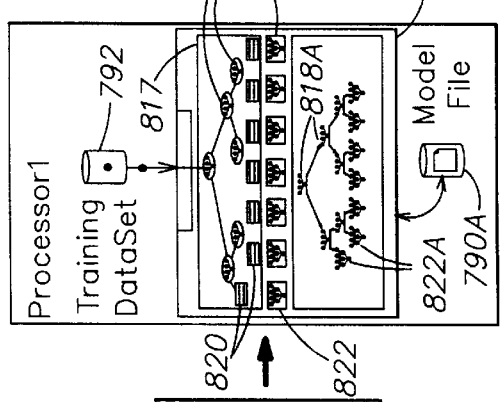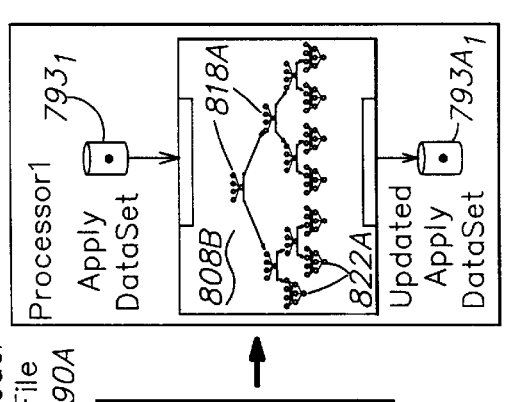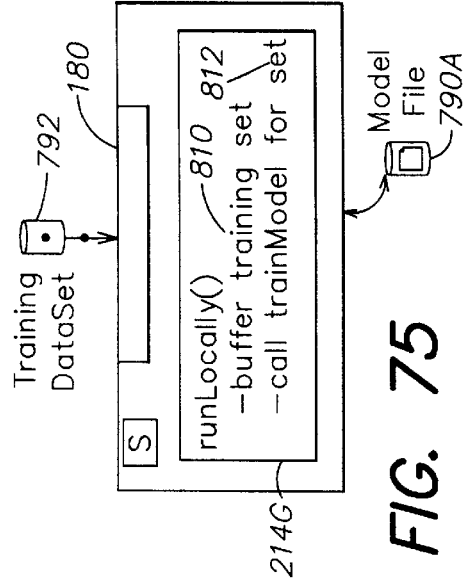
FIG. 75
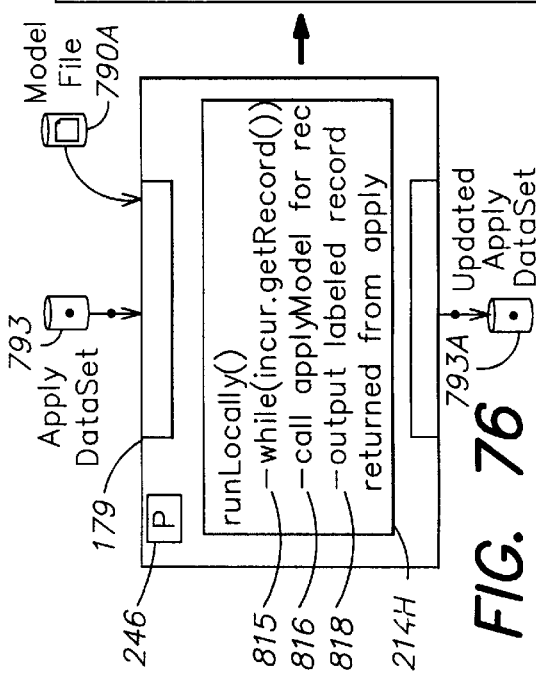
FIG. 76

—TrainAndLabelOperator.runLocally() ⟶832
834 —reads in the entire training set and write to a disk buffer
836 —call neural tree network training function associated with APT_Model object
838 —read each record out of the tree nodes, label it with a a field identifying its leaf node, and call putRecord for it
840 —save tree representation to file
850 —return

FIG. 78

—TrainNetletsOperator.runLocally() ⟶852
854 —while(getRecord)
856 —if current record has new leaf node number, create a new netlet buffer for that node leaf node
858 —pass current record to netlet buffer corresponding to its leaf number
860 —for each netlet buffer
862 —calls neural net train associated with APT_Model object for the buffer
864 —call putRecord to output data structure representing neural net and the weights of its nodes
866 —return

FIG. 79

—AssembleOperator.runLocally() ⟶868
870 —read tree representation from file and place into APT_Model object's model
872 —while(getRecord)
874 —connect netlet represented by current record to APT_Model object's model in correct position relative to tree
876 —write APT_Model object to disk
878 —return

FIG. 80

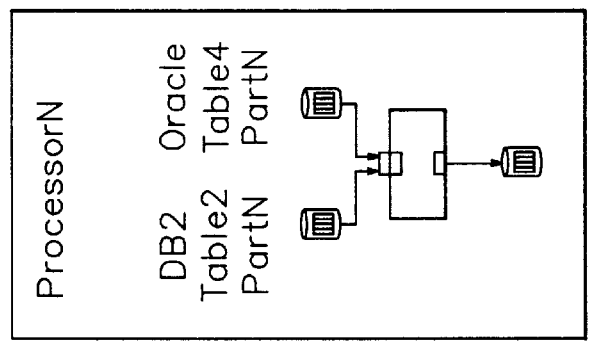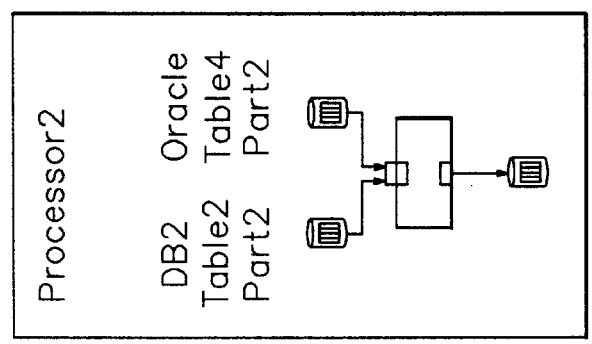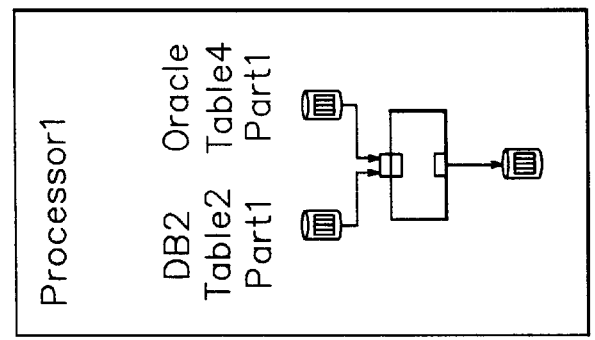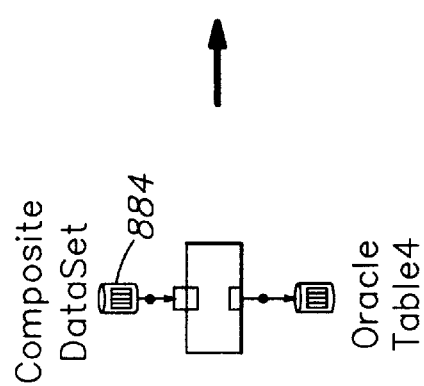
FIG. 82

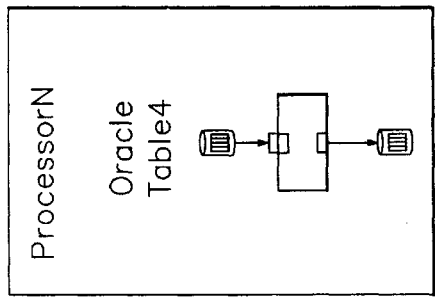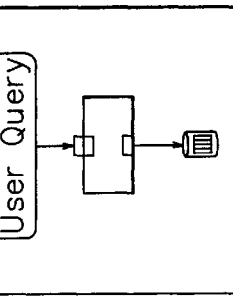
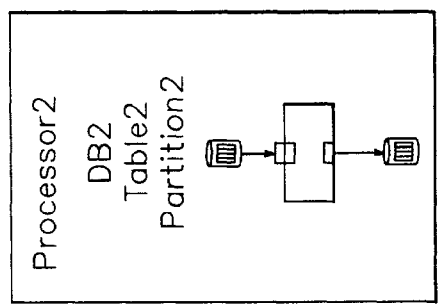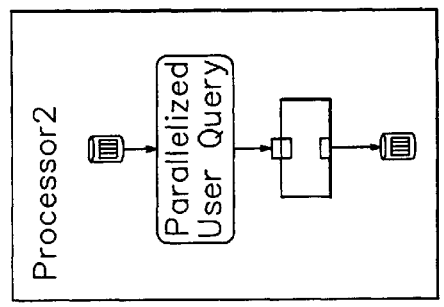
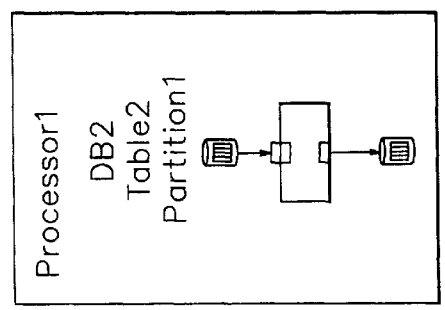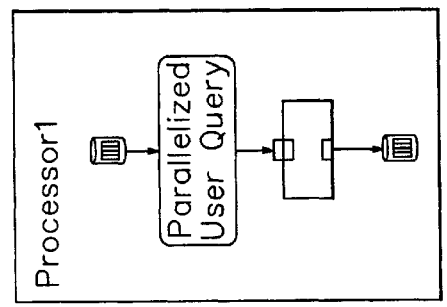
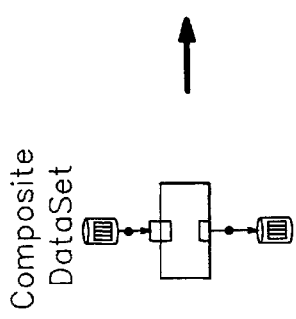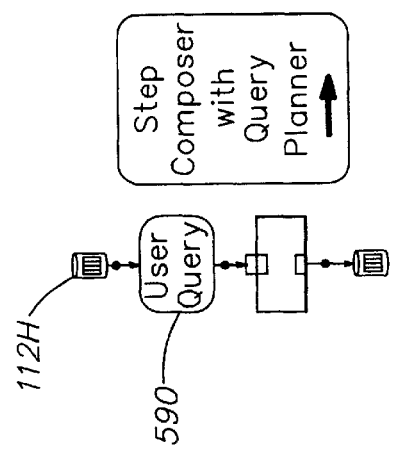
FIG. 83
FIG. 84

APPARATUSES AND METHODS FOR PROGRAMMING PARALLEL COMPUTERS

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The present invention relates to apparatuses and methods for programming parallel computers.

BACKGROUND OF THE INVENTION

Despite the rapid increase in the power of individual computer processors, there are many present and potential applications which could benefit from much greater computing power than can be provided by any individual present or foreseeable processor. The major approach to such greater computing power is to use parallel computers, that is, computers having more than one processor. Many different types of parallel computers have been designed, ranging from Symmetric Multi-Processing systems, in which each of multiple processors and some cache memory share main memory and all of the computer's other resources, to so-called shared-nothing systems, where each processor has its own separate, often relatively large, main memory, often has its own mass storage device, and is connected to other processors only by a computer network. The number of processors in current parallel computers vary from two to tens of thousands.

Parallel computers can provide a huge amount of raw computational power, as measured by all of the instructions per second which their multiple processors can execute. The major problem restricting the use of parallel computing has been the difficulty in designing programming techniques that can efficiently and reliably use the computational power of parallel computers to perform useful tasks.

This problem arises for multiple reasons. First, most useful tasks which one might want to accomplish through a parallel computer require that processes be distributed to the various processors, or nodes, of the computer and that those processes then communicate with each other. This requires that the code for a process be made available to the node that it is to run on, that a command be given to run that process on that node, that the process determine the nodes on which all other processes it is to talk to are running on, and then that it establish communication links with those other processes. If a given individual task is to be parallelized, a decision has to be made as to which portion of the data to be processed by that task should be routed to each of the processes that is executing it. In addition there are many other details that have to be attended to for a task of any reasonable complexity to be programmed to run on multiple processors. Thus, it has traditionally been a very complex task to write programs for parallel computers.

Not only is it difficult to write programs for parallel computers, but it can also be extremely difficult to make such programs work properly. This is because the execution of a parallel program, instead of involving only one process, as do most programs, involves many different processes, each of which might run at differing rates and have differing behaviors each time the program is executed. This means that there are all sorts of synchronization problems which can result between processes; it means that execution is much more complex and, thus, more difficult to fully understand; and it means that finding errors in parallel programs, that is, debugging them, can be much more complex.

Over the years there have been many attempts to deal with the problem of programming parallel computers. One approach has been to design parallel programming languages having constructs designed to facilitate the description of all the complexities necessary for parallelization. But even with such languages, the complexity of parallel programming remains considerable. Another approach has been to have parallel compilers which take code which could run in a single process and automatically parallelize it to run on multiple processors. While such compilers do a very good job of removing the complexity of parallelization from the programmer, they usually make very inefficient use of a parallel computer. This is because such compiler's parallelization mechanism are very general, and, thus, they are often ill suited to provide efficient parallelization for a particular piece of code.

Parallel relational data base management systems (herein "RDBMS"s for short) use another approach to dealing with the complexity of parallel programming. Such systems enable a user to issue a statement in a data base query language, such as Structured Query Language, or SQL. The system then parses this statement and automatically derives from it a corresponding data flow graph which is executed in a parallel manner. The data flow graph is comprised of a sequence of one or more operators, each of which has an associated subroutine, some of which are parallelizable. The graph connects together the operators of the graph with data flow links through which records from the data base are processed. The RDBMSs automatically parallelize the graph, causing a separate instance of individual parallelizable operators in the graph to be run on each of a plurality of nodes. Different partitions of the data base table can be fed through the data links to different instances of the same operator, defining a multi-branched tree. Such RDBMS systems make good use of parallelism, but their capabilities are limited to reading from and writing to parallel data bases in response to statements in a RDBMS language. Generality is thereby restricted.

SUMMARY OF THE INVENTION

It is an object of the present invention to provide apparatuses and methods for more easily programming parallel computers to operate in a relatively efficient manner.

DESCRIPTION OF THE DRAWINGS

These and other aspects of the present invention will become more evident upon reading the following description of the preferred embodiment in conjunction with the accompanying drawings, which are discussed in the specifications which follows.

FIGS. 8A and 8B illustrate the source code of an APT_ORCHESTRATE_main( ) function which defines the graph shown in FIGS. 2A and 2B;

FIGS. 11–14 contain source code, or a mixture of source and pseudo-code, representing some of the many ways in which graphs can be defined and run with a user-defined APT_ORCHESTRATE_main( ) function;

FIG. 34 is a highly simplified pseudo-code representation of the main( ) function which gets linked into the executable file of a user written program from the framework library, as shown in FIG. 4;

FIG. 35 is a highly simplified pseudo-code representation of the APT_Step.run( ) function, which is part of the APT_Step object in the framework library of FIG. 4 and which is called from a user written APT_ORCHESTRATE_main( ) function to cause a graph to be executed;

FIG. 36 is a highly simplified pseudo-code representation of the APT_Step.check( ) function, which is part of the APT_Step object in the framework library of FIG. 4 and which can be called by a user written APT_ORCHESTRATE_main( ) or by APT_Step.run( ) to check the validity of, and to compose a score for, a graph;

FIG. 38 is a highly simplified pseudo-code representation of APICheck( ), a function for checking a data flow graph for errors or for potential problems which deserve warnings;

FIGS. 40A–40K illustrate some of the types of data flow graphs which are allowed or disallowed by APICheck( ), with FIGS. 40A–G illustrating allowed graphs, and with FIGS. 40H and J illustrating disallowed graphs, the respective functions of which can be accomplished by the combination of data flow graphs and encompassing program structures illustrated in FIGS. 40I and 40K;

FIG. 41 illustrates some user written source code which places a graph within a C++ program loop, as shown in FIG. 40I;

FIG. 43 is a highly simplified pseudo-code representation of a buffer operator of the type shown inserted in FIG. 42C to prevent data flow blockages;

FIGS. 52A(1), 52A(2), and 52B show successive parts of a highly simplified pseudo-code representation of the composer( ) subroutine which creates a score for the parallel execution of a graph;

FIG. 53 is a schematic representation of how the composer( ) subroutine inserts a repartition operator into a data flow graph between a user-defined data-base query and the operator which receives input from results of that query;

FIG. 54 is a highly simplified pseudo-code representation of the parallelRun( ) subroutine which the conductor process uses to cause parallel execution of a score created by the composer( ) subroutine of FIGS. 52A(1), 52A(2), and 52B;

FIG. 55 is a highly simplified pseudo-code representation of the sectionLeader( ) routine which is executed by the section leader process on each processor executing part of a parallelized data flow graph;

FIG. 56 is a highly simplified pseudo-code representation of the player( ) routine which is executed by each player process associated with an instance of an operator in a parallelized data flow graph;

FIG. 60 is a highly simplified pseudo-code representation of the runLocally( ) function of a subprocess operator of the types shown in FIGS. 29 and 30;

FIGS. 61A–61D are schematic representations of various phases in the execution of a subprocess operator, with FIG. 61D corresponding generally to FIG. 61C except that it shows separate instances of the subprocess operator running on different processors;

FIG. 62 is a highly simplified pseudo-code representation of the simulatedParallelRun( ) routine which simulates all the data partitioning associated with parallel execution of a data flow graph, but uses only one or two processes;

FIG. 63 is a highly simplified pseudo-code representation of the executeSequentialPlayer( ) routine which is called by the simulatedParallelRun( ) routine of FIG. 62;

FIG. 65 represents the identical interfaces of the APT_BuildModelOperator and the APT_ParallelBuildModelOperator classes, two operator classes used to build analytical models of data sets;

FIGS. 66 and 67 are, respectively, schematic representations of APT_BuildModelOperator and APT_ParallelBuildModelOperator objects and the data sets they train on and the APT_Model objects they create;

FIG. 68 represents the interface of the APT_ApplyModelOperator class, which is used to apply APT_Model objects created by APT_BuildModelOperator and APT_ParallelBuildModelOperator objects to a data set;

FIG. 69 is a schematic representation of an APT_ApplyModelOperator object and its relation to an APT_Model object containing the analytical model it applies, the data set to which it is applied, and the updated data set it produces;

FIG. 72 is a schematic representation of a guidance file which is used to vary the analytical model associated with an APT_Model instance;

FIG. 73 is a schematic representation of the sequential training of an APT_Model object using an APT_BuildModelOperator instance in which the model being trained is a hidden layer neural network;

FIG. 74 is a schematic representation of the use of an APT_ApplyModelOperator instance to apply the hidden layer neural network APT_Model object trained in FIG. 73 upon a data set using parallel processors;

FIGS. 75 and 76 correspond to FIGS. 73 and 74, except that the model being trained and used is a hybrid neural network;

FIGS. 78, 79, and 80 are highly simplified pseudo-code representations of the runLocally( ) routines of each of the three sub-operators which form the composite APT_ParallelBuildModelOperator operator, one of which, that whose runLocally( ) is shown in FIG. 79, is a parallel operator;

FIG. 82 is a schematic representation of the parallel I/O which embodiments of the present invention can perform to composite data sets; in which each instance of a parallel process performs a separate I/O operation to each of the components of the composite data set;

FIG. 83 is a schematic representation of alternate embodiments of the invention which perform I/O with a composite data set in which different instances of a parallel process reads from different components of the composite data set;

FIG. 84 is a schematic representation of how the present invention can perform a complex query to an RDBMS in parallel;

DETAILED DESCRIPTION OF PREFERRED EMBODIMENTS

Figure 1:
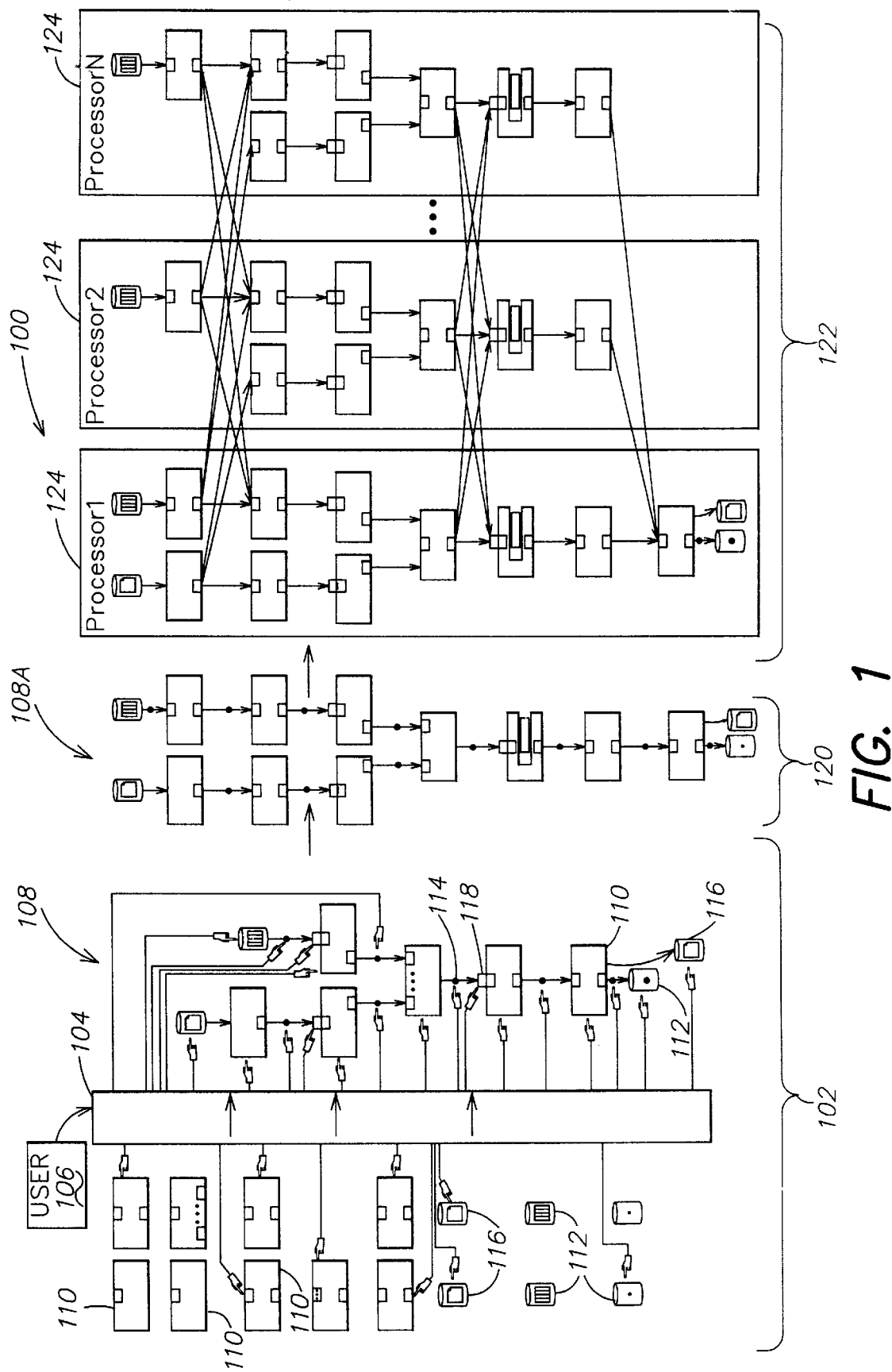
FIG. 1 is a schematic representation of a system for parallel computing according to one embodiment of the invention, of how that system enables a user to define a specific user-defined graph from user selectable components, how the system defines an equivalent graph, and how the system parallelizes execution of that equivalent graph on multiple processors.

FIG. 1 provides a high level overview of a system 100 for parallel programming, which is a preferred embodiment of the present invention. The system 100 corresponds, with some changes made for purposes of simplification and some for purposes of describing expected future changes, to a software product called Orchestrate™ available from Torrent Systems, Inc., (formerly Applied Parallel Technologies, Inc. ("APT")), the assignee of this application.

In the portion of FIG. 1 indicated by the bracket 102, a publicly defined graph programming interface 104 enables a user 106 to define a data flow graph 108 from individually selected graph components 110, 112, 114, 116, and 118. In the portion of the figure indicated by bracket 120, the system automatically converts the user-defined graph 108 into a functionally equivalent graph 108A, and in the portion of the graph indicated by bracket 122, the system automatically performs parallel execution of the graph across a plurality of processors 124.

Figure 2A:
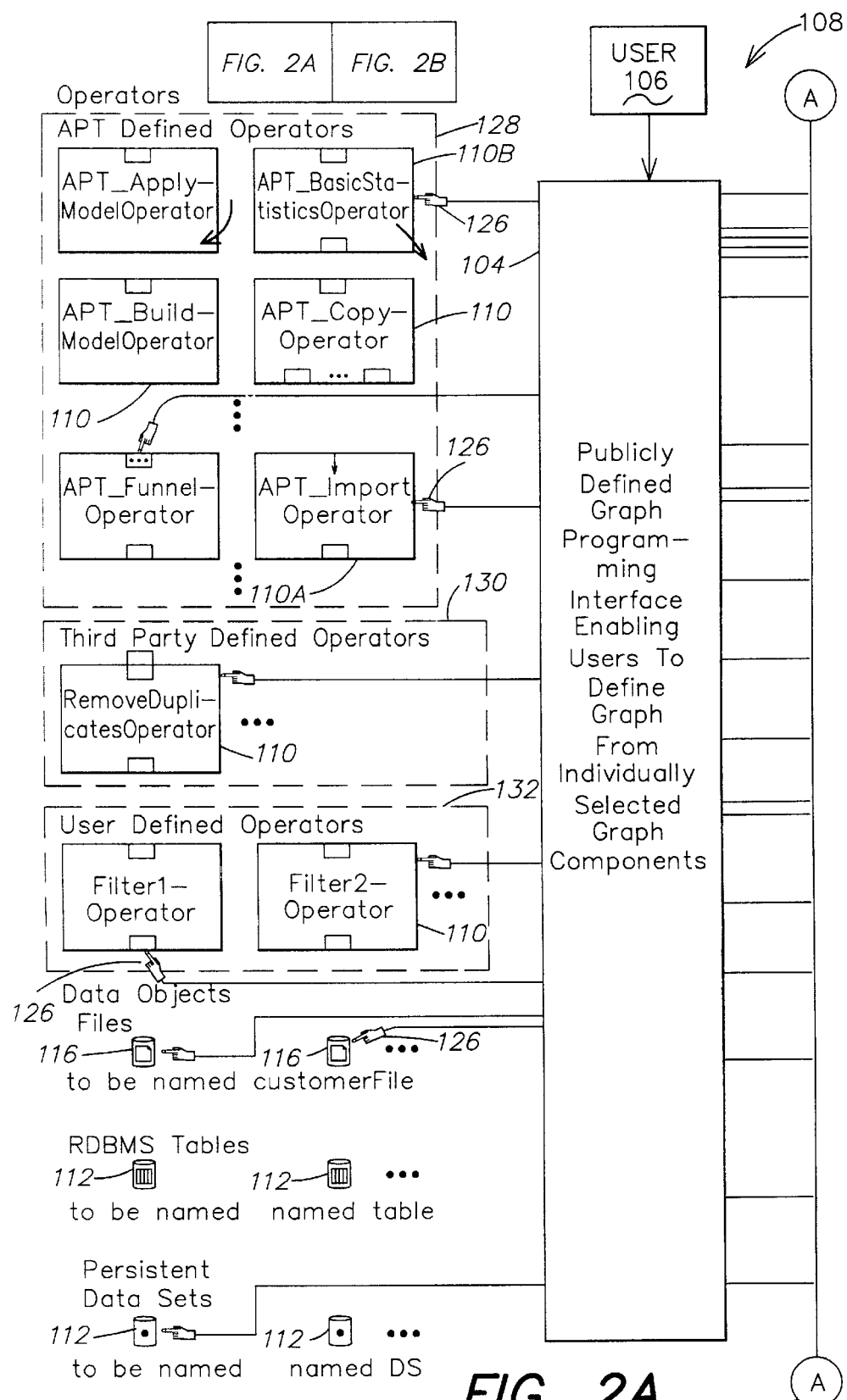
FIGS. 2A and 2B are an expanded view of the portion of FIG. 1 showing how the system enables a user to define a specific user-defined graph.
Figure 2B:
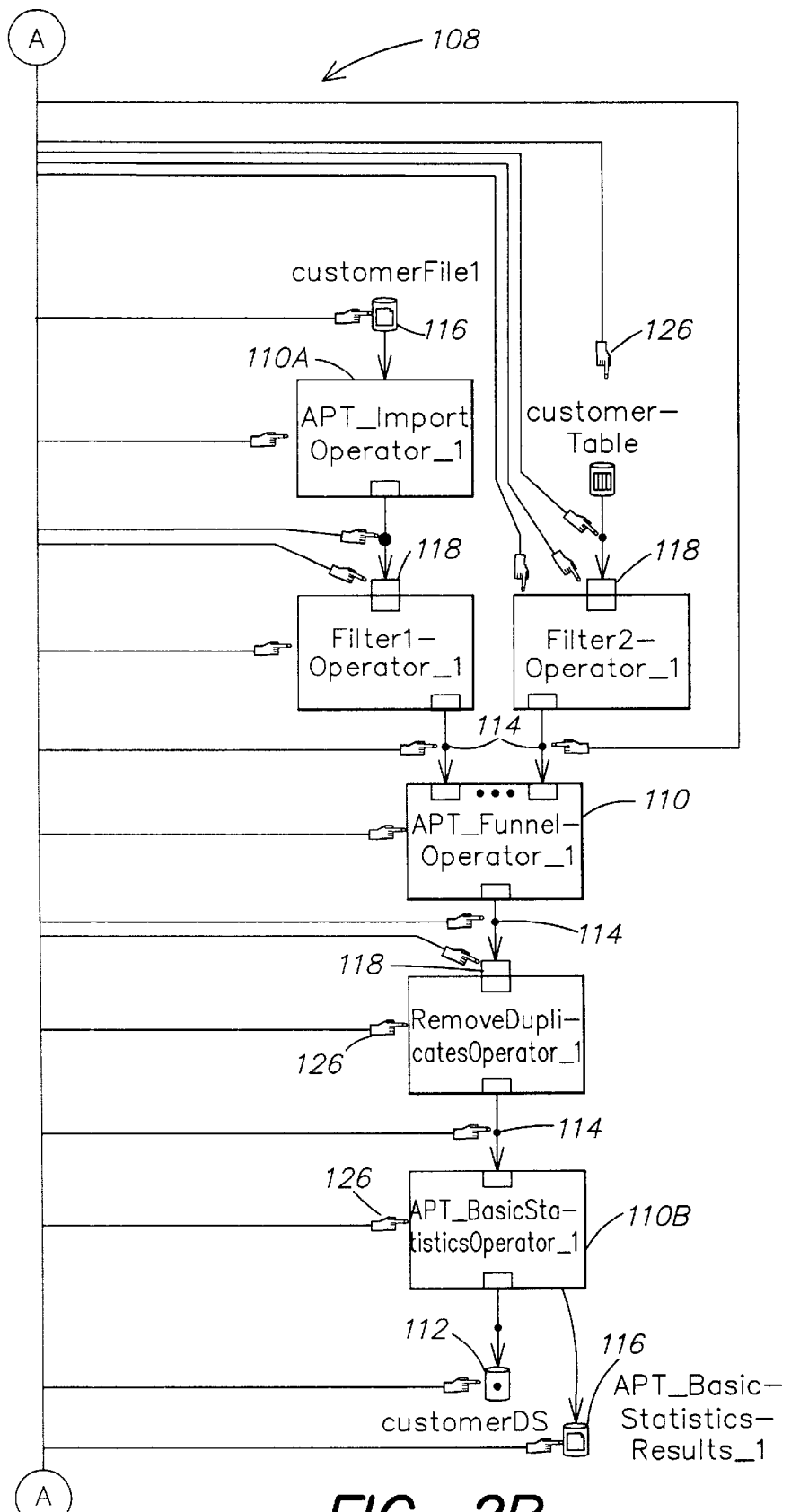

The portion of FIG. 1 indicated by bracket 102 is shown in greater detail in FIGS. 2A and 2B. As shown in FIGS. 2A and 2B, the programming interface 104 enables the user to individually select graph elements and to place them at a desired location in a data flow graph 108 by means of user issued instructions 126, indicated by hand symbols in FIGS. 2A and 2B. In the preferred embodiment of the invention, the programming system enables the user to entirely define the functional characteristics of a data flow graph by the selection of specific individual graph elements.

The graph elements which can be specifically selected for inclusion in the graph by the user include operators 110, persistent data sets 112, virtual data sets 114, files 116, and adapters 118. The system 100 is an object oriented system, in which the operators, data sets, and adapters are all objects derived from predefined classes. As is well known in the art of object oriented programming, an object class defines an object type, specifying a set of functions and data elements which are associated with each object of that type. An instance of a given class is an actual object of the type specified by the given class's definition.

With the system 100, the user selects the class definition of an individual operator 110, shown on the left of the programming interface symbol 104 in FIG. 2A and places an instance of that class definition in the graph 108. The operator classes include classes 128 supplied by Torrent Systems, Inc. Most users' versions of the system 100 will also include operator classes 132 defined by the users, themselves, or their coworkers, and perhaps operator classes 130 defined by third parties. The availability of user and third party defined operators is facilitated by the fact that the programming interface 104 is publicly defined in documentation for the system 100 and by the fact that the programming interface includes operator base classes from which new operators can be derived. This makes it is easy for different users of the system to derive their own operator classes for use with the system, and for operator objects derived by one user on one version of the system 100 to be used by another user on another version of the system.

As will be explained in more detail below, each operator class includes member functions for aiding in the system's automatic parallelization of graphs containing such operators. The user does not have to be concerned when linking instances of such operators together to define a graph. Each operator also includes an operation function which can be programmed as a sub-routine, a sub-routine which calls other subroutines, a separate executable program, or a sub-graph composed of one or more other operators. When new operator classes are derived from an operator base-class, the user deriving such a class can write his or her own operation function for the new class. This operation function can be virtually any function that will compile and operate within the resources of the processors on which it is written and on which it is to be run.

Other types of objects the user can select for inclusion in a graph include persistent data sets 112. In the system 100 these fall into two types, file persistent data sets which are represented by the cylindrical file symbol with a dot in the center in the figures, and RDBMS persistent data sets, or RDBMS tables, represented by the cylindrical file symbol with a schematic representation of a table in its center. Persistent data sets are called "persistent" because they persist, or exist on permanent disk storage, before or after the execution of the graph in which they are an input or output.

A file persistent data set ("file data set") is a collection of one or more files stored on one or more processor nodes of a parallel computer being used with the system 100. A system 100 object is associated with each such set of files. This object keeps track of the files in the data set and has member functions for facilitating communication with operators. Often, if the file data set is created by the output of an operator which was run as N separate instances on each of N processors, the data set will have N partitions, each comprised of one or more files and each residing on one of the N processors.

If a user attaches a file data set to a graph created by previous execution of the same or another graph, the data set will have an already defined data schema. A data schema defines, among other things, the record length, and the name and data type of a sequence of fields of each record in a data set. If the user attaches a new file data set to a graph, he or she can either specify a schema for it, or can let the file data set assume the same schema as the output of the operator which writes to it.

An RDBMS persistent data set ("RDBMS data set" or "RDBMS table") is a table or query in an RDBMS with which system 100 can automatically communicate. Currently, system 100 supports interfaces to Oracle and DB2 Parallel Edition RDBMS. As is explained in more detail below, when a user connects an RDBMS table to the input or output of an operator in a graph, the system 100 automatically generates a query or write statement to the table's RDBMS in the query language of that RDBMS. If the operator is parallelized the system will normally generate a separate query to the RDBMS for each parallel instance of the operator. Since both Oracle and DB2 PE can be run in parallel on a parallel computer, including the same computer on which system 100 is run, this enables partitioned parallel communication between the RDBMS table and parallel instances of operators of a user-defined graph being run by system 100. Each RDBMS data set has an associated system 100 object which has members for facilitating communication with operators. The data schema of an RDBMS data set is defined by its associated RDBMS.

In system 100, virtual data sets 114 are used to connect between the output of one operator and the input of another operator in the same graph. In the figures they are represented by an arrow with a dot on it. They are called virtual data sets, as opposed to persistent data sets, because they represent communication links though which records are sent a block at a time during execution of a graph, and, thug, they have no actual records associated with them before or after execution of a graph. A virtual data set has the data schema of the output of the operator which writes to it.

The system 100 also enables normal files 116 to be connected to a user-defined graph. An APT_ImportOperator 110A, shown at the top of the graph 108 in FIGS. 2A and 2B, enables a user to connect flat files of any number of forms to a user-defined graph. A user-definable schema object, APT_Schema, is associated with the output of the import operator to define the data schema of the file's records. This enables the import operator to convert the file's data into a data set comprised of a stream of identifiable records with identifiable fields. The system 100 also includes an APT_ExportOperator, not shown in FIGS. 2A and 2B, for converting a virtual or persistent data set supplied to its input into flat files of any one of a selected number of forms.

Another type of object the user may need when defining a specific graph is an adapter object 118, which is an instance of either APT_InputAdapter or APT_OutputAdapter. An input adapter can be placed between a data set and the input of an operator, to change the name or data type of one or more individual fields in the data set to a different name or type before passing the record to the standard input interface, or port, of the operator. Output adapters can be placed between the output of an operator and a data set to convert field names and types. The inputs and outputs of operators often have schemas with predefined field name and data types. Thus, adapters are often necessary to make conversions in field name and data type, to enable operator reusability in many contexts when connecting operators and persistent data sets or connecting together operators through virtual data sets.

Figure 3:
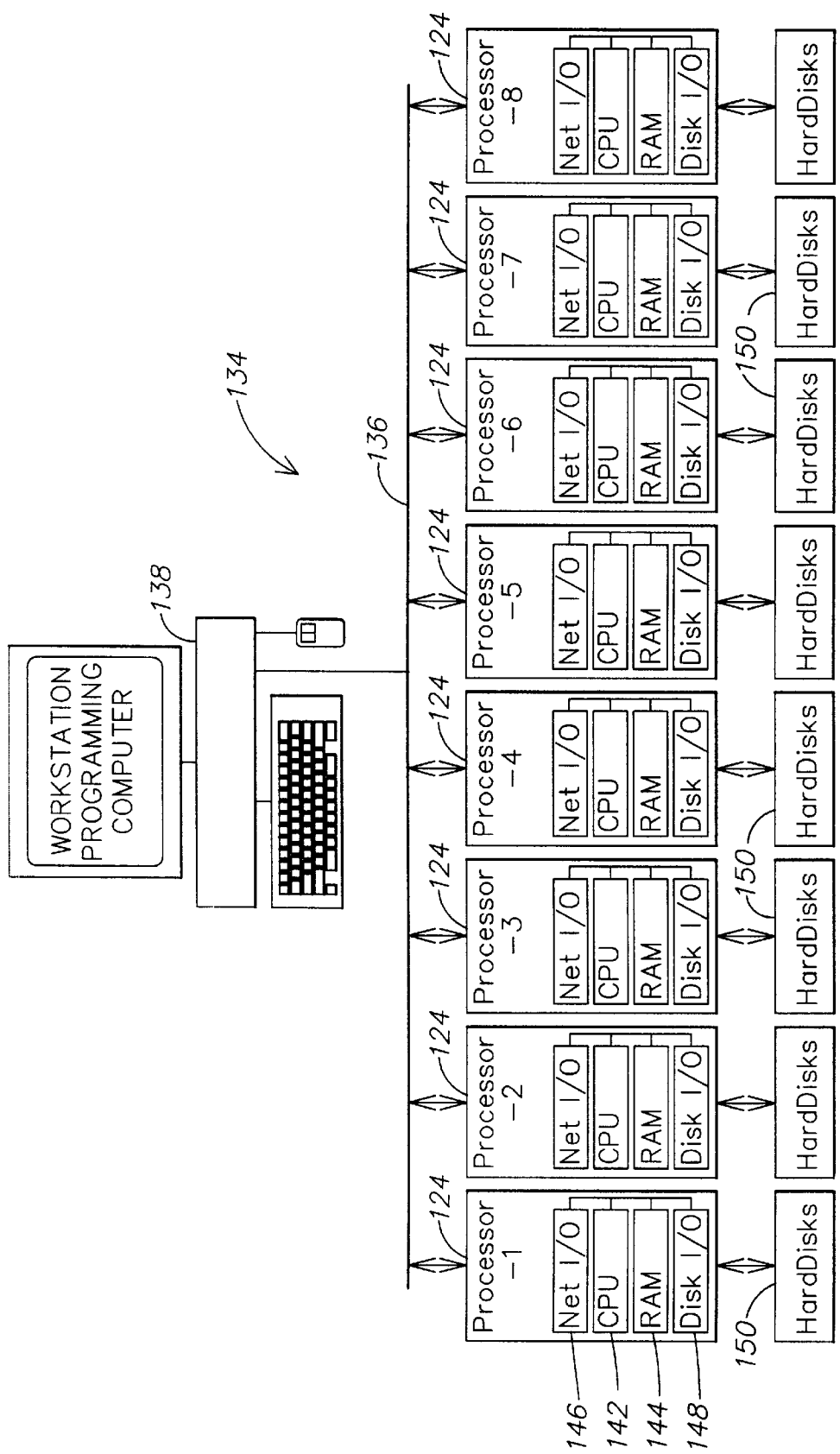
FIG. 3 is a schematic representation of one type of parallel computing system on which the system shown in FIG. 1 can be run.

FIG. 3 shows one type of parallel hardware computer system 134 on which the software system 100 shown in FIGS. 2A and 2B, can be run. In this hardware system, each of eight processors 124 are connected together through a high speed computer network 136. Also connected to this computer network is a workstation 138 which enables a user to control the system, to receive selective output from it, and to write programs for it. Each processor 124 includes a central processing unit, or CPU, 142, which executes instructions stored in, and reads and writes data from and to, a main random access memory (RAM) 144. A network interface 146 performs the function of reading and writing data over the network between processors. A disk interface 148 enables each processor to read and write data to one or more hard disks 150 connected to each processor.

The hardware system 134 is a so-called "shared-nothing" system in which each processor node 124 has its own main memory and is connected to other processors by nothing more than network connections. It should be understood that the invention can be executed on other types of parallel computers, including Symmetric Multiprocessing computers, massively parallel computers, networks of workstations, or hardware systems comprised of mixtures of such types of machines.

Figure 4:
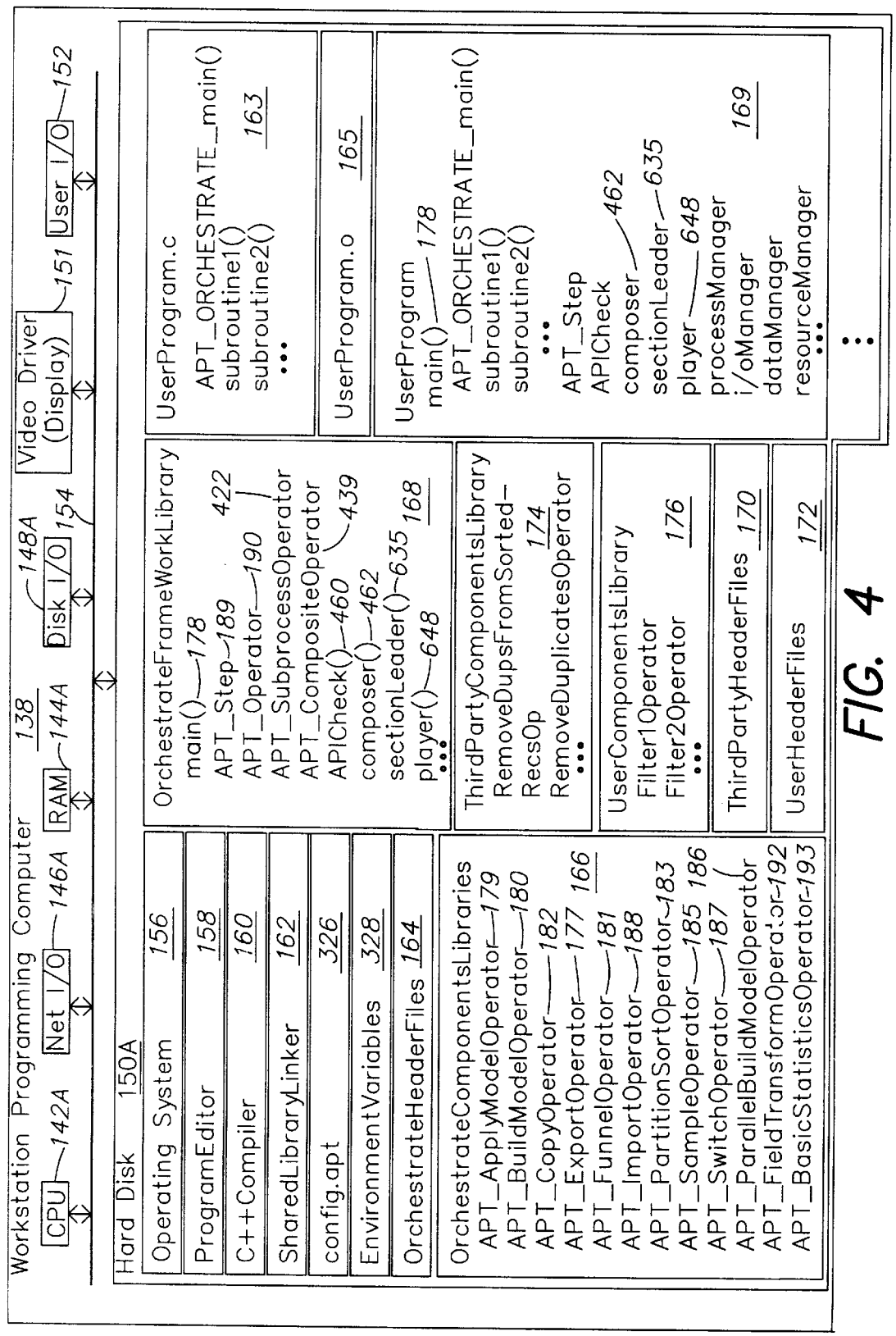
FIG. 4 is a schematic representation of hardware and software which can be used to create programs for use in the system of FIG. 1.

FIG. 4 illustrates data and program structures which are used in and with the programming environment provided by the system 100. In FIG. 4 this programming environment is shown on the workstation 138, shown in FIG. 3, since it is common to have the programming environment on a workstation connected to a larger more expensive parallel computer. It should be understood, however, that all of the components of this environment could be placed on a computer totally separate from the parallel computer or on a node of the parallel computer itself.

The programming environment computer 138 has a CPU 142A, main memory 144A, network interface 146A, disk interface 148A, hard disk 150A, display driver 151, and user I/O controller 152, as is common in most workstations, all designed to connect over one or more buses 154. In its hard disk and/or memory the computer 138 stores an operating system 156, which in current embodiments of system 100, is a variant of UNIX. (In future embodiments of system 100, it is expected that additional operating systems, such as Windows NT, will be supported.)

The programming system also contains a program editor 158 to enable a user of the system to write and edit C++ source code for programs defining data flow graphs of the type shown in FIGS. 1, 2A and 2B, and, if desired, to place such graphs within the context of larger program structures written in C++. A program written for use with system 100 should be in the form of an APT_ORCHESTRATE_main( ) routine and, if desired, one or more sub-routines, either in the same or separate source files.

The programming system provides a C++ compiler 160 to compile source code or .c, files written by the user into object code, or ".o", files. This compiler can be a standard sequential C++ compiler provided by any one of a number of third party vendors. In FIG. 4 the compiler is used to convert the source code file UserProgram.c 163 into the corresponding object file UserProgram.o 165.

The programming system also includes a shared library linker 162 to enable the user to link all the object code files necessary to define an application into a single executable file. The linker 162 can be any one of a number of C++ linkers available from third parties. To produce an executable file which will cause the system 100 to automatically parallelize the execution of a data flow graph the following files have to be linked: an object file defining the user-written APT_ORCHESTRATE_main( ) and possibly written subroutines called by that APT_ORCHESTRATE_main( ); one or more separate user-written object files containing subroutines called by APT_ORCHESTRATE_main( ); all header files and component libraries necessary to declare and define objects or functions referred to in the user's programming; and the system 100's framework library 168. In the example of FIG. 4, the UserProgram.c file 163 has been linked to form the UserProgram executable file 169.

The system 100 comes standard with header files 164 which declare all of the objects and functions contained in its component and framework libraries 166 and 168, respectively. Header files 170 and 172 should also be provided, respectively, for the components contained in any libraries 174 or 176 of graph component objects created by third parties, the user, or his or her coworkers.

The system 100 also comes with a component library 166 which includes a plurality of object classes for use by the user's program. Among these object classes are the following pre-defined operator classes; APT_ApplyModeloperator 179 which applies an analytical model, such as a neural network, Kohonen network, neural tree network, or KD tree, to specified source fields of a record to calculate a value for a specified set of one or more new fields for the record; APT_BuildModelOperator 180 which builds an analytical model for use by an APT_

ApplyModelOperator 179 from the values of sources fields, and perhaps target fields, in each of many records contained in a training data set; APT_CopyOperator 182 which outputs two or more data sets which are duplicates of a data set supplied to its input; APT_ExportOperator 177 described above; APT_FieldTransformOperator 192 which performs various kinds of data conversions on the fields of an APT_DataSet; APT_FunnelOperator 181 which receives records from a plurality of data sets and combines them into one output data set; APT_ImportOperator 188 described above; APT_PartitionSortOperator 183 which can operate either sequentially or in parallel to sort a data set supplied to it; APT_SampleOperator 185 which will select a specified percent of records from its input data set to each of one or more output data sets; APT_BasicStatisticsOperator 193 which computes descriptive statistics on numeric fields of an APT_DataSet; and APT_SwitchOperator 187 which has one input and one or more outputs and which selects a specific output destination for each record supplied to its input based on the value of a given selector field of the input record.

The framework library 168 of the system 100 contains the C++ main( ) function 178 to be used in executable files, such as UserProgram, whose graphs are to be parallelized by the system. This main( ) routine is executed by a process invoked when the user gives the operating system a command to execute an executable file on one of the parallel computer's nodes. It is this main( ) process which directs all the other parallel processes created during the parallel execution of a graph.

In the description that follows, the process executing main( ) and the subroutines it calls will often be called the "conductor" process. This is based on an orchestral analogy. In this analogy, the conductor composes a plan for the parallel execution of a graph called a "score", each individual process which executes a parallel instance of an operator is called a "player", and each processor node has a "section leader" process which controls and communicates with all of the players on the same processor node under the ultimate control of the conductor. The conductor and each of the section leaders and players are separate processes. They all execute the same executable program, but achieve their different behavior by executing different parts of it.

The framework's APICheck( ) routine 460 is called by the main( ), or conductor process before execution of a graph to check if the graph is likely to successfully execute. APICheck also makes necessary modifications to the graph so as to create an equivalent graph, such as the equivalent graph 108A in FIG. 1, and to make the graph ready for execution. The framework's composer routine 462 is called by the conductor process to create a score corresponding to the equivalent graph. The score is a data structure which defines which graph elements are to be executed by which processor during parallel execution of a graph, such as the parallel execution indicated by bracket 122 in FIG. 1. Each player process is given a copy of the score, which enables it to know what operator it should execute.

The sectionLeader routine 635 is the part of the executable file that is executed by a section leader process. It is used to create, communicate with, and control player processes under the control of the conductor process. The player routine 648 is the part of the executable file executed by player processes.

The FrameWorkLibrary 168 also includes class definitions for APT_Step 189. APT_Operator 190, APT_SubProcessOperator 422 and APT_CompositeOperator 439.

Figure 5:
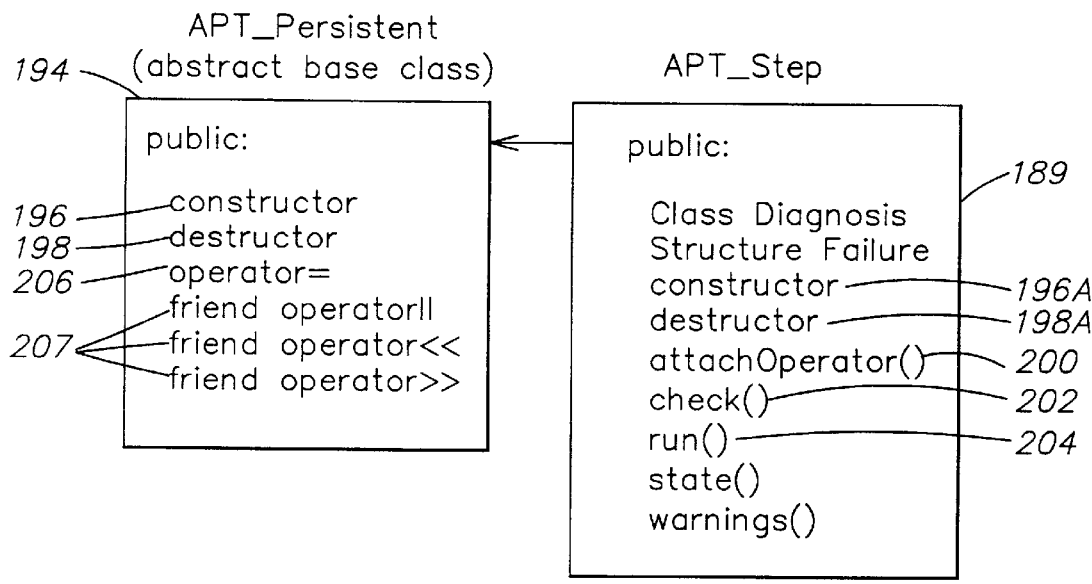
FIG. 5 illustrates the public interface of the APT_Step class, which, like all the other classes defined in other figures of this application is one of the C++ object classes used with the system of FIG. 1.

The public interface to the APT_Step class 189 is shown in FIG. 5. As those skilled in C++ programming will understand, this diagram indicates that the definition of the APT_Step class 189 is derived from the definition of an APT_Persistent class 194. Each class derived from another class inherits all the members of the class from which it is derived unless it explicitly redefines such members in its own class definition.

In C++ programming, a constructor function is a function which is called to create an instance of a given class. An object class's constructor is called by declaring the name of the desired new object instance to be of the type of that class, as is done in step 208 of FIGS. 8A and 8B, in which "step" is declared to be an object of the type APT_Step. Some constructor calls pass a parameter list to the newly declared and created objects such as a parameter list immediately after the name of the variable representing the new object instance.

The destructor function is called to remove an instance of a class from memory once the instance is done being used. The specification below will not discuss the use of destructors since it is not necessary to the understanding of the invention and is well known in the programming art.

Other functions of interest in the APT_Step function are the attachOperator function 200, the check function 202, and the run function 204.

The attachOperator function 200 is called to attach a particular operator to a given step. Thus, if a user has created an instance of the class APT_Step, such as the object "step" created by the line 208 in FIG. 8B, the user could then attach one or more operators to that step object by making a call to that step's attachOperator function, as is shown in lines 210 of FIG. 8B. In C++ givenObject.givenFunction( ) calls the givenFunction associated with the class definition of the givenObject. Thus, "step.attachOperator( )" calls the attachOperator( ) function of the object "step".

The user associates the elements of a given graph with a given step object by attaching each of the graph's operators to the step through a sequence of one or more such ".attachOperator( )" calls. Since a user-defined program can contain multiple different steps associated with different graphs, it is important to have a mechanism to identify which operators are to be associated with which graphs.

The APT_Step::check( ) function 202 is a function which checks a graph to see if it can be, or is likely to be, properly executed by the System 100. This function can be called directly by a user in his program or, if not, it is called automatically by the APT_Step::run( ) function 204.

The APT_Step::run( ) function 204 is called by a user to perform the execution of the graph associated with a given step at the portion of the C++ program in which the call to the ".run( )" function occurs, This is illustrated in FIG. 8B by the line 212 near the bottom of the figure.

As is shown in FIG. 5, the APT_Step class inherits a set of serialization member functions 207 which enable an object of its class stored in memory to be serialized, either for storage on disk or for transmission over computer network, and which enable such a serialized representation to be reconverted back into a version of the object in memory. The serialization operators are important, since the System 100 uses serialization to transfer instances of objects across a computer network to its various processor nodes during parallel execution of a graph. Many of the major object classes in the System 100's Framework and Component Library have been derived from the class APT_Persistant, giving them these serialization functions.

Figure 9:
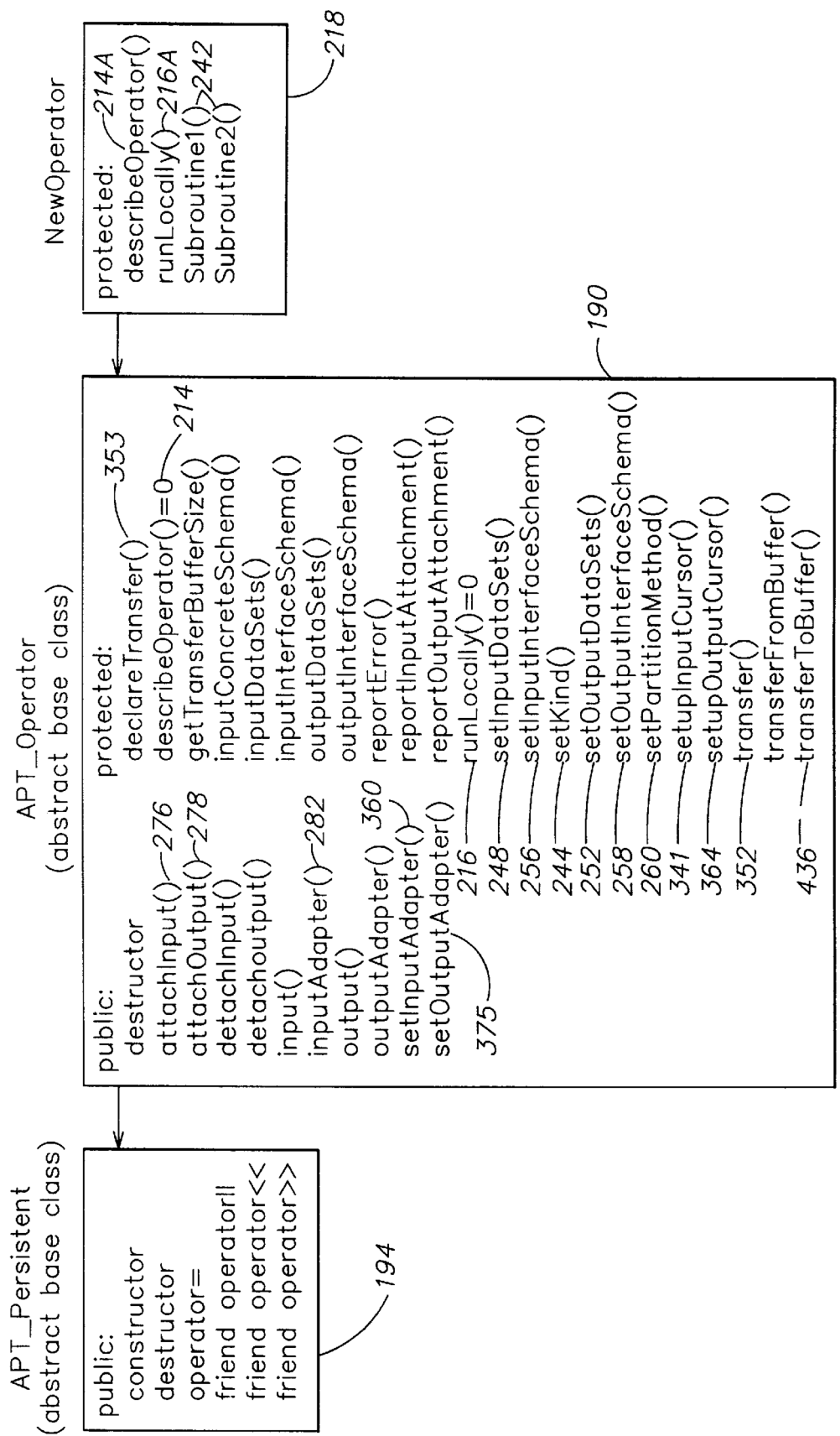
FIG. 9 illustrates the public and private interface of the APT_Operator class.

Returning to FIG. 4, the APT_Operator class 190 contained within the framework library 168 is shown in FIG. 9. As can be seen from FIG. 9, the APT_Operator class, like the APT_Step class shown in FIG. 5, is derived from the class APT_Persistant.

FIG. 9 differs from FIG. 5 in that it shows the protected member functions in its class definition as well as its public member functions. Public member functions are those available anywhere in a program using the class definition. Protected members, on the other hand, are only available to member functions of classes derived from the class in which such protected members occur.

APT_Operator is an abstract base class, meaning it is not a fully defined class from which actual instances can be derived, but instead a partially defined class from which sub-class definitions can be derived. The APT_Operator class is an abstract base class because two of its functions, describeOperator( ) 214 and runLocally( ) 216, are undefined, as indicated by the "=0" which occurs after them in the class declaration shown in FIG. 9. This means that when a user defines a new operator class from APT_Operator, such as the new operator class 218 shown in FIG. 9, the user has to define a new describeOperator( ) function 214A and a new runLocally( ) function 216A for that new class in order to make its class definition complete.

In addition to defining a new runLocally( ) function 216A and describeOperator( ) function 214A for a new operator class, the user can also define one or more sub-routines, such as the sub-routines 242, shown in FIG. 9, which are to be called by the runLocally( ) or describeOperator( ) functions. The runLocally( ) defined for a new operator and any sub-routines it calls defines the operations which are to be performed by the operator.

System 100 places no restrictions on this operation programming other than that it must compile and fit within the rather ample resources (normally equal to that of most workstations) of the processors on which it is written and of the processors on which it is to run during parallel execution. The system does not guarantee that the operation will perform useful work, but, given that the operation meets the limited restrictions stated above, the system will execute it as part of a parallelizable graph.

The describeOperator( ) function 214A defined for a new operator should call the setKind( ) function 244, which the new operator has inherited from the APT_Operator class, to define whether or not the new operator class is a sequential or parallel operator. Once this function is called the new operator will have a Parallel-Sequential Flag 246, shown in FIG. 10, indicating if it is parallelizable or not.

Figure 10:
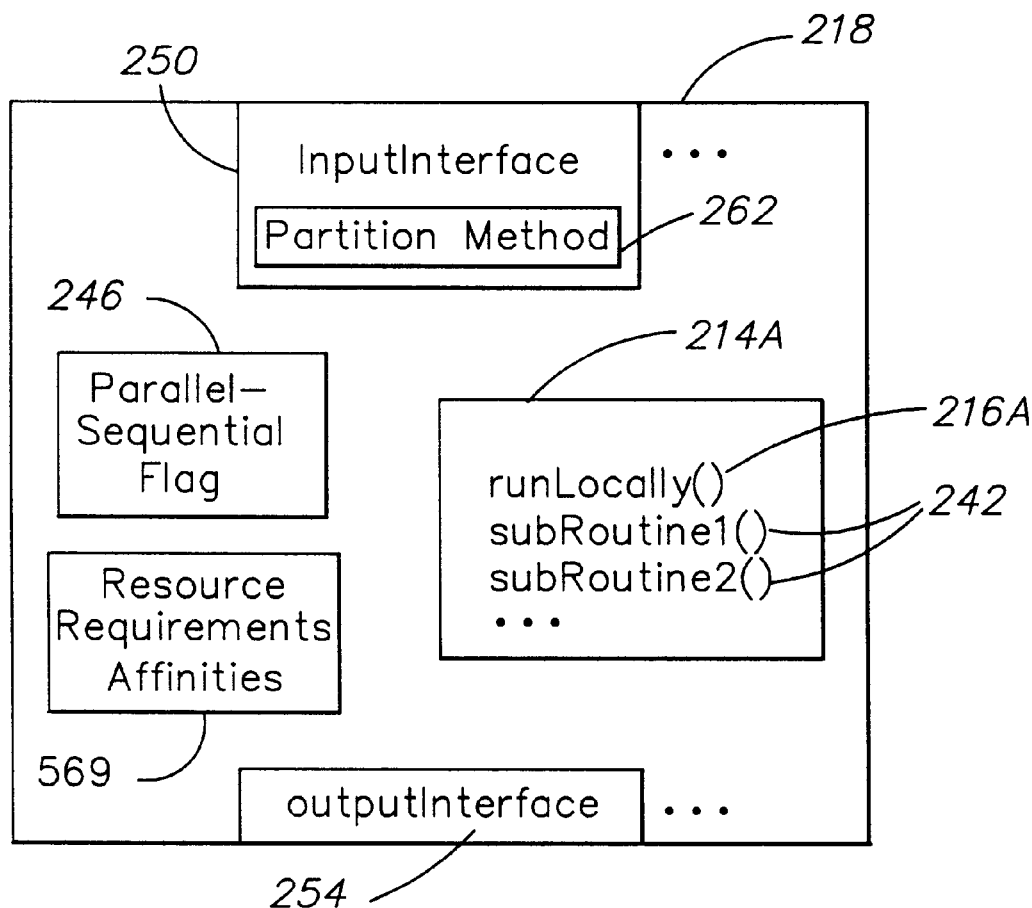
FIG. 10 is a schematic representation of an instance of an operator derived from APT_Operator class shown in FIG. 9.

The describeOperator( ) function also must call a setInputDataSets( ) function 248, which the new operator class inherits from the APT_Operator class, to define the number of input interfaces, or input ports, 250, shown in FIG. 10, which the new operator will have. The setInputDataSets( ) function can be used to associate 0 or more such input interfaces to each instance of an operator class. The individual input ports of an operator are numbered 0, 1, 2, etc. As will be described in more detail below, an input interface is a computational structure designed for receiving a stream of records from a data set.

Similarly, the describeOperator( ) function 214A for a given new operator must call the setOutputDataSets( ) function 252 to set the number of 0 or more output interfaces, or output ports, 254, shown in FIG. 10, to be associated with the new operator.

The describeOperator( ) function also has to call the setInputInterfaceSchema( ) function 256 and the setOutputInterfaceSchema( ) 258, respectively, for each input interface or output interface which has been defined by calls to setInputDataSets( ) 248 and setOutputDataSets( ) 252. This will be described further below.

If the new operator's Parallel-Sequential Flag has been set to parallel, indicating that it is a parallelizable operator, and if the data to be supplied to a given one of the operator's input interfaces in each parallel instance of that operator during parallel execution is to be partitioned in a particular manner, the describeOperator( ) function for the new operator class should call the setPartitionMethod( ) function 260 to specify the particular partition method to be associated with that input interface. The specified method will be stored in the partition method indication data structure 262 of the input interface, as shown schematically in FIG. 10. If the user does not specifically set a partitioning method for a given input interface, its associated partition method will have a default value of "Any", indicating that it can operate with any partitioning method. FIGS. 8A and 8B shows an APT_ORCHESTRATE main( ) 264 which defines the graph 108 shown in FIGS. 2A and 2B. It starts with a series of include statements 266 which cause the Orchestrate header files 164 and the user header files 172 shown in FIG. 4 to be treated as if they were included in the file containing this APT_ORCHESTRATE_main( ) definition.

The lines 268 of FIG. 8A include statements which declare and create instances of all of the graph's data sets. Statement 268A declares and creates a data set object having the name customerTableDS. Statement 268A uses the form of the APT_DataSct constructor which is required to create persistent data sets. This form of the constructor takes a parameter list enclosed in parentheses to define the persistent data sets. In statement 268A these parameters state that the customerTableDS is an input data set and that it is an Oracle database table having the name "customerTable". The statements 268B define the virtual data sets 114 of the graph. The statement 268C defines the file persistent data set customerDS shown in FIGS. 2A and 2B.

Statements 270A–F of FIG. 8 declare new operator object instances from predefined operator classes, either classes defined in the OrchestrateComponentsLibrary 166, the ThirdPartyComponentsLibrary 174 or the UserComponentsLibrary 176 shown in FIG. 4. The statement 270A constructs an object APT_ImportOperator_1 of the type defined by the class APT_ImportOperator 188, described above with regard to FIG. 4. Statement 270A calls the constructor of that class with parameters which define the schema of APT_ImportOperator_1's output port, and with the name of the file to be input into the import operator object.

Step 270B constructs an operator object Filter1Operator_1 of the type defined by the class Filter1Operator. Similarly, step 270C defines an operator object Filter2Operator_1 of the type defined by the class Filter2Operator. In the example, illustrated in FIG. 4, both of filter operators classes are defined in the UserComponentLibrary 176.

Statement 270D creates an object APT_FunnelOperator_1 of the type defined by the APT_FunnelOperator class contained within the OrchestrateComponentsLibrary 166. Statement 270E defines an operator RemoveDuplicatesOperator_1 of the type defined by the RemoveDuplicatesOperator class defined in the ThirdPartyComponentsLibrary 174 shown in FIG. 4. Finally, statement 270F defines an operator object APT_BasicStatisticsOperator_1 of the type defined by the APT_

BasicStatisticsOperator class defined in the Orchestrate-Componentslibrary 166 and states that the file APT_BasicStatisticsResults_1 is the file to which the newly defined statistics operator is to write the statistics it calculates on the data set which passes through it.

Statements 272 call the attachInput( )function 276 and the attachOutput function 278, both shown in FIG. 9, of each of the graph's operators to connect its input and output ports, respectively, to their associated data sets in the graph. The calls to attach input for the APT_FunnelOperator_1 contained in steps 272A and 272B not only name the data set to be attached, but also specify the number of the input interface to which each such data set is to be attached. This is necessary in the case of the APT_FunnelOperator_1, since, as can been seen from FIGS. 2A and 2B, that operator has more than one input port.

Next, in statements 279, which are indicated only by ellipses in FIG. 8A, the program defines two adapters, Filter1Adapter and Filter2Adapter. As explained below, adapters are used to change the name or type of individual record fields of a data set to match the corresponding field of the interface schema associated with an input or output port.

In statement 280, one of these adapters is attached to the input of the Filter1Operator_1 object by means of a call to that operator's setInputAdapter( ) function 360 shown in FIG. 9. In statements 284 and 286, the setInputAdapter( ) functions of the Filter2Operator_1 and RemoveDuplicatesOperator_1 objects are also called to attach input adapters to those objects.

In statement 208, as has been described above, a new instance, "step", of the APT_Step object shown in FIG. 5 is declared and constructed. Then, in statements 210, the attachOperator( ) function 200 of the step object, is repeatedly called to attach each of the graph's operators to the step object.

Statement 212 calls the run( ) function 204 of the step object shown in FIG. 5. As is explained below in much greater detail, this call causes execution of the graph associated with its APT_Step object.

Once execution of the graph is complete and the call to the run( ) function returns, a statement 288 causes the APT_ORCHESTRATE_main( ) function to return with an indication of the status returned by the call to step.run. This ends the execution of the user written executable file containing the APT_ORCHESTRATE main( ).

FIGS. 11–14 illustrate the flexibility one has in combining step definitions and APT_Step::run( ) statements with standard C++ programming constructs. FIG. 11 shows a step definition comprised of statements 290 followed by a run( ) statement 291 for the defined step. In the step definition a statement 290A is used to state that an operator object called "Operator" should be should be of the type defined by the Operator1 class if the user has typed in the text "Operator1" after the command line. The instruction 290B states that the operator object should be of the type defined by the Operator2 class if the user has typed in the text string "Operator2" after the command line. Thus, it can be seen that System 100's programming interface allows one to conditionally define elements of a step based on variables existing at run time of the program containing that step.

FIG. 12 shows a step definition 292 followed by run( ) statement 294, which are both placed within a loop. In this example, it is assumed that the user will type the name of the user-defined executable file containing APT_ORCHESTRATE_main( ), followed by a string of input data set names. The "for" statement 296 will cause the statements indented under it to be repeated for each of the input data set file names specified in the command line argument, which is passed to the APT_ORCHESTRATE_main( ) function by the main( ) function 178, which is linked in with the user-defined executable file, as is indicated in the example of the UserProgram executable file 169 of FIG. 4.

Statement 292A in FIG. 12 defines a data set, tempInputDS, for the data set identified by the current user-specified filename contained in argv[ ]. The statement 292B creates a file data set tempOutputDS, having a filename corresponding to the current filename with the letters "Output" appended to its end.

When executed, the program of FIG. 12 will cause a separate execution of the UserOperator for each command-line file name argument. For each file name argument the program will cause the input data sets identified by that file name to be passed through an instance of the UserOperator and then fed out to an output file data set having the same name with the letters "Output" appended.

FIG. 13 illustrates that a user program can make execution of one or more steps conditional. In its example, if the first command line argument to the program has value1, "if" statement 298 will cause the step defined by the pseudo code statement 300 to be executed. If the command-line argument has value2, "if" statement 304 will cause the step defined by pseudo code statement 306 to be executed.

Finally, FIG. 14 illustrates that APT_Orchestrate main( ) can contain calls to one or more subroutines, such as the subroutines 310 and 312, each of which defines and executes one or more steps.

Figure 15:
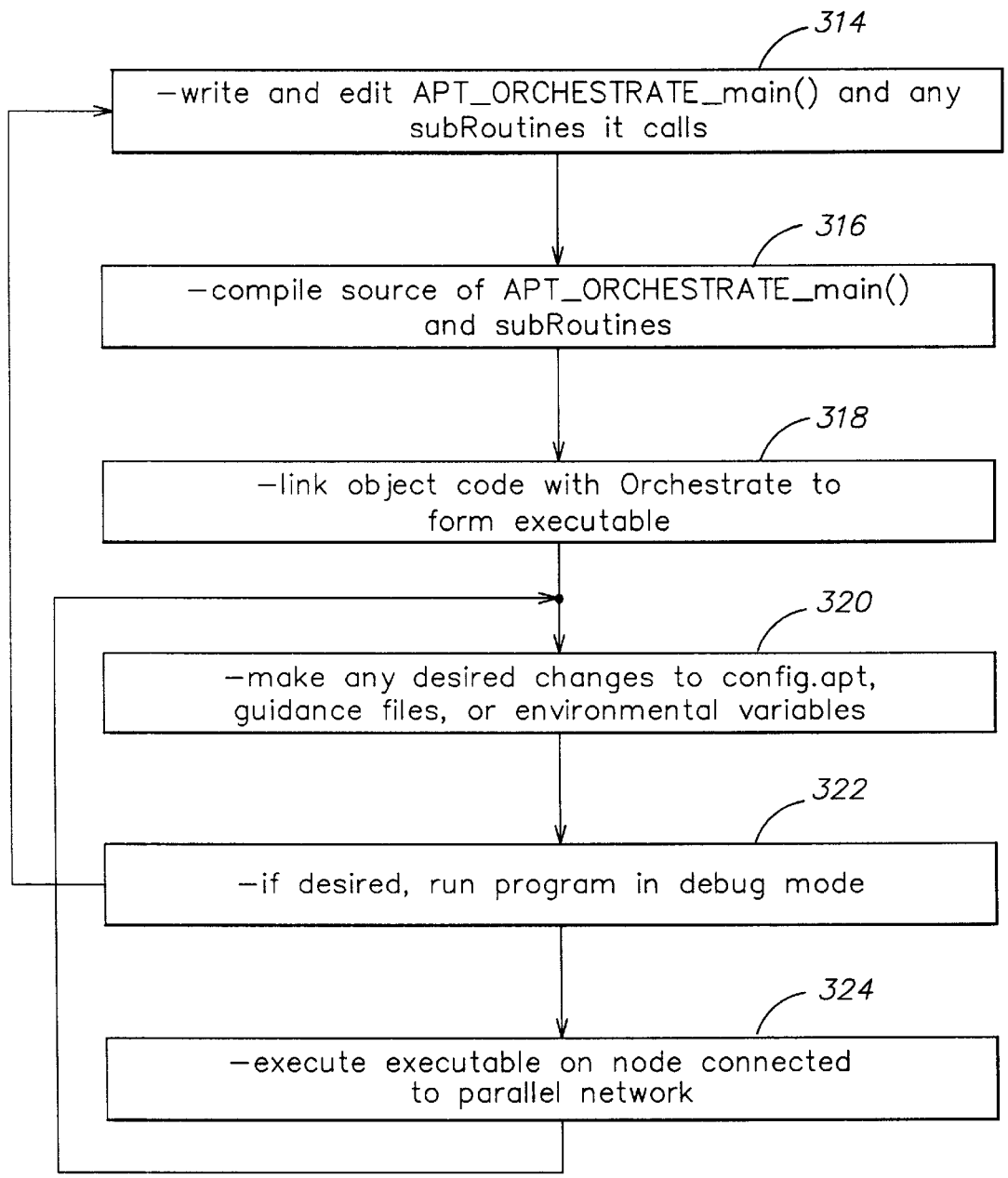
FIG. 15 is a highly simplified flow chart of the steps a user can undergo to prepare and successfully run a program using the system of FIG. 1.

FIG. 15 is a high-level flow chart of the process of writing and executing a program for parallel graph execution using the system 100. In step 314, the user writes and edits the APT_ORCHESTRATE_main( ) function, and any subroutines it is to call. Then, in step 316, she or he uses the C++ compiler 160 shown in FIG. 4 to compile the source code of APT_ORCHESTRATE_main( ) and of any subroutines it might call. Then, in step 318, he or she uses the linker 162, shown in FIG.4 to link the compiled user code, such as the program UserProgram.o 165 shown in FIG. 4. This linking process should link the compiled user code with the OrchestrateComponentLibrary 166, the OrchestrateFrameworkLibrary 168, and with any user or third-party libraries referred to in the user program. This linking process of step 318 will form a complete executable file, such as the UserProgram file 169, shown in FIG. 4.

At that time, if the user desires, he or she can choose to make any desired changes to config.apt, guidance files, or environmental variables, as indicated by step 320 in FIG. 15. The user can also choose to run the program in a debug mode, as indicated by step 322 in FIG. 15, to try to correct any errors which may occur in it. As will be explained below in greater detail with regard to FIGS. 62–64 the system 100 has two debug modes which are designed to reduce the difficulty of debugging parallelizable data flow graphs.

If the user finds bugs in the debug mode, she or he will probably loop back to the write and edit step 314, in which she or he edits the source code of the user program, using the program editor 158, to fix the bug. Once the user has completed the debug phase, or if he or she skips it altogether, the user can advance to step 324, where he or she causes parallel execution of any data flow graphs contained within the program without debugging.

Figure 16:
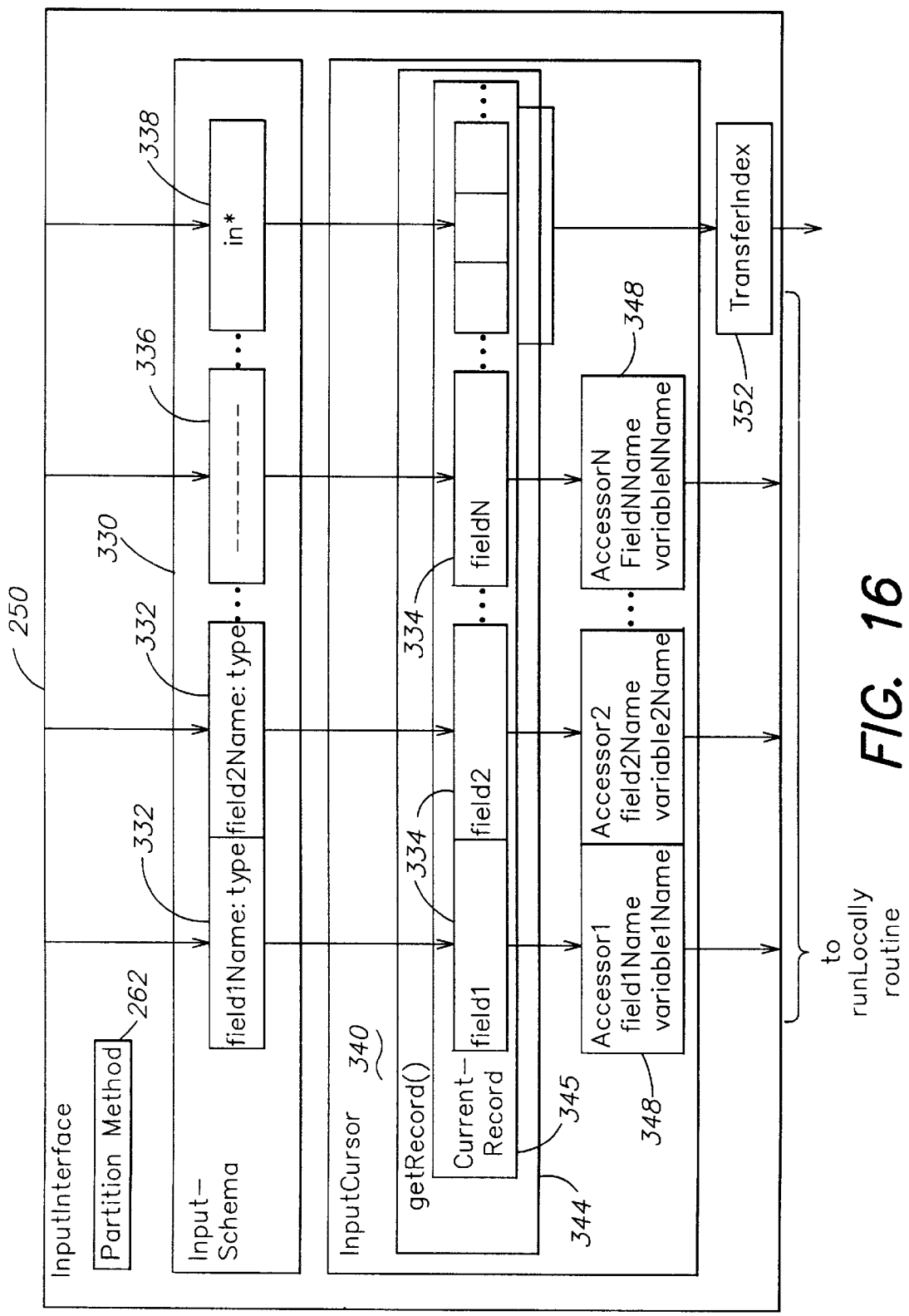
FIG. 16 is a schematic representation of an input interface object which receives data records in an instance of the APT_Operator class.

FIG. 16 provides a more detailed schematic diagram of the operator's input interface 250 previously shown in FIG.

10. Each input interface includes a partition method indicator 262, which specifies how data supplied to parallel instances of the operator should be partitioned before being supplied to the parallel instances of the interface. In an operator which has its parallel sequential flag 246, shown in FIG. 10, set to "sequential", this is not of importance. But in parallel operators, partition method can be critical. The default value for the partition method is "Any", indicating that the interface makes no requirements on how data supplied to it is to be partitioned. If "Any" is not appropriate for the input, the user can specify to have "Round-robin", "Random", "Hash", "Range", "Same", or "Entire" partition methods, or can define his own user-defined partitioning object for association with the input, or the user can use a third-party-supplied partitioning object.

Each input interface 250 also has associated with it an input schema definition 330, which specifies a field definition 332 specifying the field name and data type for each of an initial sequence of one or more fields 334 of incoming records to the interface. A schema can also include one or more dynamically defined field definitions 336. Each such dynamically defined field definition is to be specified at run time by a describeOperator( ) function which obtains the information about dynamically defined fields from the constructor or from other member functions of the operator object including it. The describeOperator( ) function is called by the OrchestrateFrameworkLibrary 168 before parallel execution of the graph commences.

An input schema can also include a schema variable 338, which indicates that all of the fields supplied to the input port are to be transferred, usually to one of the operator's output ports.

Figure 6:
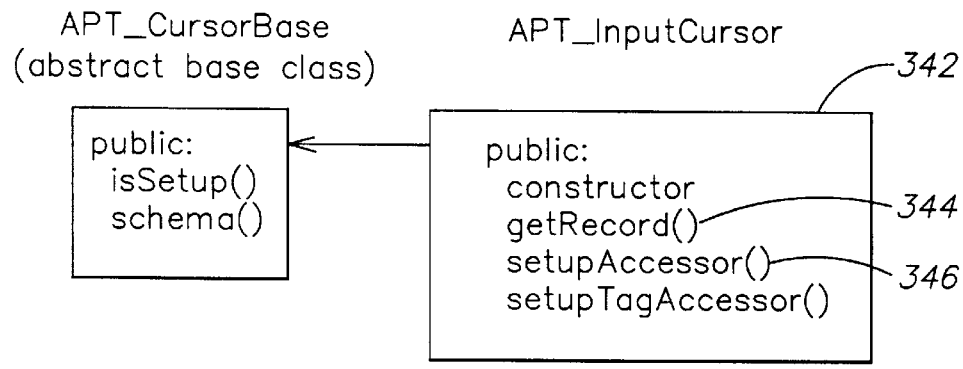
FIG. 6 illustrates the public interface of the APT_InputCursor class.

Each input interface also includes an input cursor object 340, an instance of the APT_InputCursor class 342 shown in FIG. 6. This input cursor is associated with a given operator's input interface by calling the operator's setupInputCursor( ) function 341, shown in FIG. 9. As shown in FIG. 6, each such object includes a getRecord( ) function 344. This function is called from within the runLocally( ) of an operator to get the next record from the data set connected to one of the operator's input ports. It will not return until either it can get the next record or an indication that the data set has no more records.

As can be seen in FIG. 6, APT_InputCursor objects also include a setupAccessor( ) function 346, which should be called to set up an accessor 348, shown in FIG. 16, for each field of the input interface's input schema which an operator's runLocally( ) function wants to access. Each such accessor contains the field name of its associated input schema field, with a corresponding variable name into which the value of that field is to be placed. This enables the runLocally( ) code to access field values as if it had pointers to them in local variables.

If an input port's input schema includes a schema variable, such as the schema variable 338, shown in FIG. 16, it should also include one or more transfer indexes 350, as shown in FIG. 16. A transfer index is created by making a call to the declare Transfer( ) function 353, shown in FIG. 9, for the input interfaces. In most cases this call should include the number of both an input interface and an output interface including a schema variable. The call will return with an index number, which is the transfer index 350. If a subsequent call is made to the transfer( ) function 352, shown in FIG. 9, of the operator, the entire current record 345 obtained by the getRecord( ) function will be transferred to the transfer index's associated output interface.

Figure 17:
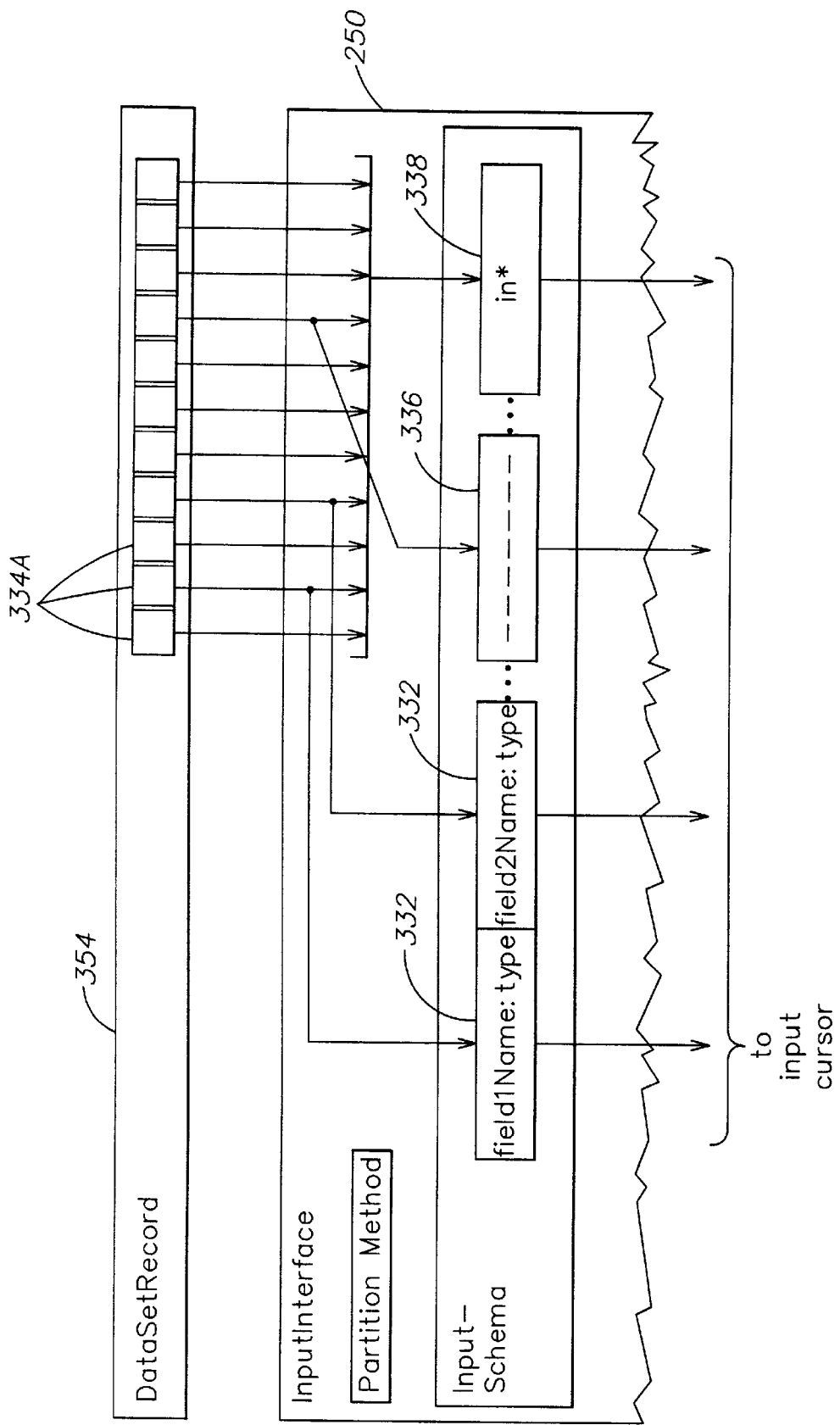
FIG. 17 is a schematic representation of how fields from a data set record are mapped by name into fields of an input interface's input schema.

FIG. 17 shows how the names associated with field definitions 332 in an input schema are used to access correspondingly named fields 334A within a data set record 354 supplied to an input port. All data sets, whether they be persistent or virtual, contain their own record schema, and such data set schema's have field definitions for a sequence of one or more record fields. As a result, the system can compare the field names in the input schema with those in the data set schema to find fields which share the same name. For each such match it finds, it causes the data set field with the name matching that of the input schema field to be fed into that schema field, regardless of where the matching data set field occurs in the data set schema.

Figure 18:
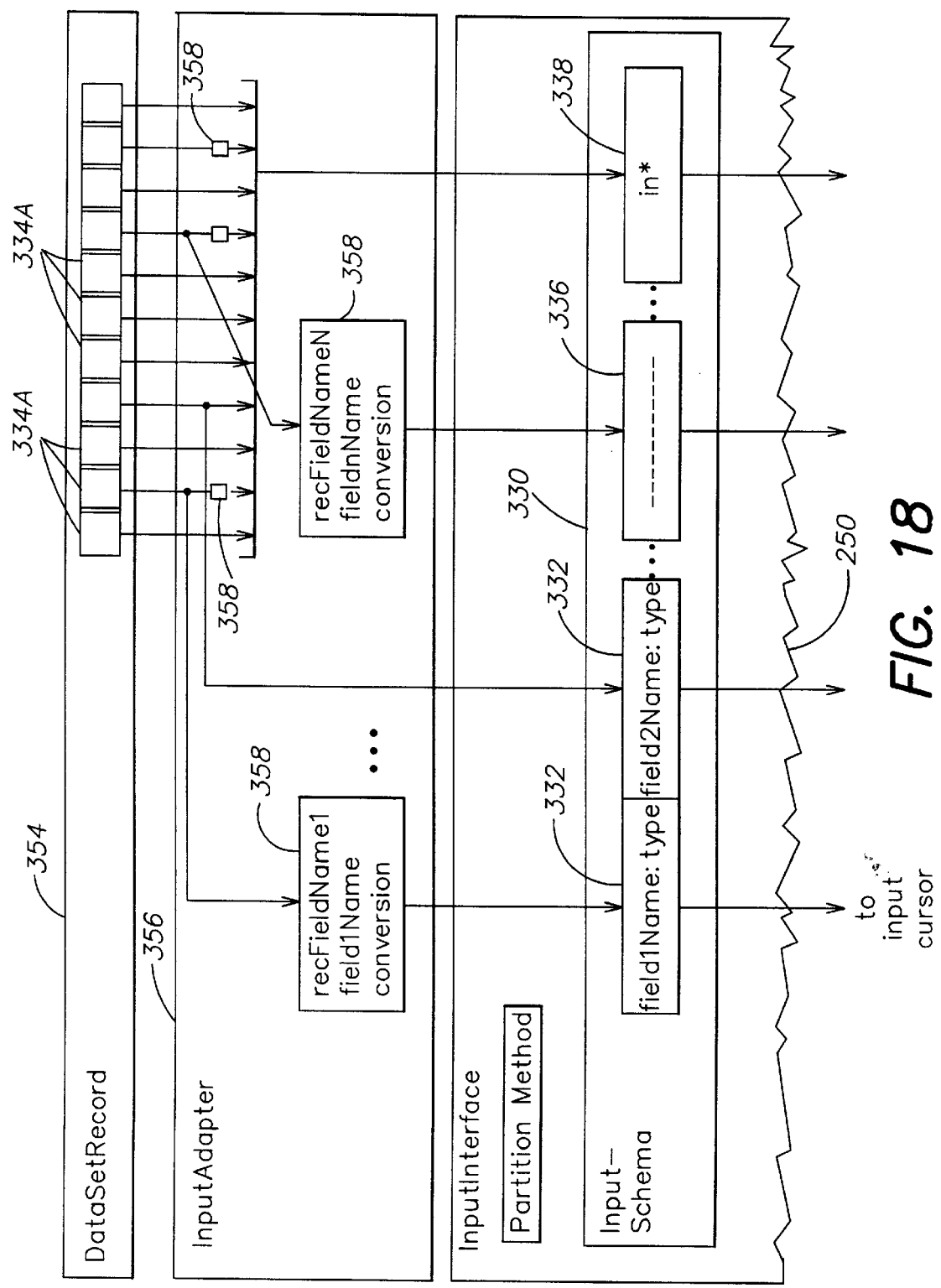
FIG. 18 is a schematic representation of how an input adapter object can be used to convert the name and/or type of a data record field into the name and type expected by a field in an input interface's schema.

FIG. 18 is similar to FIG. 17, except that it shows the effect of attaching an input adapter 356, to the input interface 250. As in shown in FIG. 9, operators have a function setInputAdapter( ) 360, which can be called to attach a specified input adapter to a given numbered one of the operator's input ports. Lines 280, 284, and 286 of FIG. 8 provide examples of such calls. The input adapter is itself an object, which has functions that can be called to bind field adapters 358 to the individual field definitions 332 of the input port's input schema 330. Each of the field adapters 358 includes a record schema field name and a corresponding input schema field name and, if desired, a conversion function. The conversion function can be selected to map between string and numerical values, between numerical and string values, to take sub-strings from longer strings, or to change numerical representations.

Figure 19:
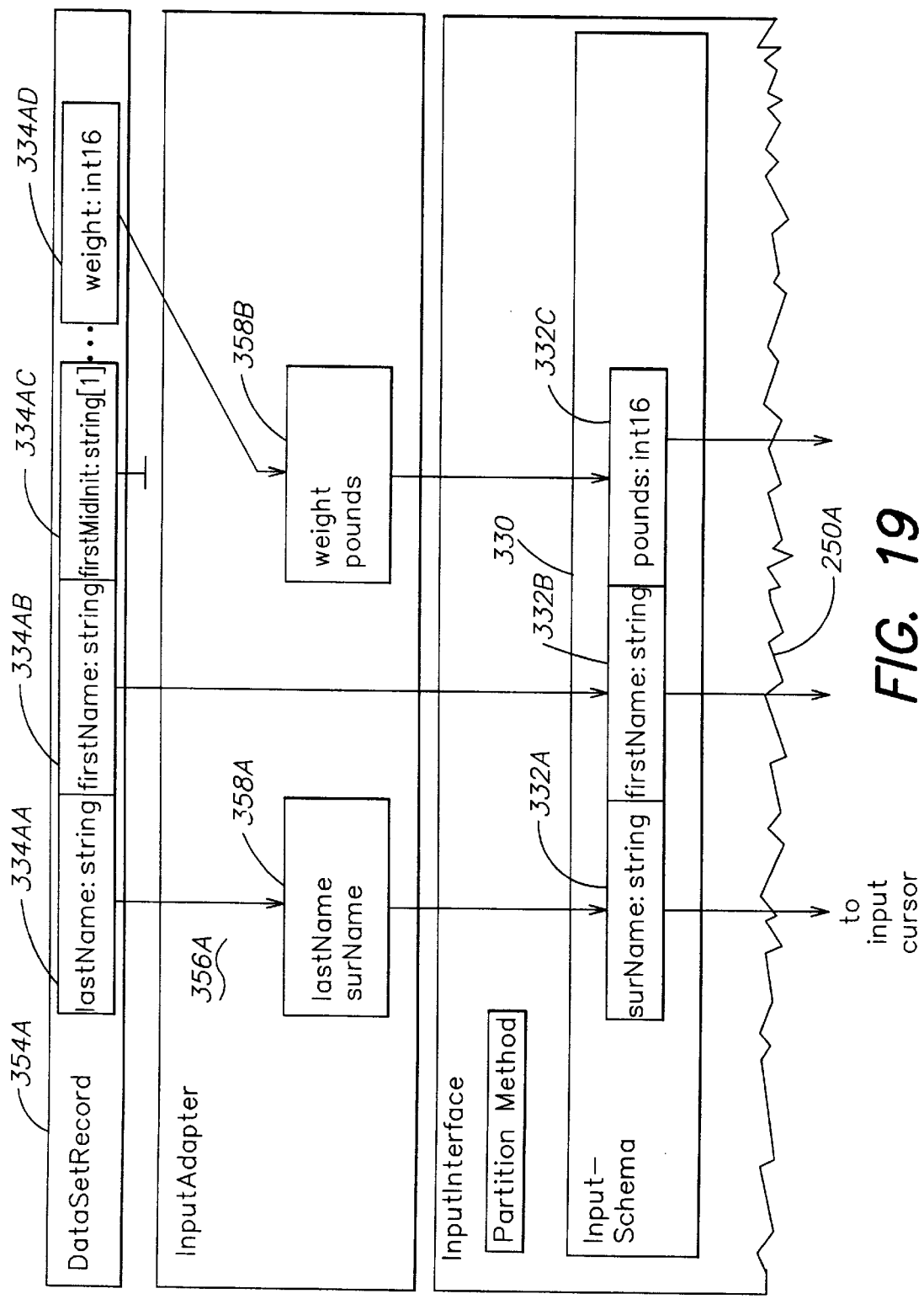
FIG. 19 is a schematic example of the mapping of specific named fields from a data set record into the input schema of an operator's input interface through an input adapter.

FIG. 19 provides a simple example of the relationship between a specific data set record 354A, a specific input adapter 356A, and a specific input port 250A. In this example the data set field 334AA, which has the field name "lastName", gets converted by the field adapter 358A into a field named "surName", which is the name of the first field specified by the input schema.

The record field 334AB has a field name of "firstName". Since the second field 332B of the input schema 330 has the same name, field 334AB gets passed directly to the input schema field 332B.

The field 334AC of the data set record has no corresponding field in the input schema, even after adaptations, and therefore it does not get passed into the current record obtained by the getRecord( ) function of the input interface. This would be different if the input schema had a schema variable which received all input fields.

Finally, the data set field, "weight", 334AD in the example of FIG. 19 has its name changed by the input adapter 358B so that it will be passed to the field identified by the schema field definition, "pounds", 332C in the input record obtained by getRecord( ).

FIGS. 20–23 are used to describe in greater detail the operation of the output interface 254, first shown in FIG. 10.

Figure 7:
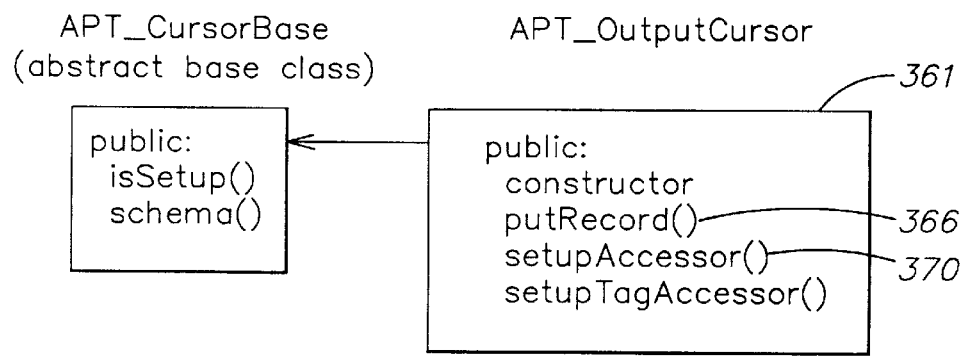
FIG. 7 illustrates the public interface of the APT_OutputCursor class.

Each output interface includes an output cursor 361 A, which is an object of the type defined by the class APT OutputCursor 361, shown in FIG. 7. This output cursor is associated with a given output port, or output interface, by calling the operator's setupOutputCursor( ) function 364, shown in FIG. 9. As shown in FIG. 7, each output cursor object includes a putRecord( ) function 366, which can be called by the runLocally( ) function of the operator to feed a current record out through the output interface to its attached output data set.

Figure 20:
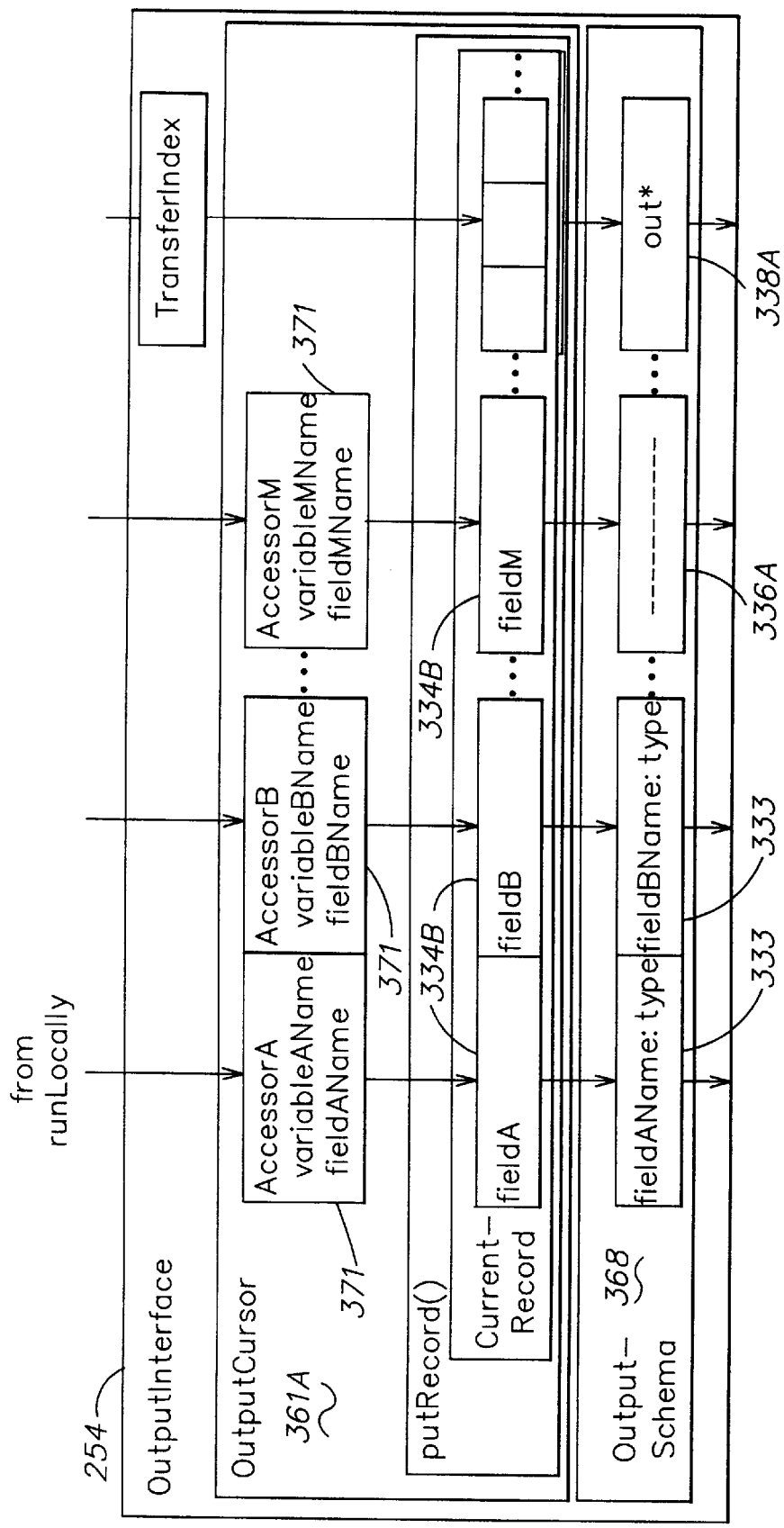
FIG. 20 is a schematic representation of an output interface object which outputs data records from an instance of the APT_Operator class.

The output interface also includes an output schema 368, which is similar in form to the input schema discussed above. The user, when defining the output cursor, should call the setupAccessor function 370, shown in FIG. 7, for each of the fields having a field definition in the output interface's output schema 368 to which the runLocally( ) function will want to be able to write values. This accessor 371, shown in FIG. 20, provides a variable name that can be written to by the code of runLocally( ). Each accessor also includes the name of the output schema field into which the value of that variable is to be written in the current record.

Figure 21:
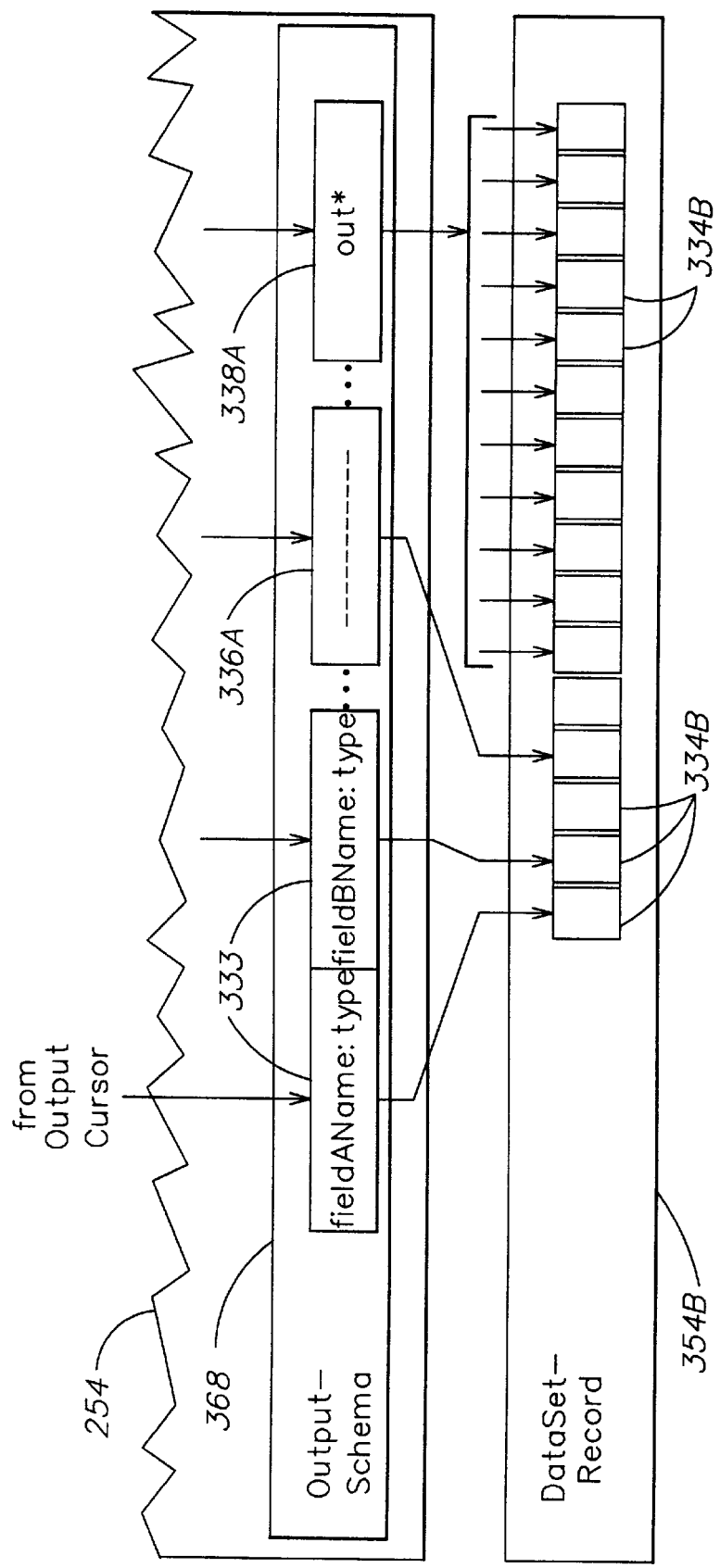
FIG. 21 is a schematic representation of how fields from the output interface's schema are mapped into a record of a data set when the data set does not have a pre-defined schema.

FIG. 21 illustrates how fields associated with the various field name definitions in an output schema are written to an output data set record. In the example of FIG. 21, it is assumed the output data set has no predefined schema, as is usually the case. In this case the schema of the output port is imposed upon the output data set. When this happens, fields which are specifically designated in the output schema, including those specified by a pre-defined field definition 333 and those specified at run-time by a dynamic field definition 336A, are placed into the output record, in the order in which they occur in the output schema. If there is an output schema variable 338A associated with the output schema, all of the fields of the associated input record are transferred to the current record being output after the last of the individually specified schema fields. When such a transfer is made, any field definitions associated with the transferred fields are transferred to the corresponding position in the schema of the output data set. This enables the schema definition of a record to pass through an operator, by means of schema variables and transfer functions.

Figure 22:
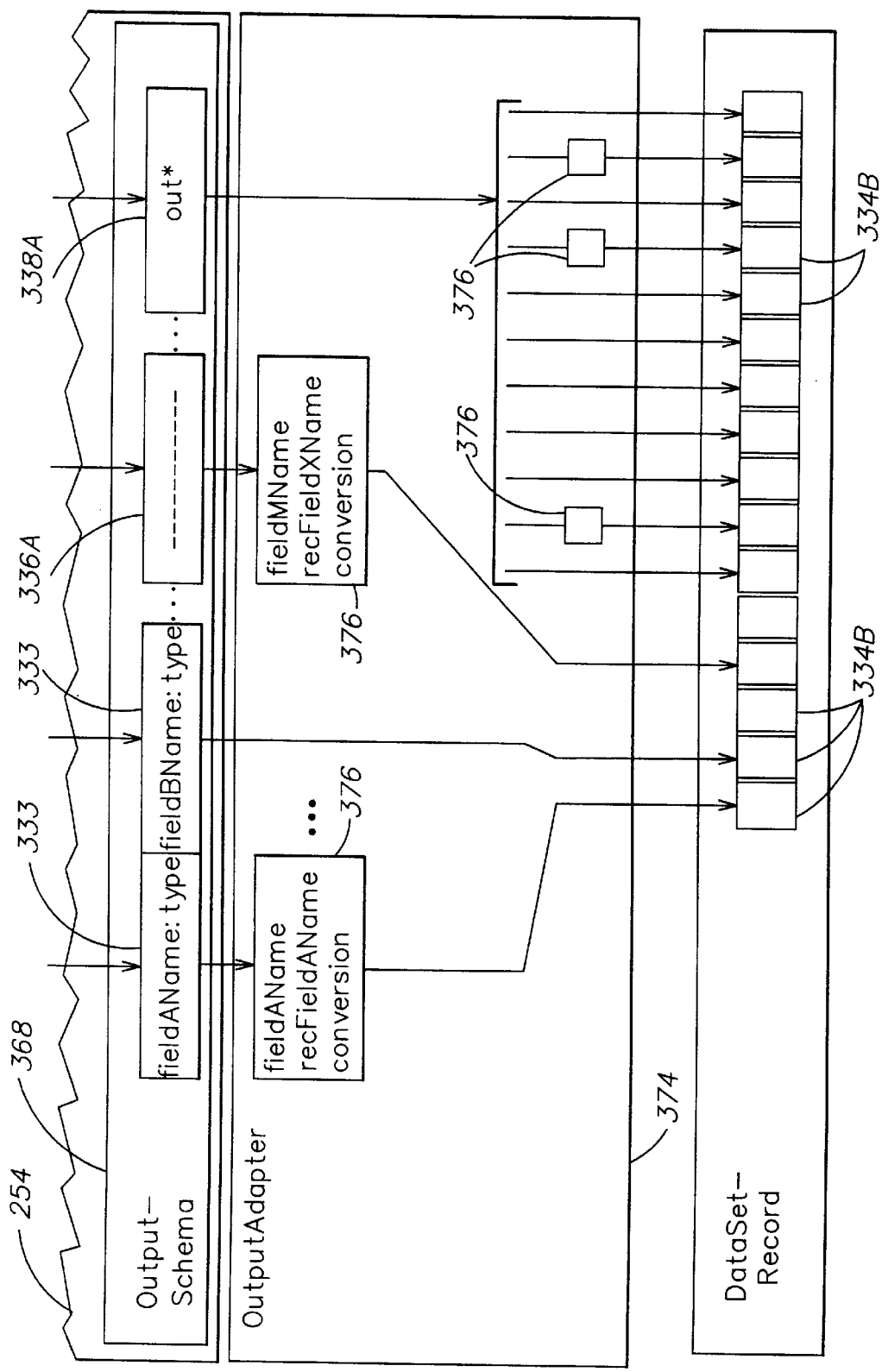
FIG. 22 is a schematic representation of how an output adapter object can be used to convert the names and/or types of record fields associated with an output interface's schema before those fields are placed into the records of a data set.

FIG. 22 shows the effect of attaching an output adapter 374 to an output interface 254. This is done by calling the setOutputAdapter( ) function 375, shown in FIG. 9, with an identifier for a specific output adapter object. Each such output adapter object includes functions for binding a field adapter 376 to a named output schema field. The field adapters of output adapters function in a similar manner to the field adapters of input adapters. That is, they operate to convert the name of a field specified by an output schema into a different name in the output data set record. They can also perform the string to number, number to string, numeric representation, and sub-string conversions.

Figure 23:
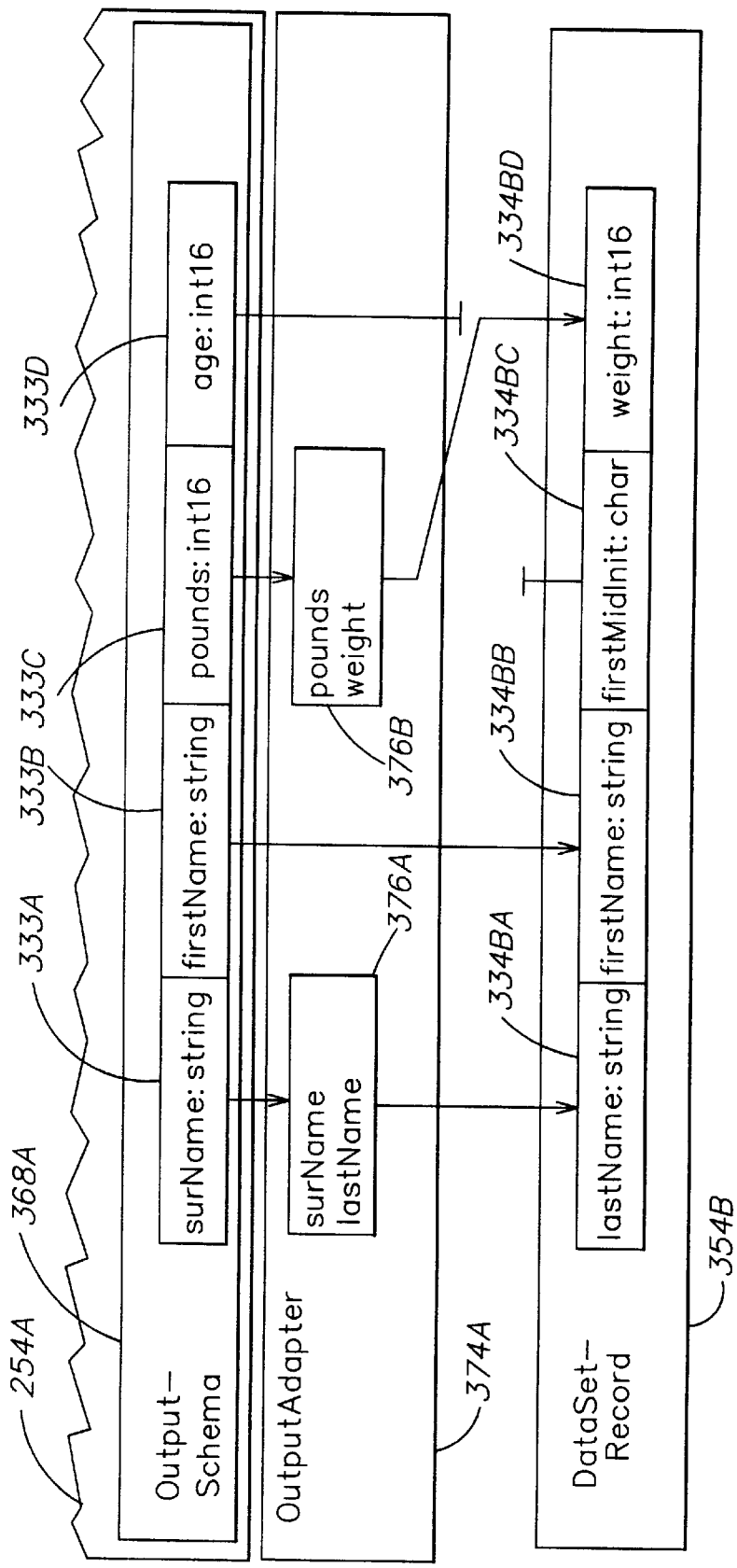
FIG. 23 is a schematic example of the mapping of specific fields from the output schema of an output interface, through an output adapter, into the record of a data set having a pre-defined schema.

FIG. 23 shows an example of the relationship between an output schema 368A, and output adapter 374A, and an output data set record 354B in a case where the output data set has a pre-defined schema. This usually occurs when one is writing to previously existing persistent data set. In the example, the output adapter's field adapters 376A and 376B convert the names of fields between that used in the output schema and that used in a data set record. It illustrates that if a field specified by the output schema has no corresponding field in a pre-defined schema of the data set, such as the field 333D in FIG. 23, the field will not be placed in the record supplied to the data set because it will have no place to go. Similarly, if the data set's pre-defined schema contains a specified field for which the output interface's schema has no matching field, such as the field 334BC, that field will be set to a default value in records supplied to the data set. The system will automatically route a named field, such as the output schema field 333C, after it passes through the output field adapter 376B, to the field in the pre-defined output data set's schema having the corresponding name, even if it occurs at a different location in the data set schema than in the interface's output schema.

Figure 24:
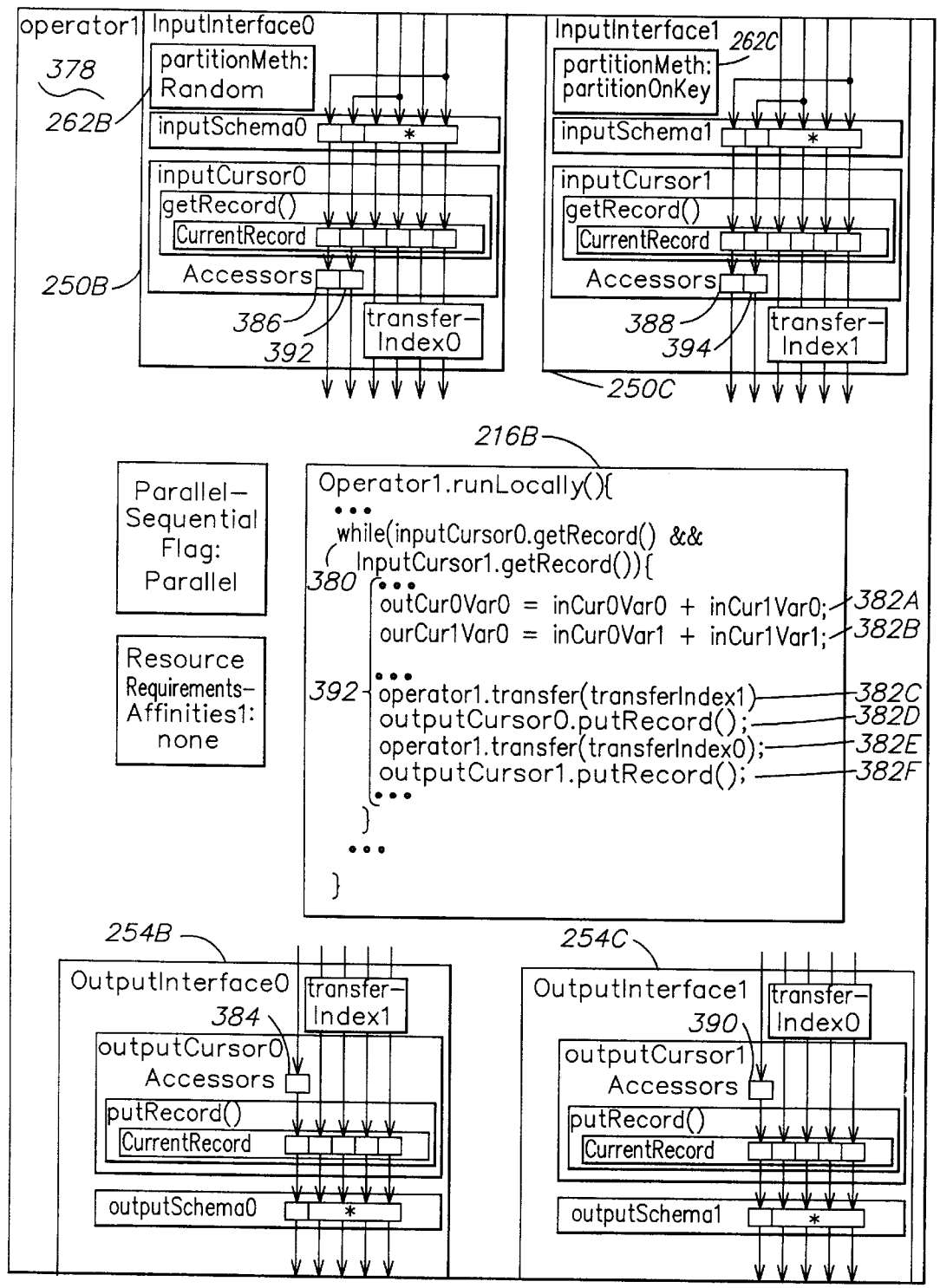
FIG. 24 is a schematic example of an operator derived from APT_Operator which has two input interfaces, two output interfaces, and a runLocally( ) function for outputting the sum of two fields from each of the inputs to each of the outputs.

FIG. 24 provides an example of how input and output interfaces relate to the operation of a runLocally( ). In this example, an operator object 378, named Operator1, has been derived from the APT_Operator class 190, shown in FIG. 9. Its setInputDataSet( ) function 248 and setOutputDataSet( ) function 252, shown in FIG. 9, have been used to create two input interfaces inputInterface0 250B and inputInterface1 250C, and two output interfaces, outputInterface0 254B and outputInterface1 254C. The partition method 262B associated with the first input interface, is the type "random" and the partition method 262C associated with the second input interface 250C is defined by a partition object partitionOnKey.

Operator1's runLocally( ) 216B includes a "while" loop 380 which performs the statements 382A–F indented under it as long as calls to the getRecord( ) functions of both the inputInterface0 and inputinterface1 continue to return with a current record.

Statement 382A sets outCur0Var0 (a variable defined by accessor 384 of the outputCursor0 of outputInterface0) to the value of inCur0Var0 (a variable defined by accessor 386 of inputCursor0 of the inputInterface0) plus inCur1 Var0 (a variable defined by an accessor 388 of the inputCursor1 of the inputInterface1).

Statement 382B similarly sets outCur0Var0 (defined by accessor 390 of outputCursorl) to the sum of inCur0Var1 (defined by accessor 392 of inputCursor0) and inCur1Var1 (defined by accessor 394 of inputCursor1).

Statement 382C calls the transfer( ) function 352, shown in FIG. 9, associated with Operator1, specifying transferIndex1, which has been defined by a previous call to the declareTransfer( ) function 353, shown in FIG. 9, associating inputInterface1 and outputInterface0 with transferIndex1. This call to transfer( ) in statement 382C causes all of the fields of the input data record supplied to the inputInterface1 to be transferred to the current record of the putRecord( ) function of outputInterface0.

Statement 382D calls the putRecord( ) function 366, shown in FIG. 7, of outputCursor0. This causes the current record to which the variable out0Var0 has been written in statement 382A and to which the transfer has been made in statement 382C to be passed out through the outputInterface0 to its attached output data set.

Statement 382E makes another call to the transfer( ) function of Operator1, but this time specifying transferIndex0, which links inputInterface0 with outputInterface1. This causes all of the fields of the current record supplied by a data set to inputInterface0 to be passed directly without change to the current record in outputCursor1.

Then step 382F calls the putRecord( ) function of outputCursor0, causing its current record to be supplied to its associated output data set.

Figure 25:
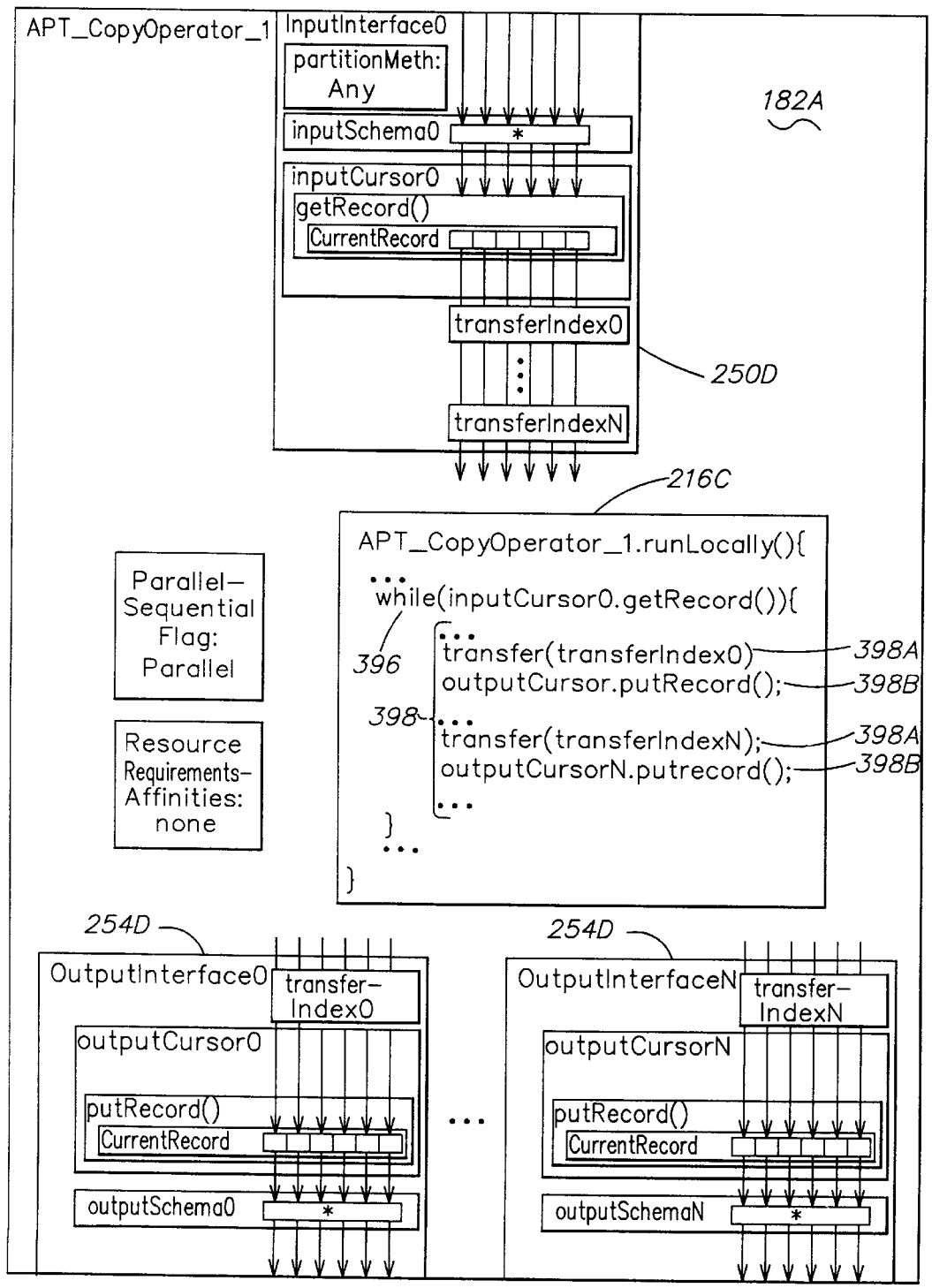
FIG. 25 is a schematic representation of an instance of the APT_CopyOperator.

FIG. 25 explains the operation of an instance 182A of the APT_CopyOperator class 182, described above briefly with regard to the OrchestrateComponentLibrary 166 of FIG. 4. A copy operator object includes one input port 250D and usually two or more output ports 254D. The runLocally( ) 216C of the copy operator object includes a "while" loop 396 which repeats statements 398 as long as a call to its input cursor's getRecord( ) returns with a record. This loop contains a pair of statements 398A and 398B associated with each of its output interfaces 254D.

The first statement of each such given pair calls the transfer( ) function with the transfer index associated with both the operator's single input interface and the specific one of its output interfaces associated with the given pair of statements 398A and 398B. This causes the entire record supplied to the input interface to be copied to the associated output interface. Then the second statement in each such pair calls the putRecord( ) function for the output cursor of the output interface, causing the entire record, which has just been transferred in the step before, to be passed out to that output interface's associated output data set.

By performing the steps 398A and 398B for each output port of the copy operator, its runLocally( ) 216C will copy each field of each record supplied to its input port to each of its output ports, enabling multiple copies of the input data set to be made.

Figures 26, 27:
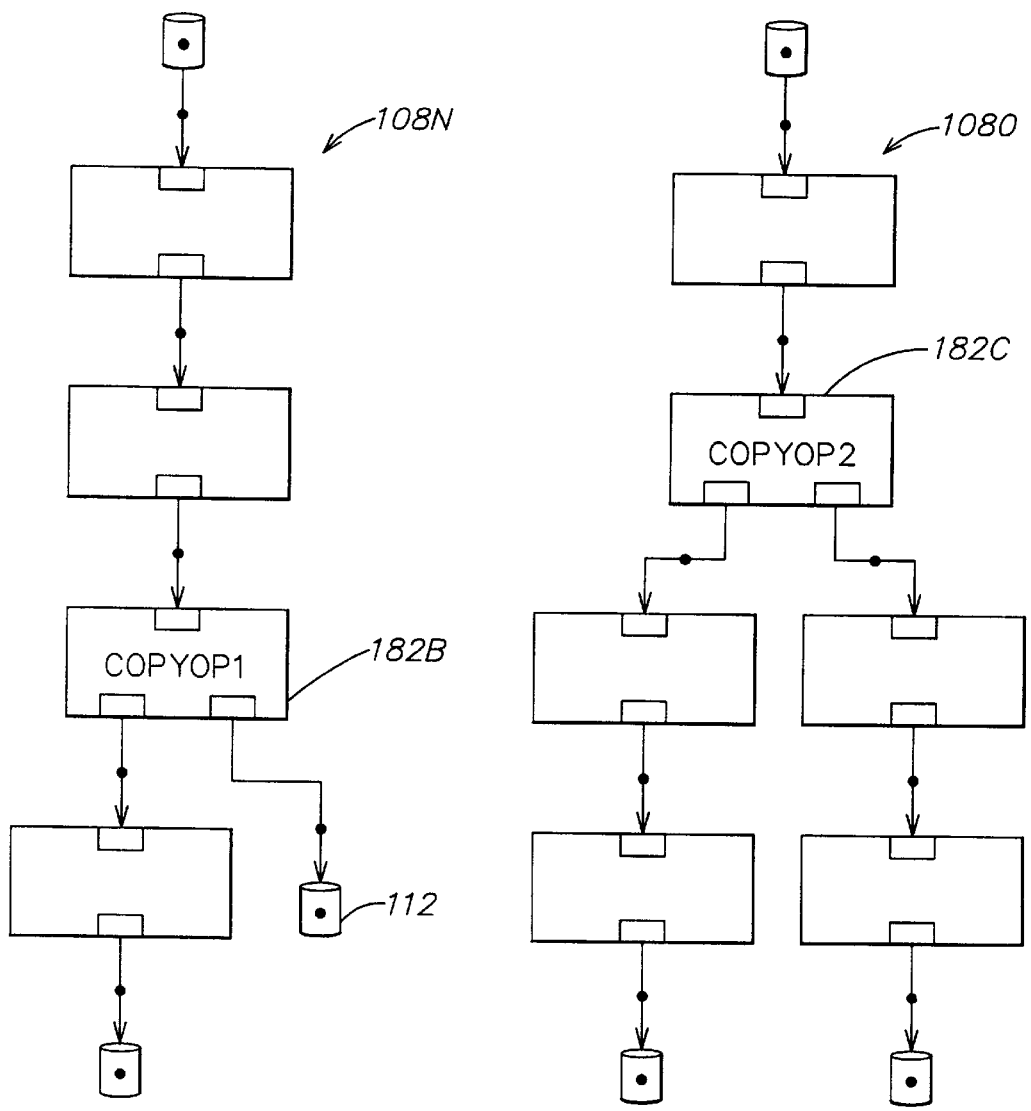
FIGS. 26 and 27 illustrate two of the ways in which an instance of the APT_CopyOperator can be used in a data flow graph.

FIG. 26 shows that such a copy operator 1 82B can be placed in a data flow graph 108N to enable a persistent data set 112 to save one copy of the data set flowing at one point of that graph for later use, while allowing another copy of that same data set to continue passing through the graph for further processing in that graph. Any operator can behave like a copy operator and produce a data set containing intermediate results in this way.

FIG. 27 shows that such a copy operator 1 82C can be inserted in a data flow graph 108O to enable the same data set to be processed by separate branches of that graph.

Figure 28:
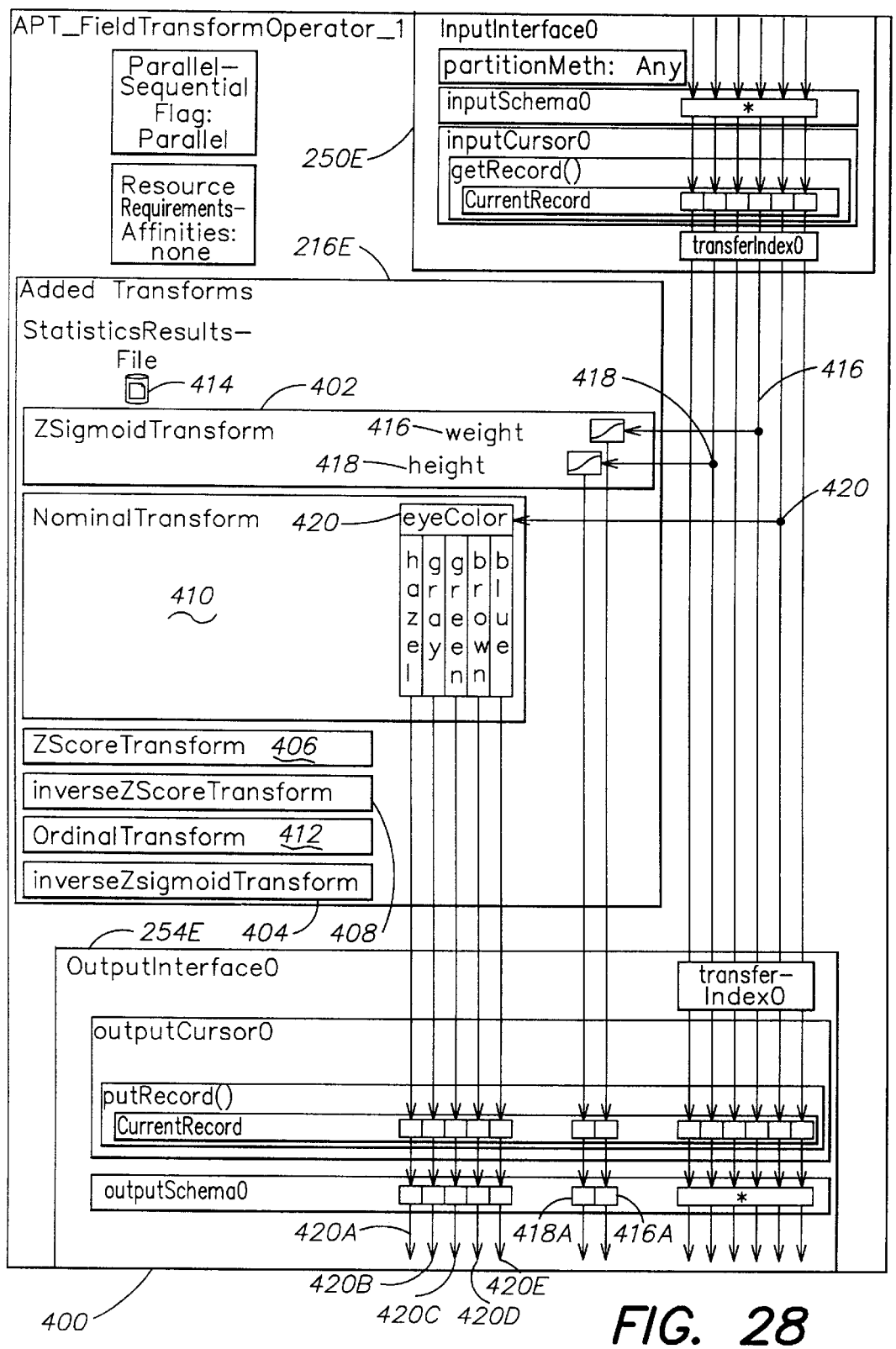
FIG. 28 is a schematic representation of an instance of the APT_FieldTransformOperator.

FIG. 28 represents the operation of a field transform operator 400, which is an instance of the APT_FieldTransformOperator class 192. As shown in FIG. 4, APT_FieldTransformOperator is one of the pre-defined operator classes provided with the OchestrateComponentsLibrary 166.

The function of a field transform operator is to transfer all of the fields of the current record supplied to its input port 250E, through a transfer( ) function call, to the output of its output port 254E. In addition, it adds one or more new fields to the output record for each of one or more fields specified in its input schema. Each such output field has a name derived from its associated input field and a value derived from that field by means of a specified transform.

The APT_FieldTransform class contains pre-defined functions for adding transforms of various types to a transform operator. This modifies a data structure used by the operator's runlocally 216E to execute each such added transform, and the operator's output interface schema to reflect the fields that are to be added as a result of it.

The transforms which can be added to a transform operator include the ZSigmoidTransform 402, the InverseZSigmoidTransform 404, the ZScoreTransform 406, the InverseZScoreTransform 408, the NominalTransform 410, and the OrdinalTransform 412. Such transform are useful in putting field values into a form in which they can be properly used by certain types of operators, particularly operators based on statistical relationships between fields. This includes the analytical operators APT_BuildModelOperator, APT_ParallelBuildModelOperator, and APT_ApplyModelOperator described below starting with FIG. 65.

The ZSigmoid transform is shown schematically in FIG. 28. It contains the name of one or more fields in the input schema of the transform operator. For each such named field, it creates an additional field in the output record which has a value which is a sigmoid function of the value of its associated named field in the input schema. As is well known in the mathematical arts, a sigmoid function is an S-shaped function which converts the value of an input variable ranging from negative infinity to positive infinity into the value of an output variable ranging from 0 to 1.

In the System 100, the sigmoid function is defined by the following equation:

$$\text{sigmoid}(f) = 1/(1+e^{-z})$$

where f is the value of a field of the data set, where z is the z-score of the field, and where sigmoid(f) equals the sigmoid value of the field calculated by the transform. Since the ZSigmoidTransformation is based on the mean and standard deviation of the entire data set, it is necessary that an instance of the APT_BasicStatistics operator 110B, shown in FIGS. 2A and 2B, have the data set, or a sizable random sample of the data set, passed through it in a previously executed graph to create a statistics results file 414, shown in FIG. 28, defining the standard deviation and mean of the data.

In the example of FIG. 28, the programmer has specified that a ZSigmoidTransform should be performed on a weight field 416 and a height field 418. This will cause two corresponding new fields 416A and 418A, respectively, to be added to the output schema of each current record, having the names weight_ZSigmoid and height_ZSigmoid, respectively.

The InverseZSigmoidTransform 404 is identical to the ZSigmoidTransform 402, except it uses the inverse of the sigmoid function for the new fields it creates. This enables field values created by the ZSigmoidTransform to be converted back to the range of the values of the fields from which they were derived.

The ZScoreTransform 406 creates a new field for each of the fields of the input schema associated with it. This new field has the name of that input schema field followed by "_ZScore" and has a value representing the number of standard deviations which the current value of that field is from the mean value of that field over all records of the current data set. Thus, like the ZSigmoidTransform, it requires that a statistics results file has been previously calculated for the data set upon which it is being used.

The InverseZScoreTransform 408 is similar to the ZScoreTransform, except that it performs the inverse of the ZScoreTransform.

The NominalTransform 410 is used with fields which represent one of a set of a discrete alternative possibilities with a numerical value, such as a field which represents a person's eye color as being either hazel, gray, green, brown, or blue, with the numbers 0, 1, 2, 3, or 4. It creates a separate Boolean output field for each of these discrete alternatives. The NominalTransform shown in the FIG. 28 converts the eye-color field 420 into five boolean fields 420A–420E, representing each of the above-mentioned five eye colors. If, for example, the value of the field 420 in a given record is 1, the field 420 associated with the color gray will have a value True, and all of the other fields associated with the colors hazel, green, brown, and blue, will have a value of False.

The OrdinalTransform 412 is similar to a NominalTransform except that it is applied to a field that consists of an ordered range of possibilities. Each given one of the multiple Boolean output fields it produces for a given input field will have a True or False value depending on whether the value of the input field corresponds to output field which is greater than or equal to, or less than or equal to, the position of that given output field in the ordered range of possibilities. An example would be an ordinal transform which received the position in which a given horse finished in a horse race, and which had as output Boolean fields Win, Place, or Show. Win would be true only if the horse came in first. Place would be true if the horse came in first or second, and Show would be true if the horse came in first, second, or third.

The OrchestrateFrameworkLibrary 168 shown in FIG. 4, includes an abstract base class definition for the APT_SubProcessOperator class 422. A diagram of this base class definition is provided in FIG. 29. As can be seen from FIG. 29, APT_SubProcessOperator class is derived from the APT_Operator class 190, shown in FIG. 9.

Figure 30:
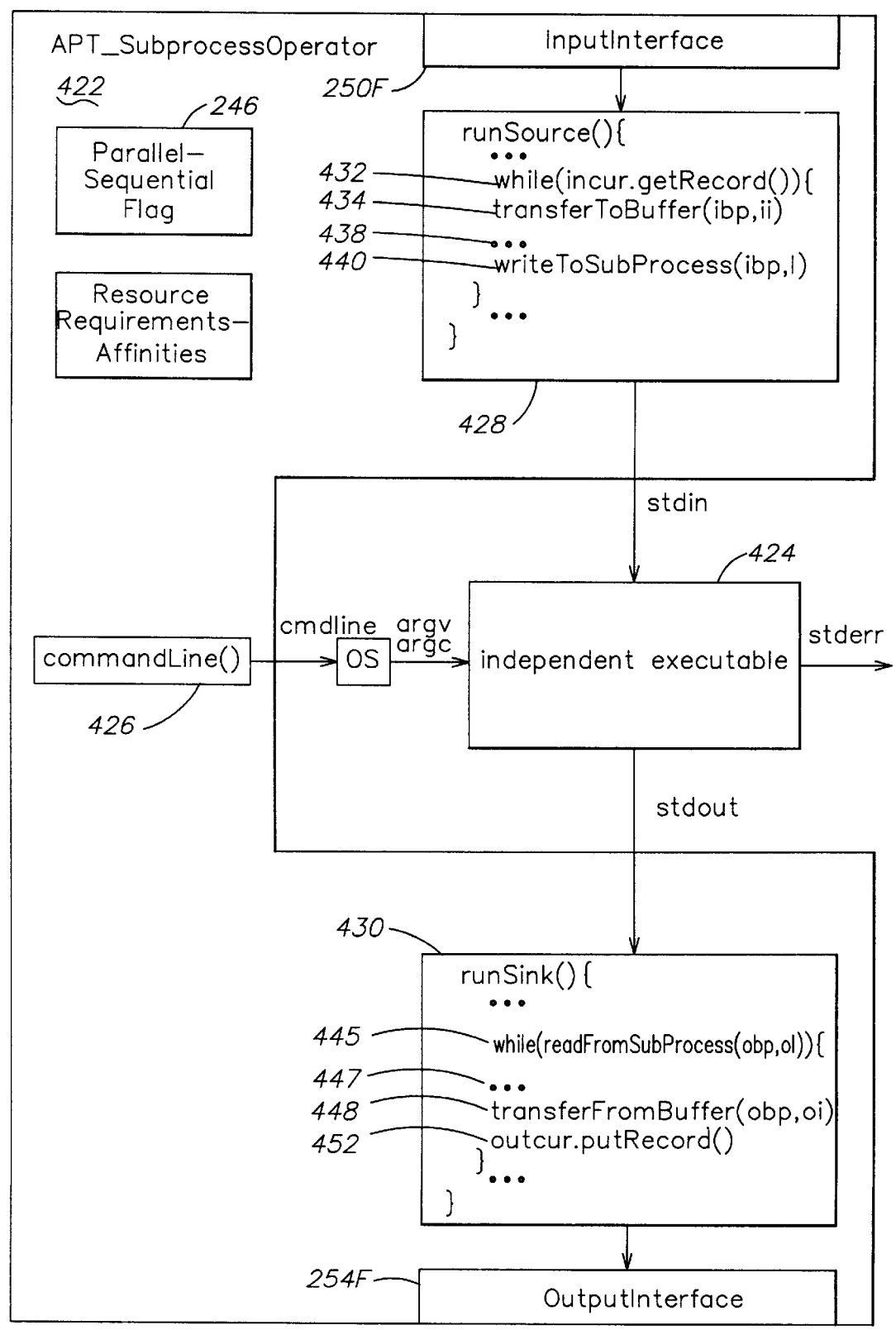
FIG. 30 is a schematic representation of an instance of the APT_SubProcessOperator class.

FIG. 30 illustrates that the purpose of the APT_SubProcessOperator is to enable execution of independent executable programs, such as the program 424 indicated schematically in FIG. 30, as part of a data flow graph. If the Parallel-Sequential Flag 246 of the subprocess operator is set to "parallel", the subprocess operator can be used to cause parallel execution of such an independent executable program in the parallel execution of a data flow graph containing that operator.

Figure 29:
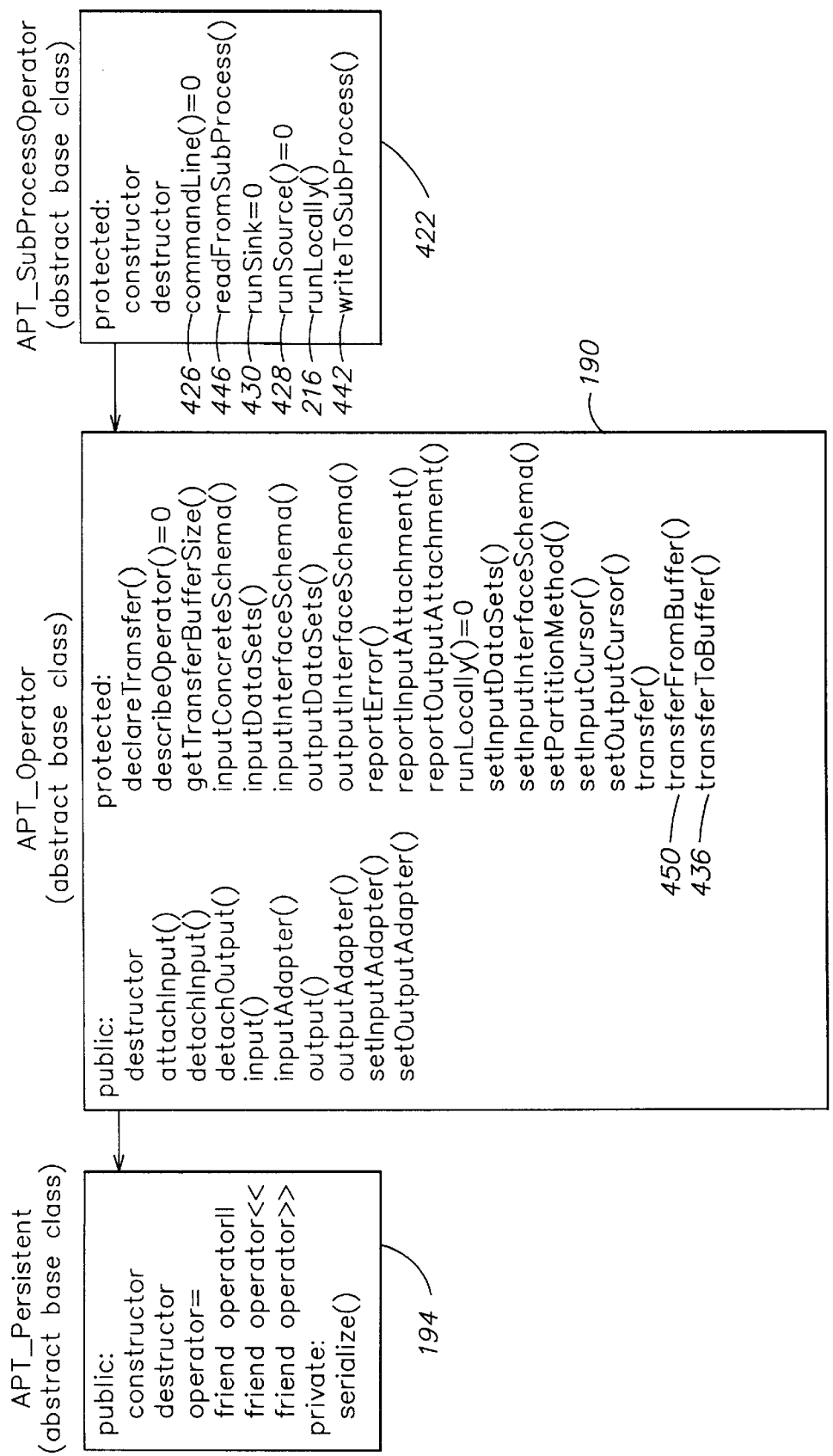
FIG. 29 represents the interface of the APT_SubProcessOperator class.

As is shown in FIG. 29, the APT_SubProcessOperator class has three virtual functions, indicated by a "=0" following their names, which the user must define when deriving a new subprocess operator class. These are the commandLine( ) function 426, the runSource( ) function 428, and the runSink( ) function 430. The user does not have to write a describeOperator( ) function since the code of the APT_SubProcessOperator class has already performed that function. The operator cannot override the runLocally( ) function, since that also has been provided by the code of the APT_SubProcessOperator class.

The commandLine function 426, should be written to return a command line that will cause execution of the desired independent program in the operating system used on the nodes of the parallel computer on which the subprocess operator is to be run. In the UNIX operating system currently being used with the system 100, this command line should not only give the name of the executable file to be executed, but also should configure the executable program to receive all input over stdin, to write all output over stdout, and to produce its error output over stdin. In other operating systems, the command line should configure the executable to operate with the corresponding communication channels. In the UNIX operating system the communications channels are pipes.

The runSource( ) function 428, performs the function of feeding records to the independent executable program through the stdin pipe. As shown in FIG. 30, this function should, among other things, include a call 432 to the getRecord( ) of the input cursor of the subprocess operator's input interface 250F. This causes the input interface to get and point to the next record in the input data set. Then, runSource should include a call 434, to the transferToBuffer( ) function 436, shown in FIG. 29. This transfers the current record to a memory buffer. Then in statements 438, which are indicated by ellipses in FIG. 30, the runSource( ) program can, if desired, perform functions on the current record stored in its buffer, such as deleting fields from it, adding fields to it, rearranging it, or reformatting it before performing a call 440, to the writeToSubProcess( ) function 442, shown in FIG. 29. This function writes the contents of runSource's buffer to the stdin pipe of the independent executable function.

Normally, the call to the input interface cursor's getRecord( ) function will be performed in the conditional statement of a while loop, as is shown in statement 432, and the calls to the transferToBuffero function, and any modification of the buffer and the writeToSubProcess( ) function will all be performed within that while loop so that the runSourcec( ) function will have the opportunity to transfer each record of the input data set to the stdin pipe of the independent executable function 424.

The third function which a user deriving a subprocess operator must define is the runSink( ) function 430 shown in FIGS. 29 and 30. As indicated in FIG. 30, this function should include a call 445, to the readFromSubProcess( ) function 446, shown in FIG. 29. This function receives data from the stdout pipe of the independent executable program 424, and places it into a memory buffer associated with the runSink( ) program. Then, in statements 447, indicated by ellipses in FIG. 30, the runSink( ) program can perform processing on the information in that record buffer if desired. Then in step 448, the runSink( ) program calls the transferFromBuffer( ) function 450, shown in FIG. 29, which transfers the record in runSink( )'s buffer to the output cursor of the output interface 254F. Then, a step 452 should call the putRecord( ) function of the output cursor to cause the current record to be supplied to the data set associated with the output interface.

Normally, the readFromSubProcess( ) function will be placed as the condition in a while loop, as is shown in step 445 of FIG. 30, and the steps 447, 448, and 452 will be placed within that while loop so that runSink( ) will repeat the steps just described for each successive record supplied by the output of the independent executable program's stdout pipe.

As will be explained below in greater detail, the runSource( ) routine, the independent executable, and the runSink( ) routine run as separate processes which communicate via pipes.

Figure 31:
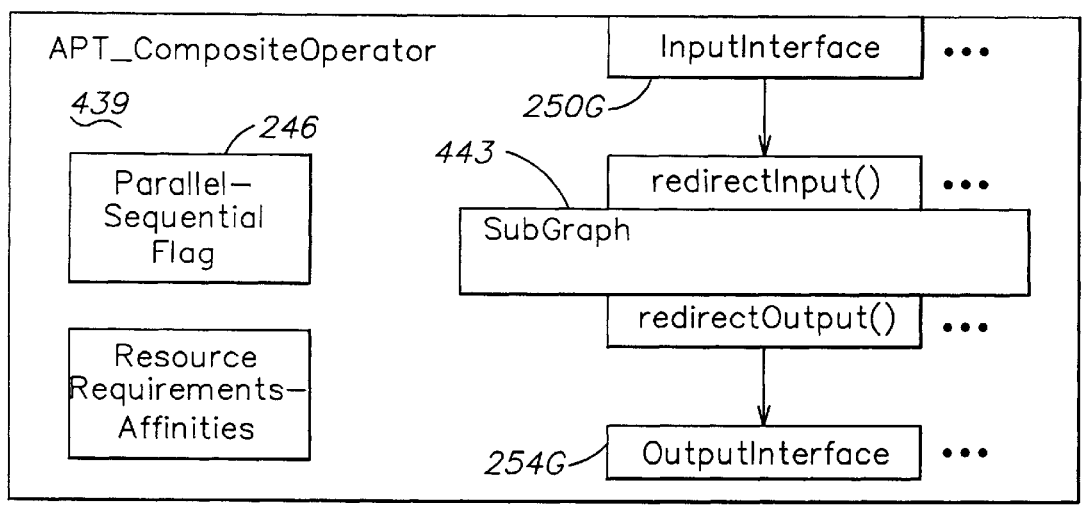
FIG. 31 is a schematic representation of an instance of the APT_CompositeOperator class.
Figure 33:
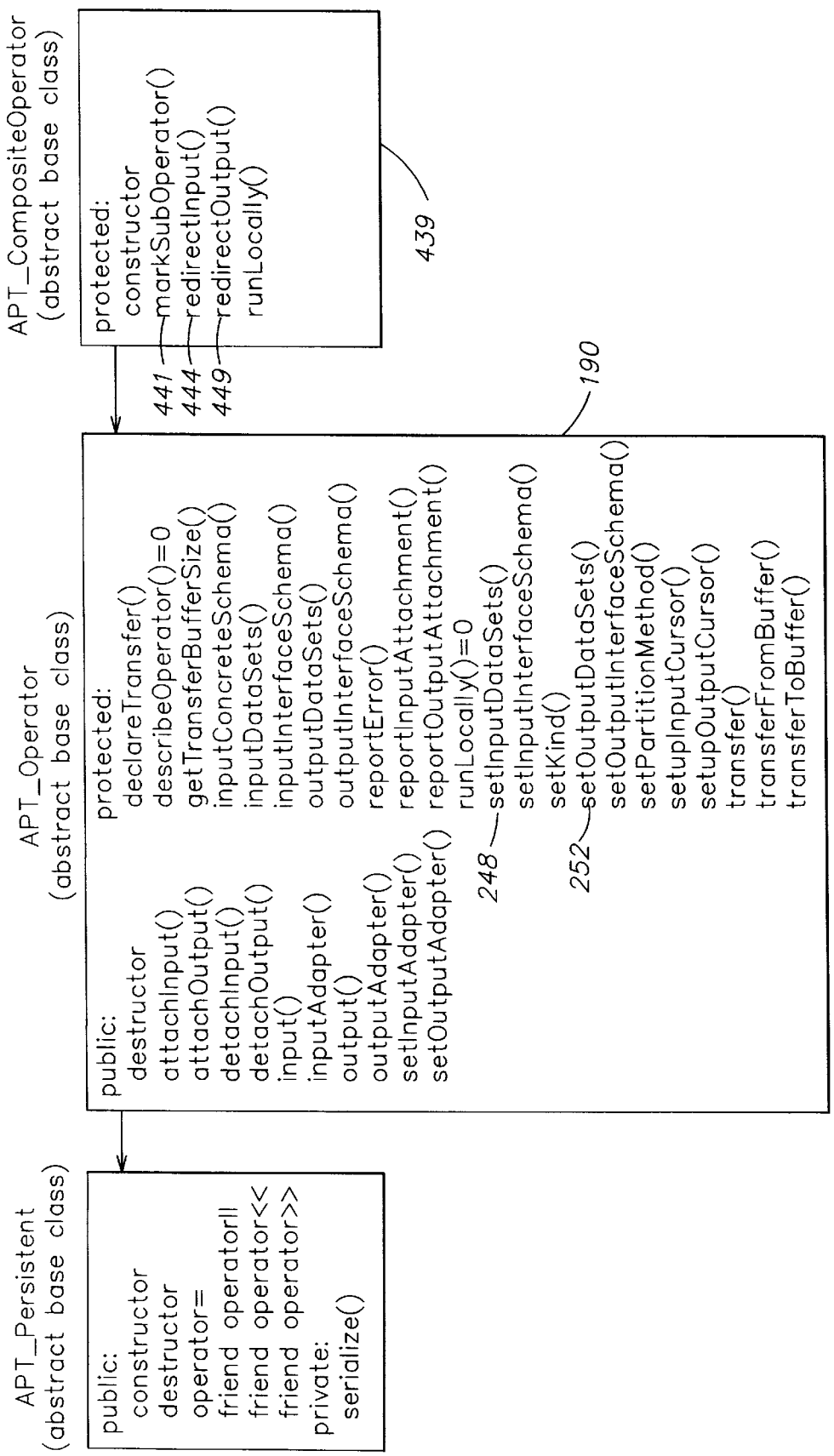
FIG. 33 represents the interface of the APT_CompositeOperator class.

FIG. 31 provides a schematic representation of an operator derived from the class APT_CompositeOperator 439, shown in FIG. 4 as part of the OrchestrateITrameworkLibrary 168. FIG. 33 represents the public class definition of the APT_CompositeOperator abstract base class 439.

As indicated in FIG. 31, the composite operator can have zero or more input interfaces 250G of the type described above. The user specifies the number of such input interfaces by the setInputDataSets( ) functions 248 of FIG. 33 which APT_CompositeOperator inherits from the APT_Operator class definition 190. Similarly, the user can specify zero or more output interfaces 254G by calling the setOutputDataSeto function 252, shown in FIG. 33.

Figure 32:
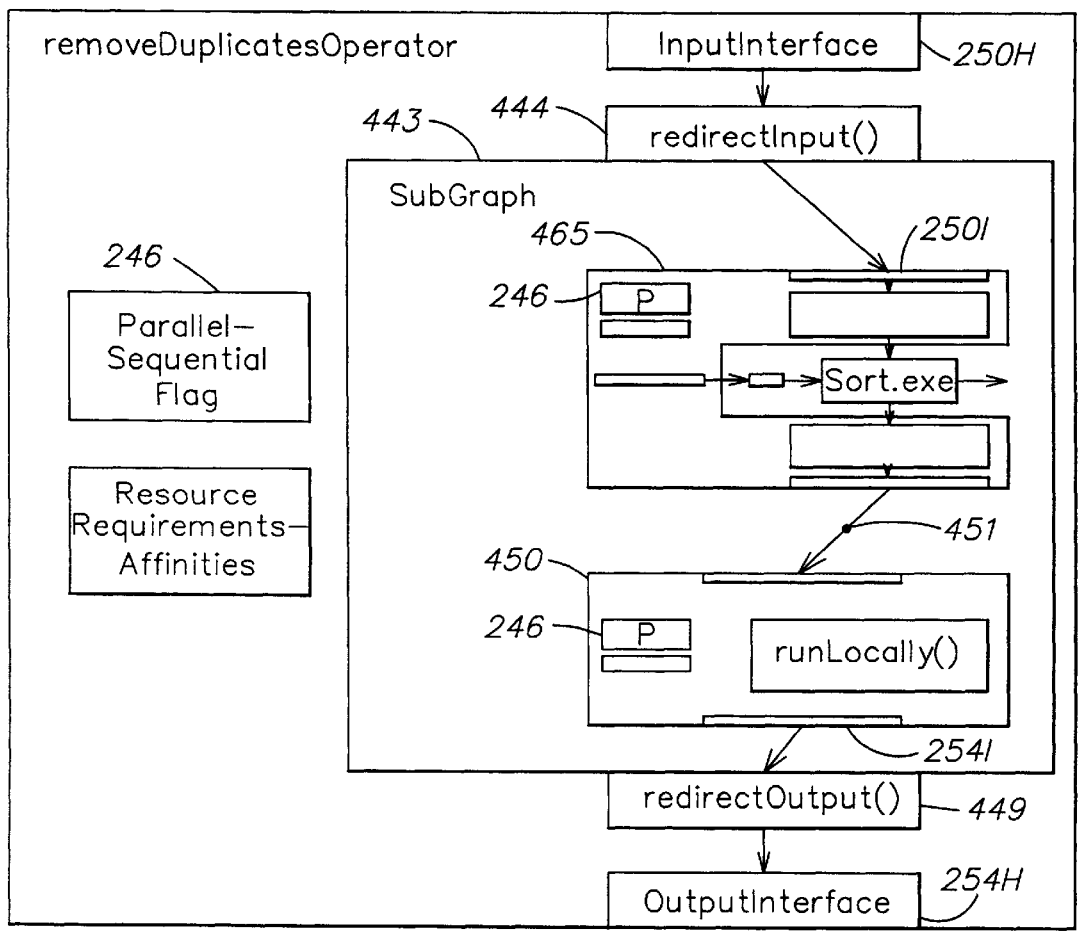
FIG. 32 is a schematic representation of removeDuplicatesOperator, a composite operator having two sub-operators.

To further define an individual composite operator class, the user should call the markSubOperator( ) function 441, shown in FIG. 33, of the composite operator base class for each operator of a subgraph 443, shown in FIGS. 31 and 32, of one or more operators which are to be included in the composite operator. The markSubOperator( ) function 441 connects operators of a subgraph to a composite operator in much the same way that the attachOperator( ) function 200, shown in FIG. 5, attaches operators of a graph to a step. A user defining a composite operator class should also call the redirectInput( )function 444, shown in FIG. 33, for each input port in the subgraph 443 which does not have a data set attached to it by a call to the attachInput( ) function of that port's operator. The call to the redirectInput( )function should specify the operator in the subgraph to which a data set's records should be redirected, such as to the operator 465 shown in FIG. 32. It should specify the number of the input interface, such as the input port 250H in FIG. 32, from which that input is to be redirected, and it should specify the number of the input interface on the operator to which it is to be connected, such as the input port 250I of operator 465 in FIG. 32.

Similarly, the user should call a redirectOutput( ) function 449, shown in FIG. 33, to receive a data set from the output of any operator in the subgraph of the composite operator which has not been connected to an output data set by a call to the attachOutput( ) function of that port's subgraph operator. This call to should similarly specify the suboperator and its output interface number from which output is to be redirected, and the output interface number on the composite operator to which the data should be redirected.

The APT_CompositeOperator class allows users of the system 100 to easily derive individual operators each of which represent a subgraph composed of one or more operators. As will be described below, when a composite operator is executed as part of a graph, each of its associated sub-operators will be executed, and if any of those operators has a parallel Parallel-Sequential flag 246, they will be executed in parallel.

Referring now to FIG. 34, a brief, highly simplified pseudo code representation of the main( ) function 178, which is provided as part of the OrchestrateFrameworkLibrary 168, shown in FIG. 4, will be described. This main( ) function gets linked in to a user-written executable program, such as UserProgram 169, shown in FIG. 4. It is the "main" process of an executable program, which is called when execution of that program first starts as a result of a command line to the operating system.

As shown in FIG. 34, the main( ) function 178 performs an initialization step 453, and then in step 454 it calls the APT_Orchestrate_main( ) function, passing to it any command line arguments which the main( ) function itself has received.

Since the user-written program is comprised entirely of the code in the APT_Orchestrate_main( ) function and any subroutines it calls, the call to the APT_Orchestrate_main( )in step 454 will not return until all of the user's code has completed execution. This will include the execution of any APT_Step.run( ) functions executed as part of the program's APT_Orchestrate_main( ) or any subroutines it calls.

Once the call to APT_Orchestrate_main( ) returns, step 456 finishes up and returns from execution of the user executable file.

FIG. 35 provides a highly simplified pseudo code which describes the APT_Step::run( ) function 204, described above with regard to FIG. 5.

As described above with regard to FIGS. 11–14, APT_Step::run( ) is called directly by or in a subroutine of, APT_Orchestrate_main( ). But in order for APT Step::run( ) to properly execute a step, a proper data flow graph linked to that step must have been previously defined. As the program executes the individual statements of a step definition, such as the step definition 290 contained in FIG. 11, it creates instances of objects and links them together in memory so as to create a data structure describing the graph which has been defined by the user program for the particular step.

As shown in FIG. 35, once the APT_Step::run( ) function has been called, a test 458 is made to see if the step has been previously checked by a call to the APT_Step::check( ) function 202, shown in FIG. 5. If not step 458 calls APT_Step::check to perform such a check.

Figure 37:
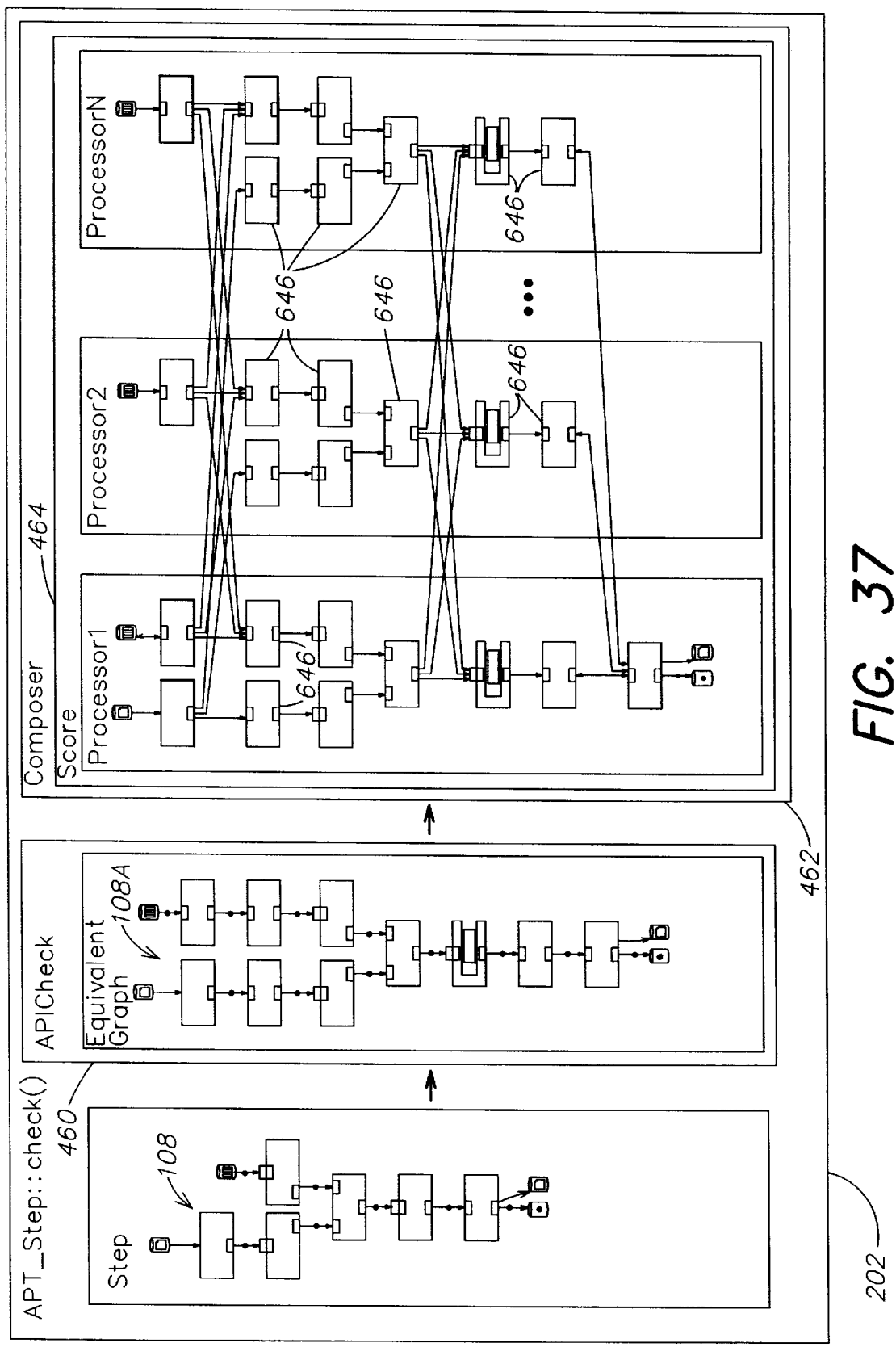
FIG. 37 is a schematic representation of how the API_Step.check( ) takes a data flow graph, checks it, if necessary converts it into an equivalent graph, and then calls the composer( ) function to creates a score which details how it is to be executed on a parallel computer.

FIG. 37 provides a very simplified representation of the operation of the APT_Step::check( ) function. Basically, the function takes the user-defined graph 108 associated with the step being executed and calls the APICheck( ) routine 460. APICheck( ) creates an equivalent graph 108A from the user-defined graph 108 associated with the step. This equivalent graph will perform the same function as that defined by the original graph 108. APICheck also tests whether the equivalent graph 108A has characteristics indicating that it cannot, or might not, run properly. If APICheck indicates the graph appears to be runnable, APT_Step::check calls a composer( ) function 462, which creates a "score" 464 from the equivalent graph. As is indicated schematically in FIG. 37, the score defines how the equivalent graph's operators are to be mapped across the various processors of the parallel computer and how its data sets are to be partitioned between such processes.

FIG. 36 provides a highly simplified pseudo code description of the APT_Step::check( ) function 202. As is shown in that figure, when the APT_Step::check( ) function is first called, one of its program steps, step 466, calls the APICheck( ) subroutine 460. FIG. 38. Provides a highly simplified pseudo code representation of the APICheck( ) subroutine.

As is shown in FIG. 38, when APICheck( ) is called, a program step 469 decomposes each composite operator in the current step by placing the composite operator's subgraph in the current data flow graph associated with the current step object for which APT_Step::run has been called. Program step 469 reconnects any data links connected to the ports of the composite operator to the corresponding ports of the subgraph operator defined by the redirectInput( ) and redirectOutput( ) functions discussed above with regard to FIGS. 31 and 32.

Once this is done, step 469 deletes the composite operator from the current graph because it has been replaced by the operators of its subgraph. This is shown schematically in FIG. 39, in which the RemoveDuplicatesOperator_1 in the user-defined graph 108, which corresponds to the operator shown in FIG. 32, is replaced by the two sub-operators 110AA and 110AB contained within the subgraph of the RemoveDuplicatesOperator_1.

After step 469 of APICheck( ) is complete, a program step 470 performs a loop comprised of steps 472 and 474 for each of the operators 110 in the current equivalent graph 108A. Step 472 tests to see if there is a data flow loop in the equivalent graph between the current operator and itself, or if there is more than a single data set arc, regardless of flow direction, between the current operator and any other operator in the graph. If so, step 472 places an error indication in an error and warning check list.

The restriction in step 472 is the only restriction on graph topology made by the current embodiment of System 100. This means the user-defined graphs can have any one of a great number of different forms and still be allowed graphs which the System 100 will attempt to execute. This is indicated in FIGS. 40A through 40G.

As is shown in FIG. 40A, the system allows the user to define a graph 108B which has a sequence of one or more operators which receive data from a file and then output data to a file persistent data set. As indicated in FIG. 40B, the system allows a graph such as graph 108C, comprised of one or more operators which receive input from a persistent file data set, but which produce no output in the form of a persistent data set. As shown in FIG. 40C, the system allows a graph 108D of one or more operators which receive no input, but which output data to a persistent data set.

As indicated in FIG. 40D, the system allows graphs such as the graph 108E, which includes a single operator which has no data flow connections to any other operator or persistent data set. For example, such an operator might make a computation and save the results to a file on the individual processor on which it operates, or it could perhaps produce output to a user console or through network connections to a specified process operating independently of the graph being parallelized.

As FIG. 40E shows, the system allows one to form a graph 108F composed of a sequence of operators which communicate with each other, but which do not output any persistent data sets.

Figure 40F:
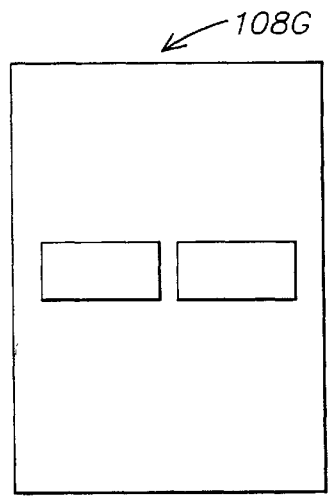

FIG. 40I illustrates that the system allows parallelization of a graph 108G comprised of a plurality of subgraphs, each having one or more operators, which arc unconnected by any data sets. For example, each of the one operator graphs shown in FIG. 40F could perform a totally independent computation, saving its results to a file on its associated processor, or communicating those results through network communication links to a process which is independent of the graph being parallelized.

Figure 40G:
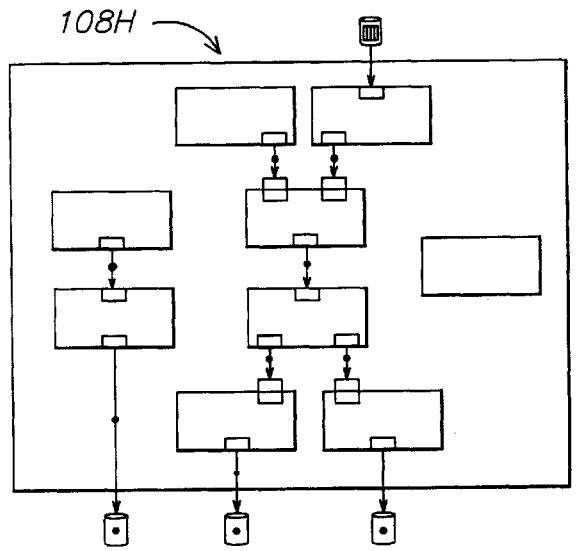

FIG. 40G indicates that the system not only allows a graph to have subgraphs which are not connected by any data sets, but it also allows graphs in which data flows from separate operators come together in one operator and in which one operator can have outputs to multiple operators.

Figure 40J:
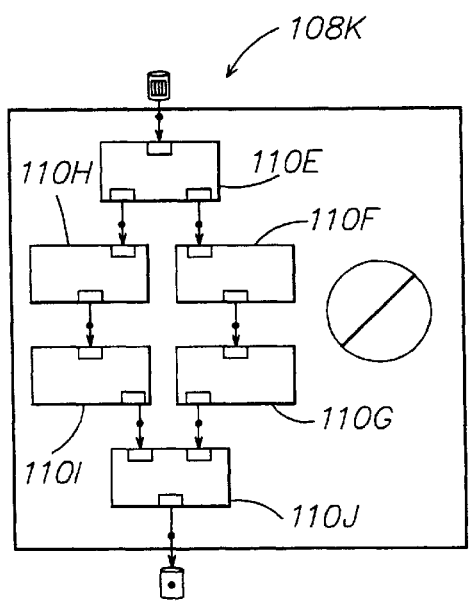

FIGS. 40H and 40J shows types of graphs which are currently not allowed by step 472. The graph in FIG. 40H is not allowed because it has a data flow loop, in which one of the outputs of the operator 110M is connected through a sequence of data links 114A–C and operators 110C–110D back to its own input.

As indicated in FIG. 40I, the computation function provided by such an illegal loop can be accomplished with the System 100 by taking that portion of the graph through which data is to be repeatedly passed, and placing it within a graph 108J whose associated step's run( ) function is placed within a C++ loop.

A portion of a program for performing such a loop is shown in FIG. 41. This program segment causes graph 108J to be executed three times. During the second and third executions of the graph, what had been the output persistent data set 112A during the previous execution becomes the input data set.

The graph 108K of FIG. 40J is not allowed according to the rule of program step 472 of FIG. 38 because there are two arcs between the operator 110E and the operator 110J. One is through operators 110F and 110G. The other is through operators 110H and 110I.

Figure 40K:
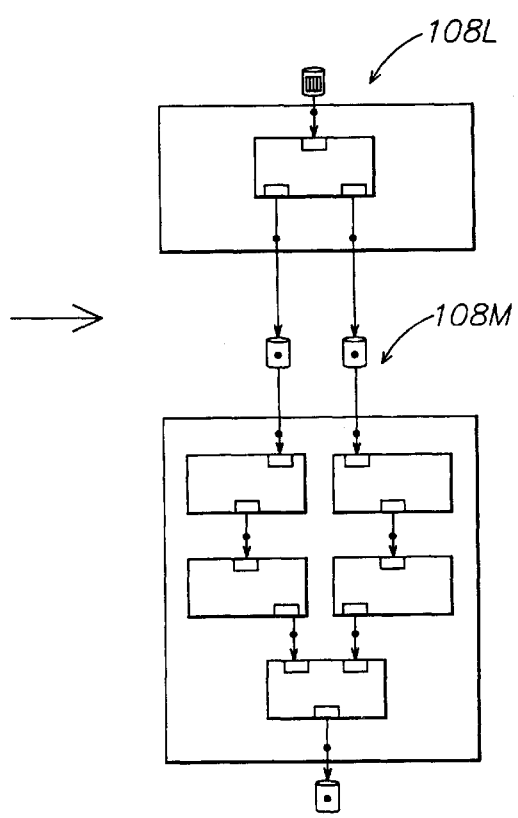

Although the graph 108K is currently prohibited by step 472, the equivalent function can be performed by combining two graphs in a user program through persistent data sets. This is illustrated by the connections of the graphs 108L and 108M in FIG. 40K.

Figure 39:
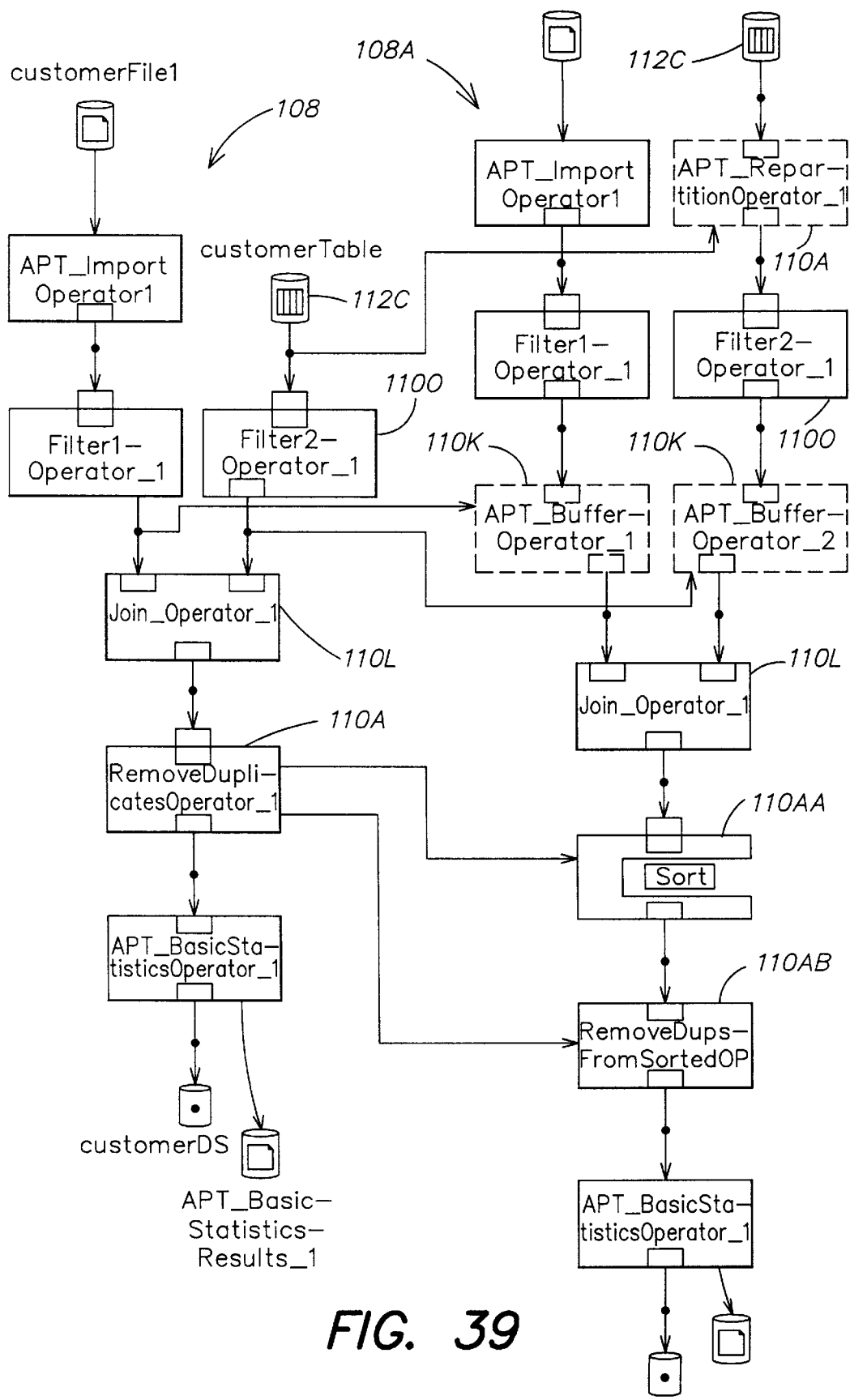
FIG. 39 represents an initial user specified data flow graph and the equivalent graph created by APICheck( )

Referring again to FIG. 38, after the step 472 has checked to see if the graph has an allowed topology, step 474 tests to see if the current operator of the loop 470 both 1) is an operator which is to be parallelized during execution of the graph, and 2) has a plurality of input ports receiving data from other operators. In this situation, step 474 may insert a buffer operator to avoid deadlock when other tests about the partitioners and the specific type of operator fail to rule out the possibility of deadlock. If this two part condition is met, step 474 will insert a buffer operator between each of the current operators input ports and the one or more operators from which it receives data. This is illustrated in FIG. 39 where buffer operators 110K are inserted above the two inputs of the JoinOperator_1 110L, because that operator receives two inputs from operators in the graph 108.

A buffer operator is an operator designed to prevent data-flow blockages during the execution of a graph. Several factors can contribute to such blockages.

Figure 42A:
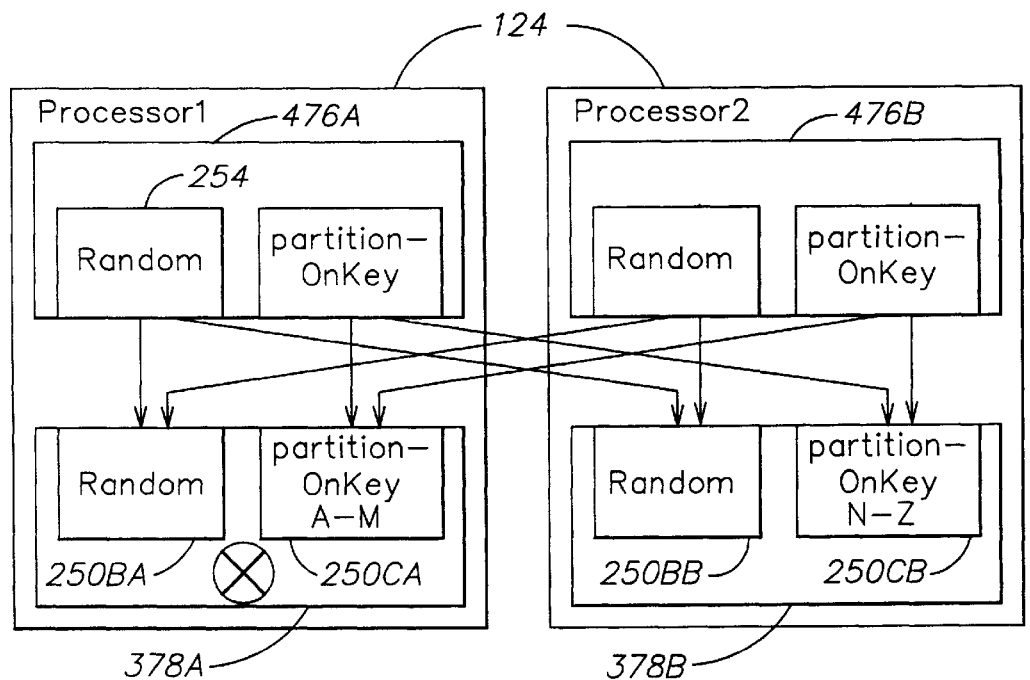
FIGS. 42A–42C provide a schematic representation of how data flow graphs in which operators have more than one input interface can become blocked and how APICheck( ) inserts buffer operators to prevent such blockage.
Figure 42B:
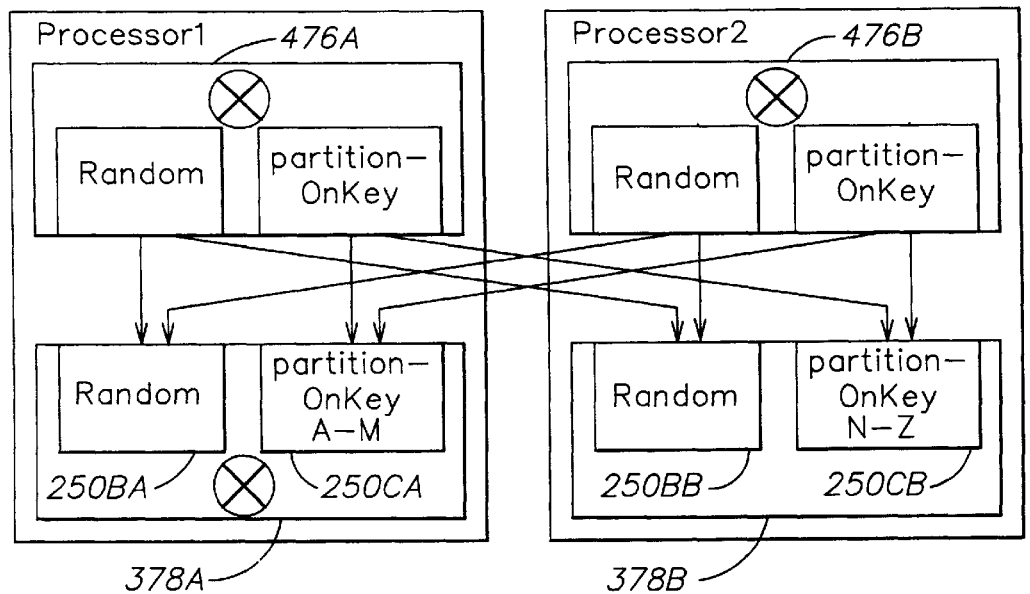

FIGS. 42A and 42B illustrate how a permanent deadlock can arise in the execution of a data flow graph. In this example we assume that the operator 378 described with regard to FIG. 24 receives input from each of two outputs of another operator 476. The example shows separate instances "A" and "B" of both operators 378 and 476 running on each of two parallel processors 124.

As is shown in FIG. 24, the operator 378 includes two input ports. The first, input 250B, has a partition method indication specifying that its data set should be partitioned between parallel instances of the input port randomly. The second input port, input 250C, has a partition method indication specifying that a partition object, partitionOnKey, should be used to partition the input supplied to its parallel instances.

The partitionOnKey object specifies that different instances of the input port 250C should receive different alphabetically sorted subset of their associated data set, based on a given field, such as a name field. In the example of FIGS. 42A–42B, the input port instance 250CA of the operator instance 378A running on a first processor receives all records in which the field starts with letters A–M, and the input port instance 250CB of the operator instance 378B running on a second processor receives all records in which the field starts with letters N–Z.

Assume, for purposes of example, that the data set supplied to input port 250C from both operator instances 476A and 476-B starts with a set of records in which the keyed-on field starts only with letters N–Z. In this case, the port instance 250CA will not receive any records for some time, causing a call to its associated getRecord( ) to not return. This causes processing of the entire operator instance 378A to be temporarily stalled, as indicated by the X in that operator instance in FIG. 42A.

The temporarily stalling of operator instance 378A will prevent it from receiving any input in its other input port instance 250BA. This can cause calls to putRecord( ) from the operator instances 476A and 476B seeking to supply data to the input port instance 250BA to block, preventing them from returning. Unless the input port instance 250CA receive input, and thus returns from its call, before both operator instances 476A and 476B attempt to put a record to the input port instance 250BA, both of those operator instances will become stalled, as is indicated by Xs in FIG. 42B. If this occurs permanent deadlock will occur because all of the operator instances which feed input to the getRecord( ) of input port instance 250CB will have become stalled as a result of the failure of that putRecord( ) call to return, and, thus, those feeding operator instances will never be able to supply the records necessary to enable the getRecord( ) call to return.

Figure 42C:
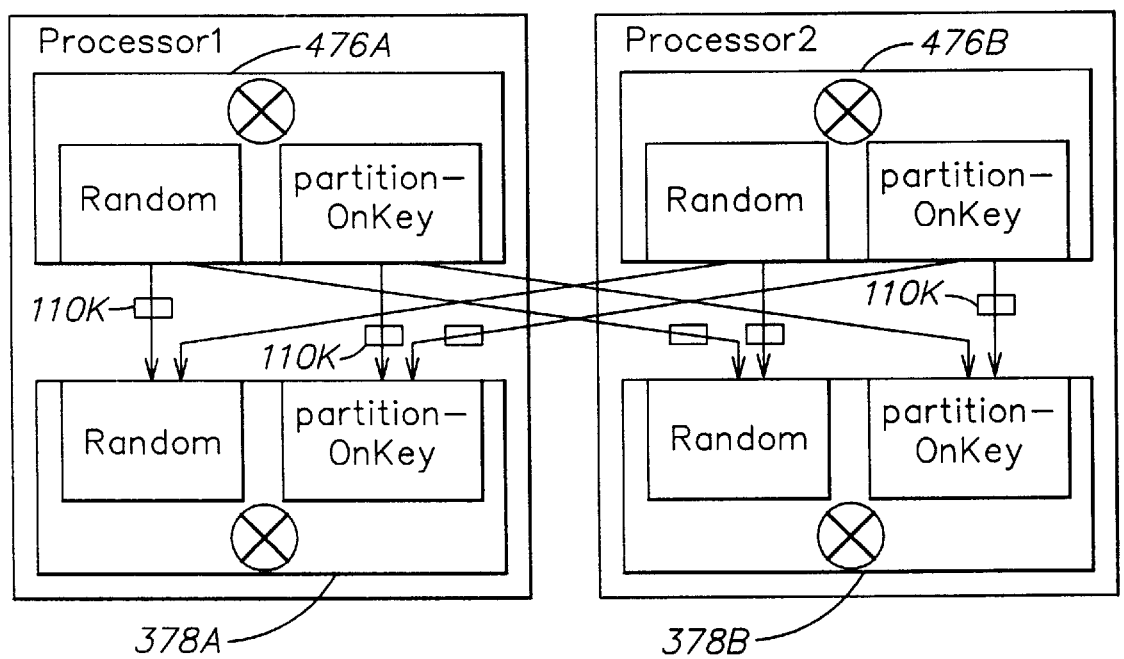

As indicated in FIG. 42C, the automatic insertion of parallel instances of a buffer operator 110K between the producing and consuming ports shown in FIGS. 42B by step 474 of FIG. 38 would prevent the deadlock shown in FIG. 42B. It would do so by enabling the output ports of the operator instances 476A and 476B to continue to output records regardless of whether or not one or more of the inputs of the instances of the operator 378A below it were temporarily blocked.

FIG. 43 provides a highly simplified pseudo code representation of the runLocally( ) function 216I run by each parallel instance of an APT_BufferOperator. This runLocally( ) contains a loop 480 which is continually repeated until the buffer operator receives an end of file from the data set that is supplied to it.

This loop includes a step 482 which tests to see if there are any records in a queue used to temporarily store records received by the buffer operator. Step 482 also tests to see if the buffer operator is able to do output to the consuming input port of the operator below it. This is done by an operating system call which enables step 482 to see if the communication channel with the consuming port is currently blocked. If the test in step 482 finds both that there is one or more records currently in the queue and that its communication channel with the operator below is unblocked, then it performs a step 484 which dequeues the first entered record in the queue and calls a nonBlockingPutRecord( ) function.

The nonBlockingPutRecord( ), unlike the standard putRecord( ), uses an operating system call which returns if it is unable to complete a write.

If the test in step 482 is successfully met and a record is output from the queue, the program flow will loop around again to step 482 and seek to output the next record in the queue. This process will be continued as long as there is still a record remaining in the queue and the buffer operator is able to perform output to the input port below it.

If neither of these conditions is met, the "else" statement 486 causes steps 487, 488, and 490 to be performed. Step 487 calls a nonBlockingGetRecord( ) function, which is different than the standard getRecord( ) in that it will return even if it is unable to obtain a record. If the call to the nonBlockingGetRecord( ) returns with a record, step 488 puts the record into the queue, from which it can be later output by steps 482 and 484. If the call to nonBlockingGetRecord( ) obtains an end of file, step 490 will enter a while loop 490A where it will execute until any records still in the queue have been delivered to the output, after which this operator exits.

The buffer operator attempts to discover by means of the sequence of get and put operations whether the data flow is blocked or merely slow. If it determines data flow is slow, the buffer operator tries to minimize buffering. If it determines data flow is blocked, it buffers aggressively to clear the deadlock.

In alternate embodiments of the invention, such deadlock is prevented by automatically buffering all records between producing output port instances and corresponding consuming input port instances. But the embodiment of the invention currently being described is designed for handling, among other things, large data base mining operations which can involve tens, hundreds, or even thousands of gigabytes of data. To freely buffer data between all operators in such a system could easily multiply the total amount of storage and time required to perform a given graph execution many fold. That is why the described embodiment of the invention uses a step 474 which selectively inserts buffer operators only at those points in a data flow graph where they appear necessary to prevent deadlock.

As described above, step 472 of FIG. 38 prevents so-called fork-joins of the type shown in FIG. 40J, in which a data flow branch from one operator ultimately comes together in a second operator. It should be noted that the provision of buffer operators by step 474 renders the disallowance of such graphs unnecessary, and other embodiments of the invention need not disallow them.

Returning now to FIG. 38, after the loop 470 has performed steps 472 and 474 for each operator in the graph, a loop 492 is performed for each operator input interface, or port, in the graph. This loop includes a nested loop 494 which is performed for each field having a field definition in the input schema associated with that output port. This includes not only the field definitions 332 shown in FIG. 16 which are defined in the user written program, but also the dynamically defined field definitions 336 of FIG. 16 which are defined at run time prior to the call to run( ) for a given graph.

The loop 494 of FIG. 38 includes a step 496 which tests to see if the schema of the data set connected to the input port has a field with a name corresponding to that of the current input schema field, taking into account any field adapters which may corresponded to that schema field. If so, the steps 498, 500, and 502 are performed. If not, step 504 indicates this fact as an error on the checklist.

If the test of step 496 is met for the schema field, step 498 maps the matching field of the data set's schema to the current input schema field in a detailed wiring of the data flow graph. Then step 500 tests to see if the data type of the data set field can be converted into the data type specified for the input schema field, given the automatic type conversions available in C++. If not, it adds an error to the checklist indicating such a problem occurred for the field. Then, step 502 tests to see if the data set field's data type can be converted into the data type of the input field without a loss of accuracy or without the conversion of a string to a number or a number to a string. If not, it adds a warning to the checklist unless the conversion is performed by a field adapter specifying no such warnings are to take place. Step 502 informs the user where automatic conversions might result in errors if the user has not properly taken such conversions into account when designing his data flow graph.

Once loop 492 has been completed for each input port in the graph, a step 506 is performed for each output port in the graph. For each such output port this loop performs steps 508 and 510.

Step 508 tests to see if the output port is connected to a persistent data set with a predefined schema definition. If the dataset does not have a predefined schema, the operator's output schema is propagated to the persistent data set. If the dataset does have a predefined schema, it performs a function equivalent to that described above with regard to steps 496, 498, 500, 502, and 504. That is it checks to see that each defined field in the output schema has a corresponding field in the predefined schema of the output data set, taking any output adapters into account. If schema correspondence is not found, it indicates an error and if schema correspondence is found, it maps the data set schema fields together. It indicates an error if the types of two fields can not be converted into each other. It indicates warnings if there is likely to be a loss of accuracy.

After step 508, step 510 of the loop 506 tests to see if the output port is linked to the input port of another operator and, if so, it associates with the output port, a partition method indication based on the partition method indication specified for the input port.

Figure 44:
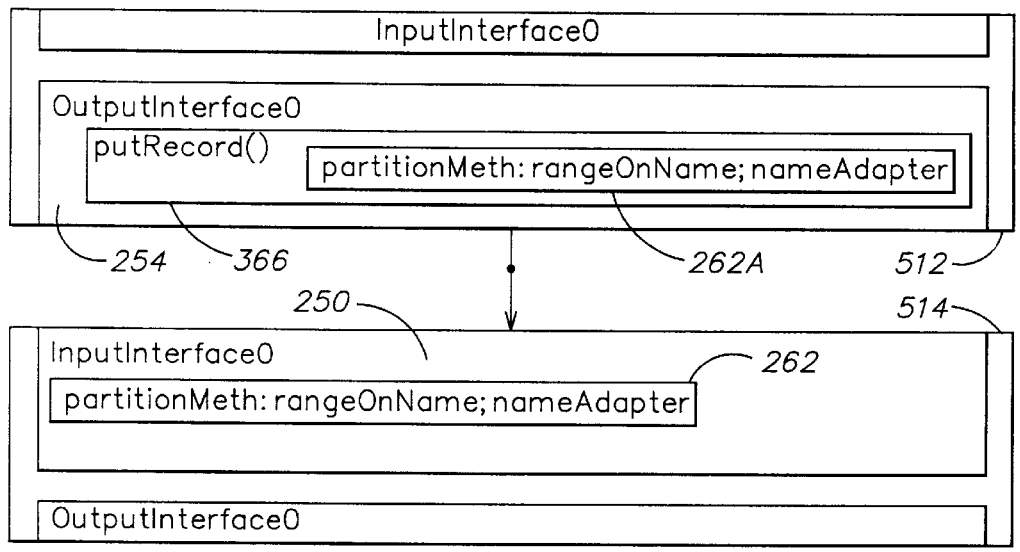
FIG. 44 is a schematic representation of the hoisting of a partition method indication from an input port of one operator to the output port of another operator which supplies records to the input port.

FIG. 44 illustrates this so-called "hoisting" of a partition method from the partition method indication 262 of an input interface 250 of an operator 514 up into the putRecord( ) function 366 associated with the output port 254 of an operator 512, where it is stored in a partition method indication 262A associated with that putRecord( ) function. As is shown in FIG. 44 the partition indication 262 includes not only the name of a partition method, in this case "RangeonName", but also it can include the name of a partition adapter object, in this case "nameAdapter".

Figure 50:
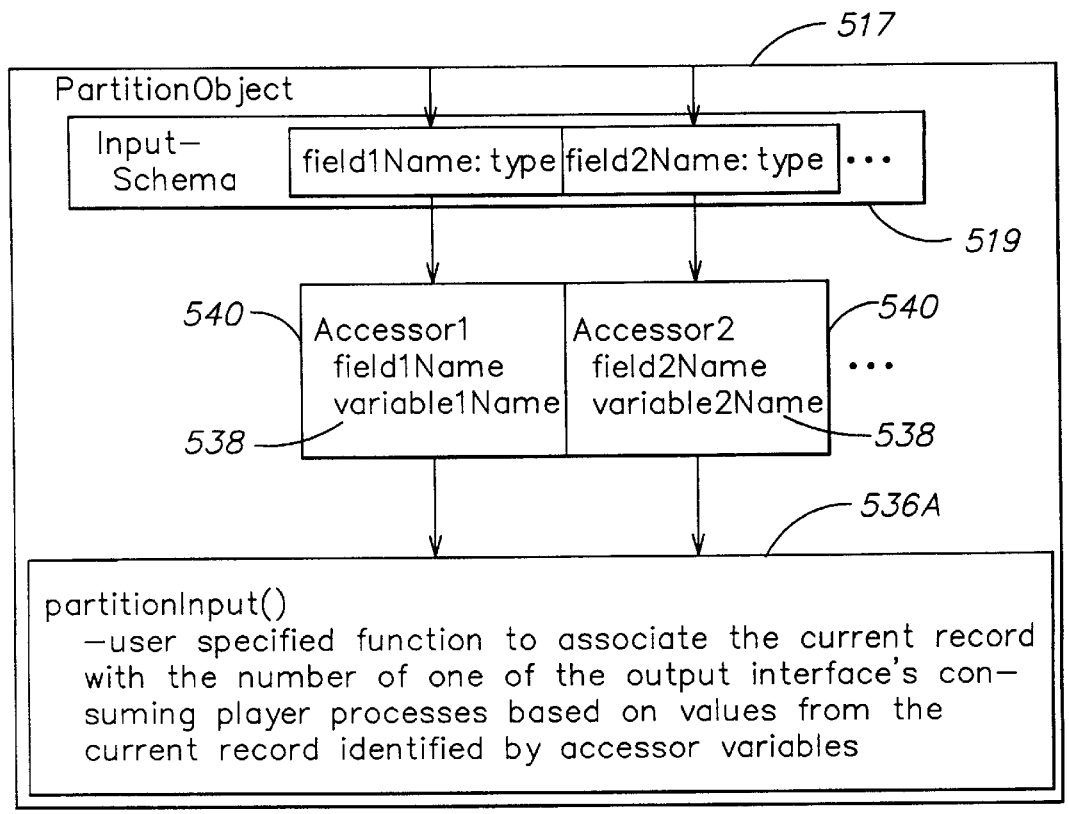
FIG. 50 is a schematic representation of an instance of a partition object derived from the APT_Partitioner abstract base class shown in FIG. 49.

The partition method indication of an input port can specify a partition method of "Same", "Any", "Round Robin", "Random", or "Entire", or it can specify a partition object, such as the partition object 517 shown in FIG. 50. Since most partitioning objects perform partitioning based on the value of one or more fields of the records to be partitioned, they usually require an input schema 519, as shown in FIG. 50, to indicate the name and type of the fields upon which they perform such partitioning. The user can attach an adapter object to such a partition object to convert the name or type of such fields to enable a partition object to be used in an operator for which it has not been specifically designed.

Figure 45:
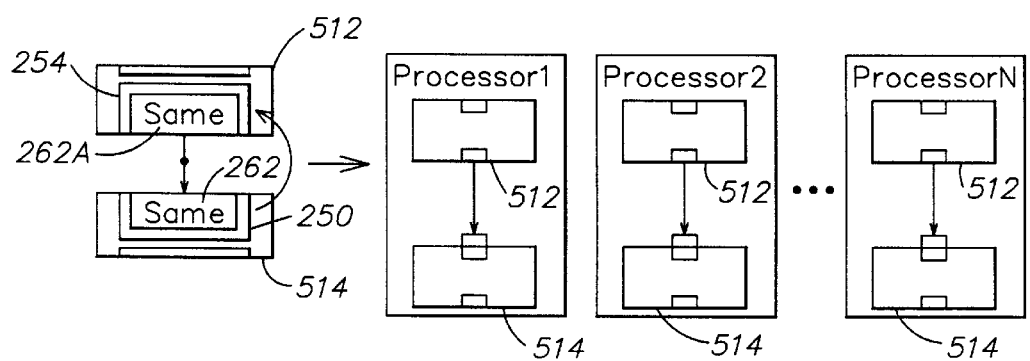
FIGS. 45, 46, and 47 are, respectively, schematic representations of the hoisting of the "Same", "Any", and "Random" partition method indications from an input port of one operator to the output port of another operator which supplies records to the input port.

As is indicated in FIG. 45, if the partitioning method indication 262 associated with the consuming operator 514 is "Same" the partition method indication 262A of the producing output port 254 will also be set to "Same". This will cause all records output by the port 254 on a given instance of the operator 512 to be output to the instance of the consuming input port of operator 514 which is being run in the same processor, as is indicated in FIG. 45.

Figure 46:
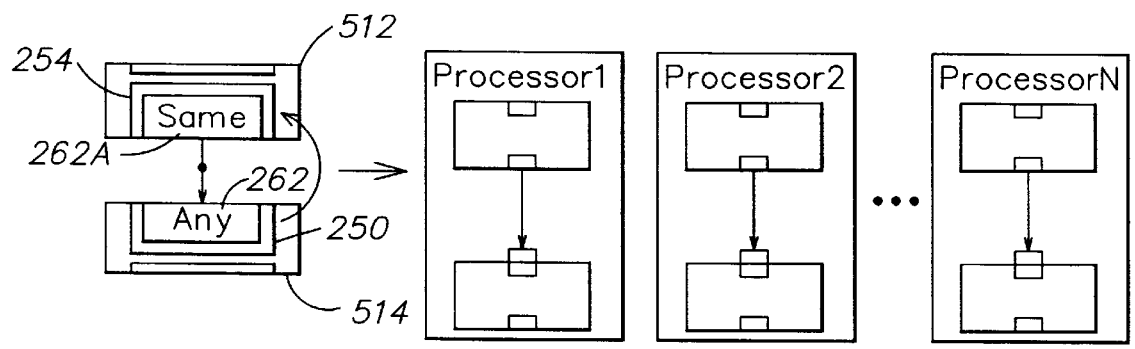

As is shown in FIG. 46 if the partitioning method 262 of the consuming input port 250 is "Any", normally the partitioning method indication 262A in the producing output port will be set to "Same", causing the same partitioning described above with regard to FIG. 45. "Any" will not be hoisted to "Same" if there is a different number of instances of the producing operator 512 and the consuming operator 514 in the score describing parallel execution of the graph. If there is such a differing number, in the current embodiment of the invention "Any" will be hoisted to the partitioning method indication 262A of the producing output port 254 as "Round Robin".

Figure 47:
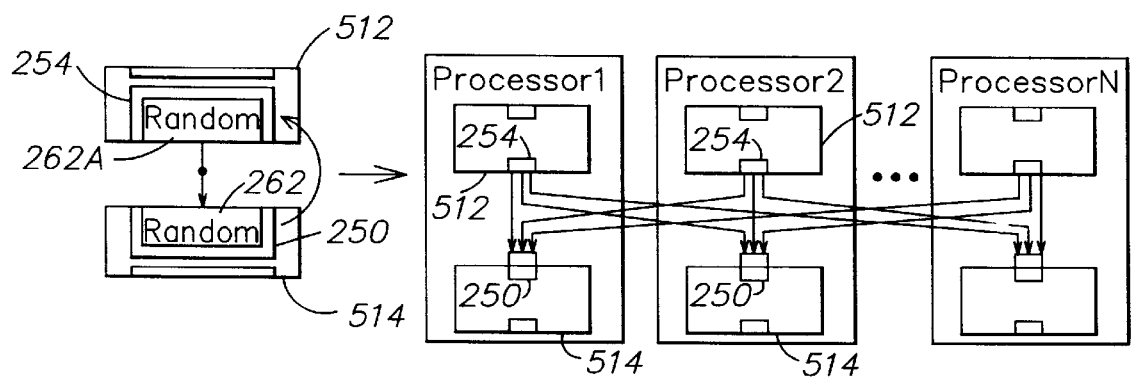

As is shown in FIG. 47, if the partition method indicated by the partition method indication 262 of the consuming input port 250 is other than "Same" or "Any", that partition method will be hoisted to the partition method indication 262A of its associated producing output port 254. This will result in a partitioning scheme in which each instance of the output port 254 in the parallel execution of the graph will supply output partitioned according to the method described in its partition method indication 262A to each of the one or more instances of its consuming input port 250.

Figure 48:
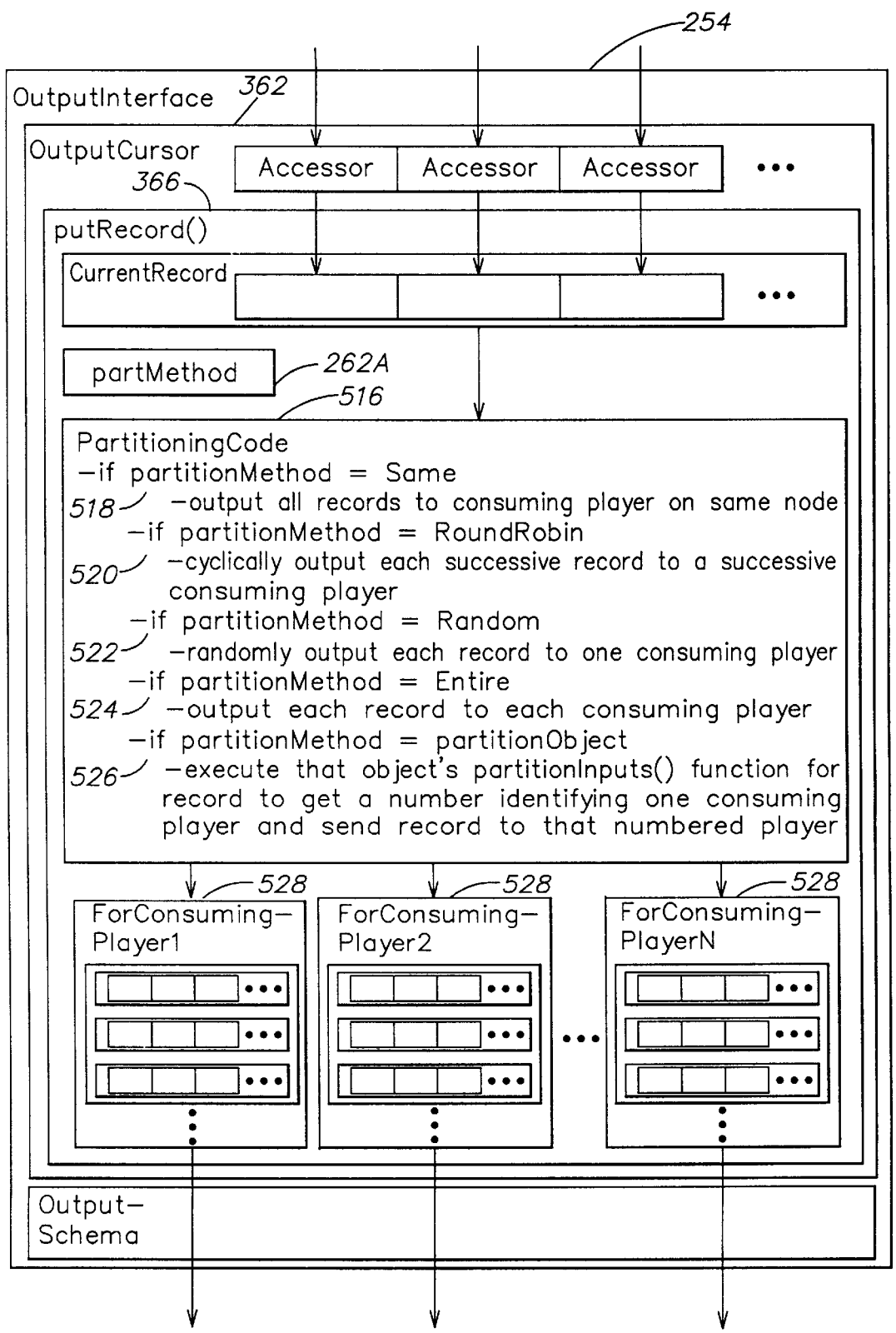
FIG. 48 is a schematic representation of the partitioning performed by an operator's output interface.

FIG. 48 illustrates the partitioning code 516 of the putRecord( ) function an output port 254.

As can be seen from that figure, if the partitioning method indication 262A has been set to "Same", a step 518 will cause all records output by the current putRecord( ) function to be supplied only to the persistent data set partition or the instance of a consuming input port located on the same processor node, as shown in FIG. 45.

If the partition method indicated is "Round Robin" a step 520 will cause putRecord( ) to cyclically output each successive record to a successive instance of the consuming input port. If the partition method is "Random", step 522 will cause putRecord to randomly allocate each record output to one instance of the consuming input port. If the partition method is "Entire", step 524 will cause putRecord( ) to output each record to each instance of the consuming input port. Finally, if the partition method indication is a name of a partition object, then a step 526 will execute that partition object's partitionInput( ) function for the current record to get a number identifying which instance of the consuming input port the record should be sent to, and then step 526 will send that record to that numbered input port instance.

As is indicated in FIG. 48, putRecord( ) assembles a block 528 of records for each of the one or more instances of its associated consuming input port according to the partitioning code 516.

For purposes of efficiency all communications with data sets by the operator instances in the system 100 is performed in blocks of records. This is done to reduce the amount of overhead associated with communications between processes, with disk, or with external data bases. Thus a call to putRecord( ) actually merely places a record into one of the blocks 528, unless that record completes a block, in which case it causes the entire block to be sent to the data set. Similarly, a call to getRecord( ) normally returns with a record from a block 528 which is buffered in its associated input cursor object, unless that block is empty, in which case it will seek to obtain the next such block from its attached data set.

Figure 49:
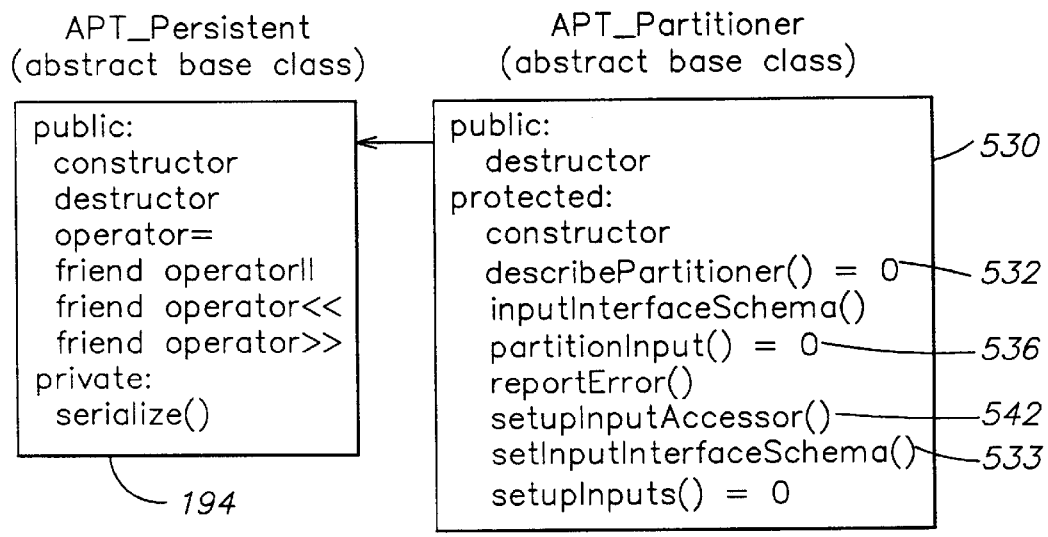
FIG. 49 represents the interface of the APT_Partitioner abstract base class.

FIG. 49 represents the APT_Partitioner abstract base class definition. If a user seeks to define her or his own partitioning object she or he can do so by deriving a class defining that object from the APT_Partitioner class 530. To do so, the user must write a new describePartitioner( ) 532 function to override the virtual declaration of that function in the abstract base class definition. The new describePartitioner( ) would normally include a call to setInputInterfaceSchema( ) 533, which is used to define the input schema 519, of the type shown in FIG. 50, of a partition object. To define a partition object the user must also override the virtual partitionInput( ) function 536 with his or her own partition input function 536A, as is shown in FIG. 50.

As is indicated in FIG. 50, this function should include a user specified operation for associating the current record with the number of one of the input port instances consuming records from the partition object's output port. Normally, partitionInput( ) makes this association based on one or more field values in the record. PartitionInput( ) code accesses the value of such fields through accessors variables 538 defined by accessors 540, which are associated with fields in the partition object's input schema 519. The user should call the setupInputAccessor( ) function 542 to set up such accessors.

Figure 51:
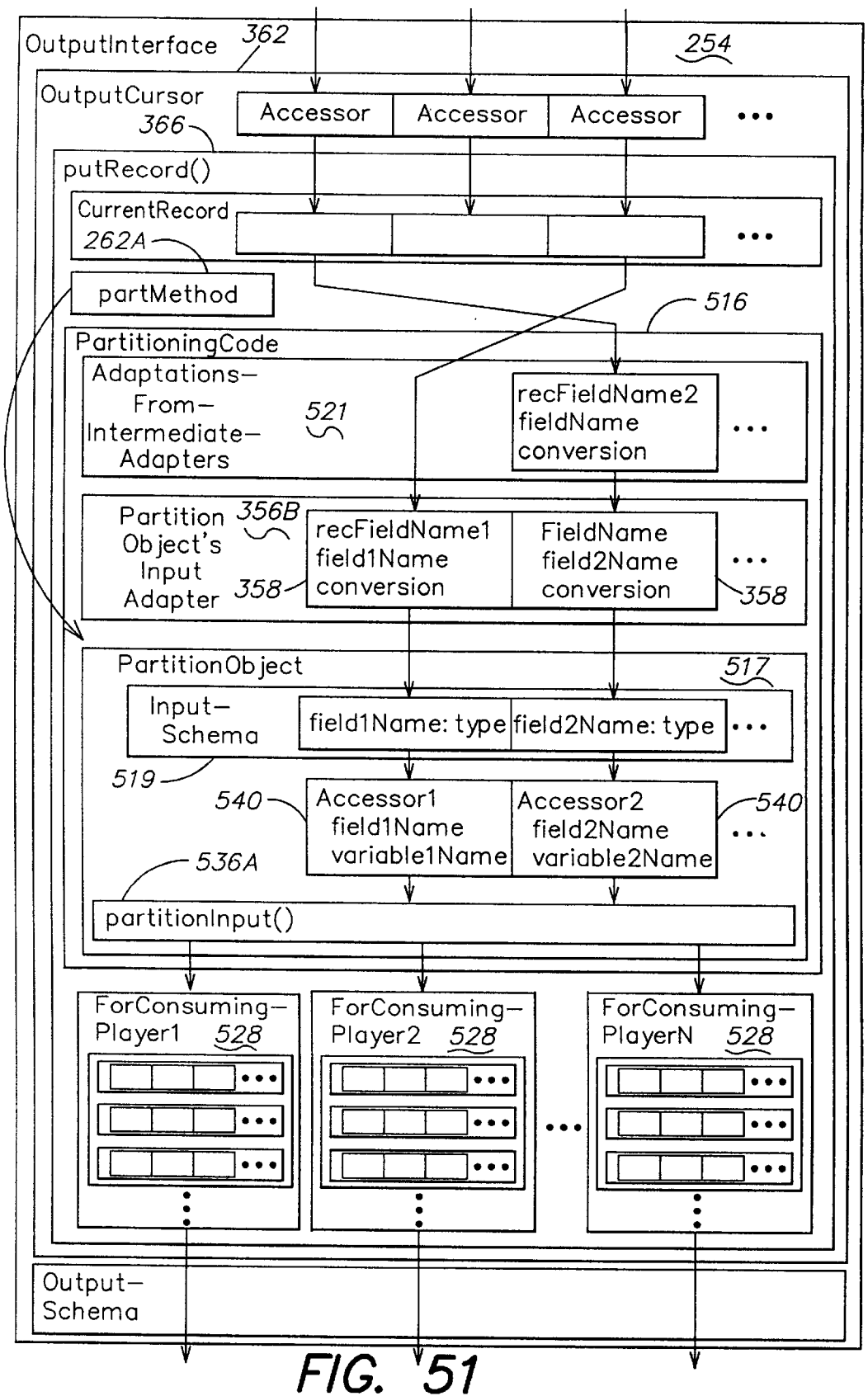
FIG. 51 is a schematic representation of a partitioning object of the type shown in FIG. 50 is used in an operator's output interface.

FIG. 51 corresponds to FIG. 48 except that it provides a schematic representation of the partitioning code 516 shown in FIG. 48 when the condition of step 526 shown in FIG. 48 is met. In this case, the partition method associated with the putRecord( ) function 366 is defined by a partition object 517 of the type shown in FIG. 50.

In the example of FIG. 51, it is assume that when the user called the setPartitionMethod( ) function 260 shown in FIG. 9 when defining the operator from which the partition object 517 has been hoisted, he or she specified an inputAdapter( ) 356B to be associated with the input schema 519 of the partition object. Such an input adapter is the same type of object and is created and defined in the same manner as the inputAdapter 356 described above with regard to FIG. 18.

When a partition object gets hoisted from the consuming input of one operator to the putRecord( ) function of the producing output of the operator upstream of it in the data-flow graph, it not only brings with it its own adapter object, if any, but it also brings with it any input or output adapters which might be connected with the fields of the partition object's input schema 519 between that consuming input port and that producing output port. This is indicated in FIG. 51 by the one or more field adapters indicated at 521.

Thus, it can be seen that a partition object which has been designed for generalized use can be customized for use with the input schema of a given input port by associating an input adapter 356B with the partition object's input schema. It can also be seen that when the partition object is hoisted to the output port upstream, any intermediate adapters which have been provided to enable proper matching between the output schema of the output port and the input schema of the input port will also be taken into account to enable the partition object's partitionInput( ) 536A to access the proper fields of putRecord's current record for purposes of partitioning.

Returning one again to FIG. 38, once the loop 506 has been performed for all of the output ports in the current data flow graph, a step 544 tests to see if there are any entries in the checklist containing any errors or warnings. If so, it performs steps 546 and 548. Step 546 displays the checkList, and a step 548 tests to see if there are any errors listed in the checkList, in which case the APICheck function returns with an error message.

If there are no error messages in the checklist step 550 returns with an indication that the APICheck was performed successfully.

Referring again to FIG. 36, once the call to APICheck in step 466 of APT_Step.check returns, a step 552 tests to see if APICheck returned with an error message. If so, the step 552 returns with an error message either to step 458 of APT_Step.run( ) shown in FIG. 35, or, if APT_Step.check has been called directly from within a user written program, to that program. If, on the other hand, the call to APICheck in step 466 of FIG. 36 returns successfully, a step 554 will call the composer( ) function 462.

FIGS. 52A(1), 52A(2), and 52B provides a highly simplified pseudo code description of this composer( ) function.

As shown in FIG. 52A(1) and 52A(2), composer( ) starts with a step 558 which creates an initial score data structure. Then a step 560 lists in the score all of the operators attached in the current step object for which APT_Step.run( ) is currently being called.

Next a step 562 adds to the score a list of all the data sets which are attached to the current step object, indicating for each data set the ports of the operators it is attached to.

Then a step 564 lists in the score all the nodes, or processors, to be used in the execution of the current step object's graph, as is determined by the environmental variable 328 shown in FIG. 4, by the number of processors listed in the config.apt file 326 shown in FIG. 4, and by whether or not the graph includes any parallelizable operators, as indicated by the Parallel-Sequential flag 246 of each of the graph's operators.

Once this is done, step 566 lists in the score all the player processes to be associated with the execution of the parallel graph. A player is a process created for executing an instance of an operator. Step 566 creates one separate player process for each sequential operator and normally it creates P player processes for each parallel operator, where P is the number of parallel processors stated to be available in the parallel computer in the configuration file 326 shown in FIG. 4.

There are some situations in which a parallelizable operator will not have a player created for each of the P parallel processors. One would be if the parallel instances of that operator are reading from a file persistent data set which has a slightly smaller number of data partitions than the number P, in which case the composer in step 566 might decide that it would be more efficient to run slightly fewer instances of the operator consuming data from that partitioned data set than it would be to re-partition that data set.

Another exception would exist if the resource-requirements-affinities data structure 569 shown in FIG. 10 associated with an operator states that the operator has or desires special attributes on the processor node on which it is to run, such as large memory, local hard disk access, or very large local hard disk, or available licenses for a sub-process application product. In such a case step 566 would compare the requirements and desires for resources stated in the resource-requirements-affinities indication 569 of the operator and compare them to the resources and resource affinities stated in the configuration file 326 of the system, shown in FIG. 4. If the operator stated it had a requirement for a given hardware resource, step 566 would only create a player for processor nodes which met those requirements, indicating an error if it could not. If the resource-requirements-affinities indication 569 indicates that an operator has an affinity for a certain resource, the step 566 can make a determination based on such factors as whether or not running players of the operator only on nodes which have the desired resources would be likely to cost more in terms of repartitioning overhead than would be likely to be expended because a given player of the operator was executed on a node having other than the operator's desired resource configuration.

In some embodiments of the invention step 566 also decides which operators should have players on which processors as the function's affinities stated in the configuration file. For example, if the configuration file contains a statement that sequential operators requiring a large amount of memory should be run on a specific given node, even though one or more other nodes might also have that same amount of memory, step 566 will take that affinity statement into consideration when deciding where to run a given sequential operator.

Once step 566 has determined on which one or more nodes each of the operators of the current graph should have player processes, step 568 places links in the score connecting each operator listed in step 560 to each of the one or more players which have been created for it in step 566.

Then, step 570 places links in the score between each player and the processor nodes on which it is to run.

Next step 572 sets a flag for each data set which is connected to the output of an operator, indicating whether or not that data set is to use the "same" partitioning method indicated in FIGS. 45 and 46, which will cause the output port producing that data set to send records only to the player of its consuming operator located on the same node. Step 574 then performs a loop for each persistent data set in the current graph. This loop consists of three conditional tests 576, 578, and 580 depending upon the type of the persistent data set for which the current iteration of loop 574 is being performed.

If the current persistent data set object identifies an RDBMS query string 590 as shown in FIG. 53, then the condition of step 576 will be met, causing steps 582 through 588 to be performed. FIG. 53 provides an illustration of such a case.

Step 582 tests to see if the operator consuming the current data set has more than one player. If so, steps 584 and 586 will be performed. Step 584 tests to see if the partitioning method of the input port consuming the data set is other than "Entire". If so, step 586 inserts a sequential repartitioning operator between the data set and the consuming input port. This is shown in FIG. 53 in which a repartition operator 110N is inserted between an RDBMS table 112 through a data set in which a user query 590 has been associated.

Once step 582 and 584 has determined if a repartition operator is required, step 588 places the query string associated with the RDBMS data set into the score in association with that data set, so players of the operator connected to the data set will be able to read the score and issue the user specified query to the RDBMS containing the table.

Steps 576, 582, 584, 586, and 588 enable the user to program a data flow graph which receives data from a specified RDBMS table through a user specified query at any input interface in his data flow graph. FIG. 53 provides an illustration of such a connection. System 100 provides the capability to perform such queries with a plurality of different RDBMSs including Oracle and IBM's DB2 Parallel Edition.

If the persistent data set object for which the loop 574 is currently being performed specifies an RDBMS table without specifying a complete user query to be used with that table, the test of step 578 will be met, in which case, if the data set is connected to an input port, the step 592 will cause its substeps to be executed or, if the data set is connected to an output port, step 595 will cause its substep to be executed.

If the data set is connected to an input port, steps 594–606 will be performed. Step 594 logs on to the data base in which the RDBMS table is located. Then step 596 locks the RDBMS table for read only access. Then a step 598 finds the range of records associated with the table in the data base. Next, step 600 places a query string written in the table's RDBMS language in the score in association with the data set. This query requests all records from the table which occupy a subrange of the table's total range of records. The subrange is expressed as a predicate in the RDBMS query language. In the preferred embodiment the predicate constructed for an Oracle RDBMS table specifies records in a given ROWID range, and for a DB2 RDBMS table, the predicate specifies records local to a given database node. The predicate uses RDBMS bind variables to specify the Oracle ROWID range endpoints or the DB2 node number. This predicate will be used for defining a subrange of records to be requested by a given instance of the operator which is to read from the data base. Next, a step 602 divides the table's total range of records determined from step 598 into a number of such subranges corresponding to the number of players which the operator consuming the data set is to have.

A step 603 then tests if the operator receiving the current data set has more than one player. If so, step 603 will cause a step 605 to test to see if the input port receiving the data set specifies the partitioning method "Any", or "Same" where "Same" can appropriately be used to receive input from the data base table without repartitioning. If not, step 605 inserts a repartitioning operator between the given input port and the data set. Likewise, if the RDBMS table is already partitioned in a shared nothing style database such as DB2, then a repartitioning operator is inserted if required in order to match the number of reading operators with the number of database nodes over which the database table is partitioned.

Then a step 604 performs a loop for each such player. In each iteration of this loop a step 606 places in the score for the player's input port values which define the specific subrange of records to be supplied to it. These values are interpreted as RDBMS bind variable values of the bind variables used in the table partitioning predicate. That is, when actual parallel execution of a graph occurs each such player will separately log on to the table's associated data base and associate an RDBMS cursor with the query string created by step 600 specifying these values written in step 606 for the bind variables contained in the query. This will enable each instance of the player process to receive a separate partitioned subset of the RDBMS table supplied to its input port. If, as is often the case the parallel RDBMS system is executing on the same parallel computer as the graph, each player process will log onto the parallel instance of the RDBMS resident on its own processor, enabling the execution of the read from the parallel data base to have the appearance indicated in FIG. 81.

If the current persistent data set for which the loop 574 is being performed is an RDBMS table connected to the output of an operator, step 595 will cause a step 608 to place an RDBMS insert statement written in the table's RDBMS language in the score in association with the given data set. When parallel execution of the graph takes place each player of the outputting operator will log onto the RDBMS and use this statement to execute a parallel write to, the RDBMS database.

If the current persistent data set is other than an RDBMS data set, step 580 will test to see if the data set is connected to an input port which requires repartitioning of the data set, and if so, it inserts a repartition operator between that data set and the consuming operator. This condition can be met if the number of partitions of the file persistent data set is different than that of the players of the consuming process to which it is connected. It will also be met unless the consuming process specifies a partitioning method other than "Any" or unless it specifies "Same" and the data has the same number of partitions as the number of consuming player processes.

Once the loop 574 has been completed for each persistent data set in the data flow graph currently being executed, the composer function 462 is complete and a step 610 will return to the function that called it.

Returning to FIG. 36, when the call to the composer in step 554 returns, a step 612 again calls the APICheck routine 460 shown in FIG. 38 to recheck the flow graph with any repartitioning and buffering operators which may have been inserted into it by the composer function shown in FIGS. 52A(1), 52A(2) and 52B. This second call to APICheck takes much less time than its first call because the first call creates a data structure indicating which of the current graph's structures have already been appropriately checked. This enables the second call to APICheck to avoid rechecking graph elements that have already been fully checked.

If the call to the APICheck in step 612 returns with an error message, step 614 also returns from the step checks function with that error message. Otherwise, a step 616 calls a createOutputFiles( ) function, not shown in the figures, to create an output file for each file persistent data set in the score and table for each output RDBMS dataset in the score for which an appropriate file or table does not already exist.

Once this is done the operation of APT_Step::check is complete and a step 618 returns to the function that called it.

Returning now to FIG. 35, when the call to APT_Step::check in step 458 returns, step 620 tests to see if APT_Step::check( ) returned with an error message. If so, APT_Step::run( ) will return to the user program which invoked it with that error message.

If APT_Step::check( ) returned successfully, a step 621 tests to see if an environment variable APT_RUN_SEQUENTIALLY stored in the environmental variables 328, shown in FIG. 4, is set to PARALLEL. If so, it calls the parallelRun( ) routine 623 illustrated in FIG. 54. ParallelRun( ) performs parallel execution of the current graph on multiple processor nodes with a separate computational process for each separate player in the score. If APT_RUN_SEQUENTIALLY is not PARALLEL, step 625 calls a simulatedParallelRun( ) routine 627 illustrated in FIG. 62. This routine executes the graph on only one or two processes on a single node to make debugging much easier, but it makes a separate call to the runLocally( ) of each operator in the graph for each player associated with that operator in the score. This simulates parallel execution by partitioning the data and causing the separate partitions of that data to move through separately executed runLocally( )'s (in this case separate subroutine calls) as if the graph were being executed by parallelRun( ). After the completion of the call to either parallelRun( ) or simulatedParallelRun( ) step 629 will return from the call to APT_Step.run( ).

FIG. 54 provides a highly simplified pseudo code representation of parallelRun( ).

As shown in that figure, step 622 of that function serializes the score 464, shown schematically in FIG. 37, which has been created by the composer routine. This serialization takes an object oriented representation of the score created in RAM and converts it into a stream of serial data suitable for transmission over a network communication link or archiving to disk.

Once this serialization is complete, step 624 calls the Unix RSH, or remote shell command to create a section leader process on each processor node of the parallel computer executing the graph which has any players associated with it in the graph's score. Each such process executes the same executable file as the conductor process which is performing parallelRun( ). The remote shell command issued in step 624, however, contains command line argument specifying that the node should run the executable as a section leader. The command line arguments also inform the section leader process the name of the processor node on which the conductor process is running and the port address on the parallel computer's high speed network through which the section leader process can communicate with the conductor.

FIGS. 57A–57H illustrate the processes and the communications links between them which exist during different phases of parallelRun( )'s execution. It illustrates the plurality of processors 1 through N on which these various processes are executed with numerals 124A 124B, and 124C.

Figure 57C:
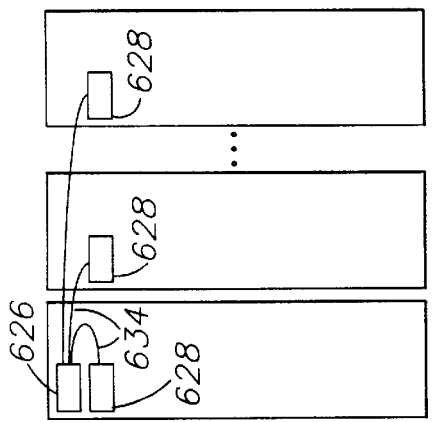
FIGS. 57A–57H are schematic representations of the conductor, section leader, and player processes, and the connections between them, which exist at various phases in the parallel execution of a data flow graph.
Figure 57F:
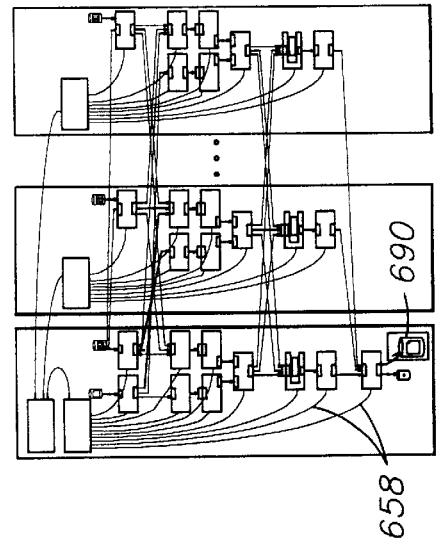
Figure 57B:
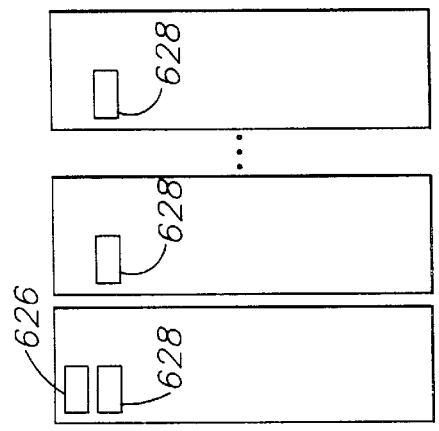
Figure 57E:
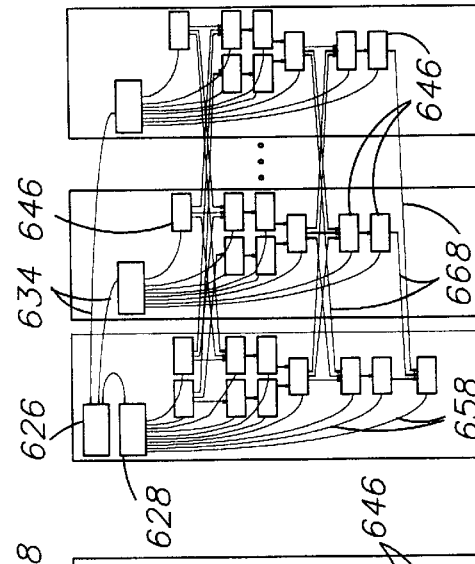
Figure 57A:
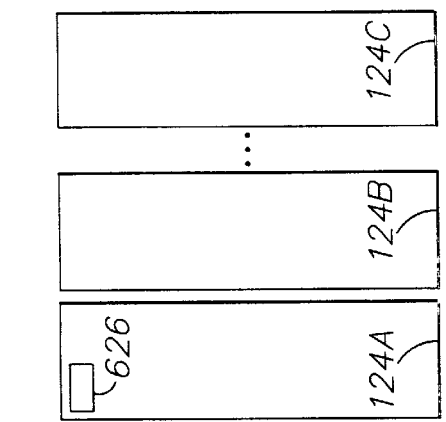

FIG. 57A illustrates the situation which exists before step 624 calls the RSH command for each processor node on which player processes are to be run. At this time there is only one process involved in parallelRun( ), that is the conductor process 626 in processor node 124A.

FIG. 57B illustrate the status of parallelRun( ) immediately after step 624 has been executed. At this time a separate section leader process 628 will have been created on each of the N processor nodes.

As soon as step 624 of parallelRun( ) has created a new section leader process, that new process starts to execute the same executable program as parallelRun( ), starting at the beginning of that program's main( ) function 178, which has been linked into the user written program as indicated in FIG. 4 from the Orchestrate Framework Library. As described above with regard to FIG. 34, step 630 of the main( ) routine will detect that the command line arguments with which the section leader process has been called indicate that it is to execute as a section leader, and thus step 631 of main( ) will call the sectionLeader( ) routine 635 shown in FIG. 55.

As shown in FIG. 55, when the sectionLeader subroutine has been called in the sectionLeader process, a step 632 will establish a communication link with the port of the conductor process identified in the remote shell command line issued in step 624 of FIG. 54 which created the section leader process. When step 632 has been completed by each section leader, the conductor 626 will be connected to each of the section leaders 628 by a high-speed network communication link 634 as is indicated in FIG. 57C.

Next, a step 636 in the parallelRun( ) function of the conductor process shown in FIG. 54 sends a message to each section leader telling it its node number. Upon receiving this message, each section leader executes a step 638, shown in FIG. 55, in which it stores that node number in its memory space.

Then, a step 640 in the conductor's parallelRun( ) sends a message to each section leader to use the same default directory as the conductor, so file references made relative to the conductor in the code being executed by the section leader will all be relative to the same default directory as that used by the conductor. It then sends a message with all environment variables and their values to each section leader.

Step 642 of parallelRun( ) then sends a message to each section leader telling it to begin normal execution. When a given section leader process receives this message, step 644 of sectionLeader( ) shown in FIG. 55 causes that section leader process to fork a number of time equal to the number of player processes which have been associated with the section leaders' processor node in the score.

For each such fork step 644 of the sectionLeader performs step 641, 643, and 645. Step 641 increments a player-within-node variable in its memory space, so the player process created by the fork will be able to find its corresponding player in the score. Step 643 performs the fork. Finally, step 645 tests to see, once the fork has been performed if the current process executing step 645 is the child of the fork, in which case it is a player process 646 shown in FIG. 57D. If so, step 647 calls the player( ) routine 648, shown in FIG. 56, which has been linked into the user written program, as is illustrated in FIG. 4, from the Orchestrate Framework Library 168. Step 649 ceases execution of the player process once the player routine is complete.

The test of step 645 is necessary because immediately after a fork is created two separate process will be executing the forked program in two isolated processes in memory which are for all practical purposes totally identical, down to the fact that they leave the fork executing the next instruction in their identical copies of their program. The only difference between the parent process which existed before the fork and the child process created by the fork is that the return value from the call to the fork returns with one value for the parent process and another for the child. It is this return value which is tested in step 645 and which lets a child process know it is to function as a player process and the parent process know that it is to keep functioning as a section leader.

Figure 57D:
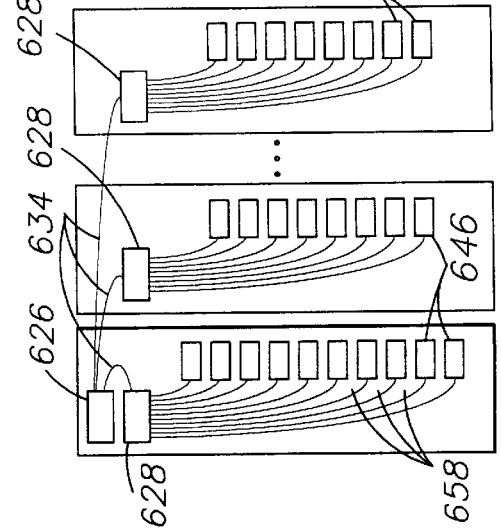

Next step 650 of the conductor's parallelrun( ) broadcasts the scores to all of the section leaders over the communication links 634 shown in FIG. 57D. When this happens, step 652 in the sectionLeader( ) routine of FIG. 55, writes the score to a file on its node. Then the section leader sends a message through Unix pipes created with its player processes during the forking of step 643 indicating that a UNIX domain socket should be created between the section leader and each such player for purposes of control communication during graph execution. In response a step 656 on the player( ) routine 648 of FIG. 56 will perform the steps necessary to complete such a control connection.

FIG. 57D illustrates the state of the parallelRun( ) at this point. As shown in that figure, the conductor 626 is connected via a high speed network link 634 with each of the section leaders 628, and each of the section leaders 628 is connected through a UNIX socket pair control connection 658 with each of the player processes 646 located on its processor node.

After the system attains the state indicated in FIG. 57D the sectionLeader routine functions largely to relay messages between the conductor and individual players through the communication network shown in FIGS. 57D14 F, as is indicated schematically by the step 659 in FIG. 55.

Once this has been done a step 660 of the conductor's parallelRun( ) shown in FIG. 54 sends a message to each player to reload the score which the player's section leader saved in a known file on the player's processor in step 652 of sectionLeader( ), described above. When this happens, step 662 in of each player process's player( ) routine 648 responds by reading the score from disk into its memory partition and then un-serializing the score so as to recreate the score's object-oriented data structure in the individual player's memory partition.

Next, step 664 of the conductor's parallelRun( ) sends a message to each player to set up all of the communication channels corresponding to the virtual data set links which it has with other player processes. In response, step 666 of each player's player( ) routine makes the specified connections. Once this has been done by each player, the parallel execution of the graphs can be illustrated as in FIG. 57E. This is similar to the step shown in 57D, except that the player processes 646 are now interconnected by the high speed network communication links 668 which are used for the graph's virtual data set communication.

Then parallelRun( ) executes steps 670 and 696. Step 670 broadcasts a message to all players telling them to start executing their associated runLocally( )s. Step 696 broadcasts a sync message to all of the players. This sync message will cause each player, once it has returned from its call to its run runLocally( ) to send a sync message back to the parallelRun( ). After executing, step 696, the conductor's parallelRun( ) will do nothing except waiting for, and counting the sync messages which are returned from the players. This period of relative inactivity is indicated in FIG. 35 by the step 698.

In response to the message to execute runLocally( )s sent by step 670 of parallelrun step 672 in each player's player( ) routine finds the operator in the score which has the same player-within-node number as the player inherited from the fork which gave birth to it within the loop 644 of the sectionLeader routine.

Next, step 674 of each player's player( ) function opens the file or files associated with its associated partition of any file persistent data set which the score indicates is connected to one of its input or output ports for reading or writing, respectively. As stated above, persistent file data sets have an object associated with them which identifies the plurality of actual disk files. It is through this identification that the player( ) routine opens the correct file(s). In most instances when a player process is connected with a file persistent data set, the one or more files associated with that partition of the data set are located on its individual node.

On completion of step 674, a step 676 in the player code performs a loop, comprised of steps 678, 680, 682, 684, and 686, for each RDBMS statement string associated in the score with a port of the current player's operator. Step 678 issues a command to connect to the RDBMS associated with the statement by issuing a command to the RDBMS's API located on the player's node. Step 680 then calls the RDBMS's parser and sends it the statement string. Then step 682 receives a cursor handle returned by the RDBMS's parser and step 684 uses the cursor handle to send the RDBMS values for any bind variables which might be contained in the statement string, such as the values defining the table subrange which have been placed in the score in association with an individual player, as described above, by step 606 or 608 by the composer shown in FIGS. 52A(1), 52(2), and 52(B). The RDBMS cursor prepared in this way enables each individual instance of a player to have a separate read or write connection to the data set's RDBMS table through the instance of the RDBMS running on its own node.

As operators invoke getRecord( ) or putRecord( ) on input or output cursors associated with RDBMS data sets the system issues corresponding RDBMS fetch or execute calls using the RDBMS cursor prepared in the current player process. If the RDBMS API supports array fetch or array execute operations, then the system uses these operations to fetch or insert blocks of data set records at a time.

Once a player's persistent data set connections, if any, have been completed by its steps 674–686, its step 688 calls the runLocally( ) routine of the player's associated operator.

Once this is done actual parallel execution of the graph begins. The runlocally( )s of individual player instances start calling getRecord( ), performing operators upon the data received, and calling putRecord( ). As a result, data starts flowing into the graph from files and persistent data, through its operators and virtual data sets, and out to any persistent data sets or any files written directly from within runLocally( ) code.

Figure 58:
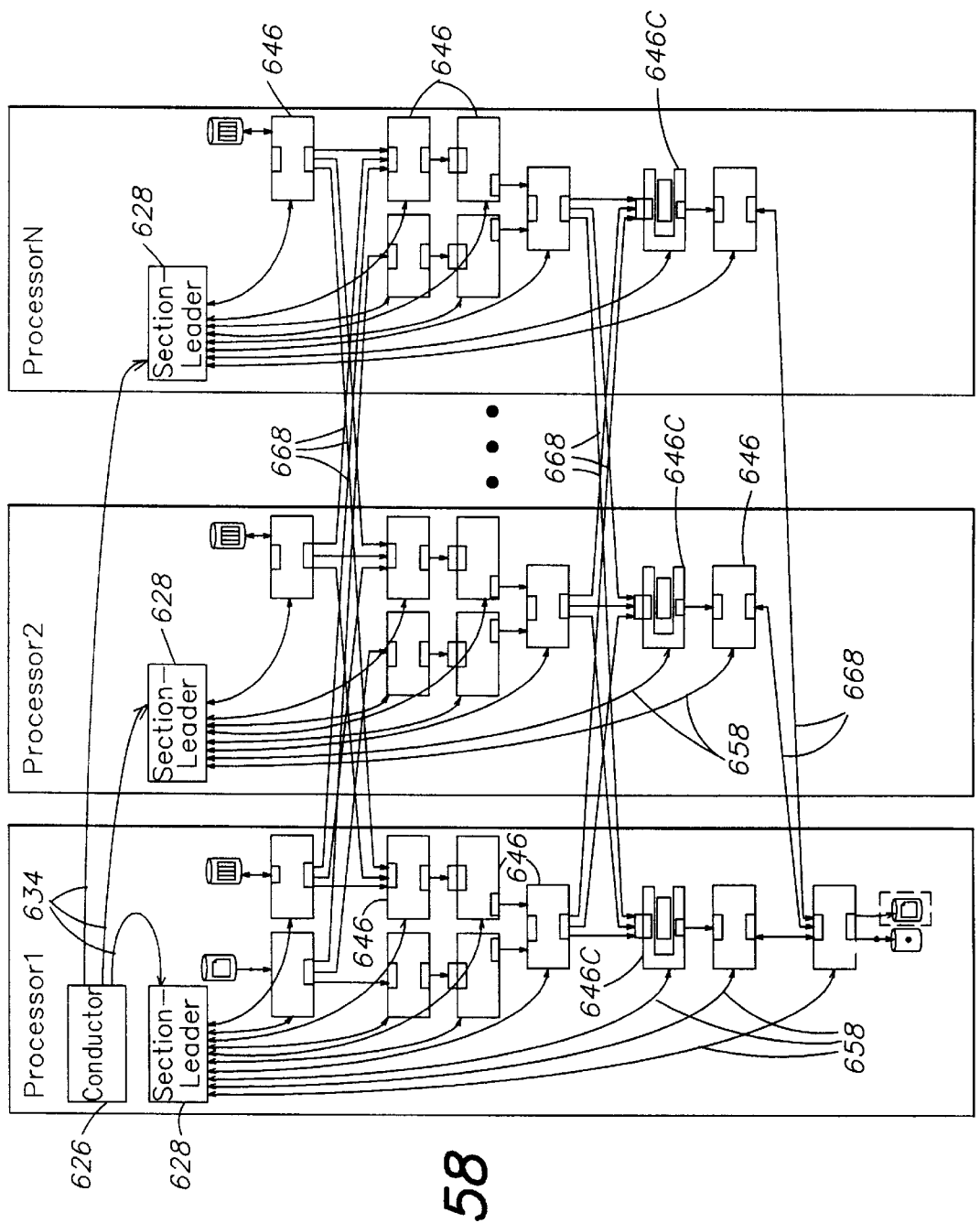
FIG. 58 is an enlarged view of FIG. 57F.

FIG. 57F illustrates the processes and connections which exist during actual execution of the graph. FIG. 58 provides an enlarged view of FIG. 57F.

In step 688 of its player( ) routine, once an individual player's call to runLocally( ) returns, steps 694, 704, 706 of that routine are performed. Step 694 releases any read-only lock on an RDBMS table which may have been created for the player in association with step 596 of the composer shown in FIG. 52A and releases RDBMS cursors and connections established in steps 678 and 682 of FIG. 56. Step 704 closes any files which have been opened by the player in step 674. In step 706 the player responds to the conductor's sync request, issued by step 696 of parallelRun( ), by sending a sync message to the conductor. Then step 707 returns from the player( ) routine.

Returning to FIG. 54, once the conductor has received a sync message from all of the player processes, indicating that all of the players of the graph have completed execution of their respective runLocally( ) functions, step 708 of parallelRun( ) sends a message to each section leader instructing it to kill all of its player processes and then itself. The section leader responds by executing step 692 of FIG. 55 which carries out this command. These kill messages are also sent when the conductor is notified that any player has terminated abnormally so as to cause a smooth termination of the entire parallel job.

Figure 57G:
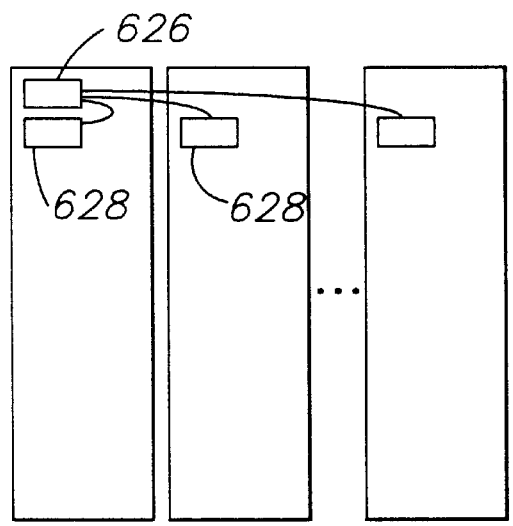
Figure 57H:
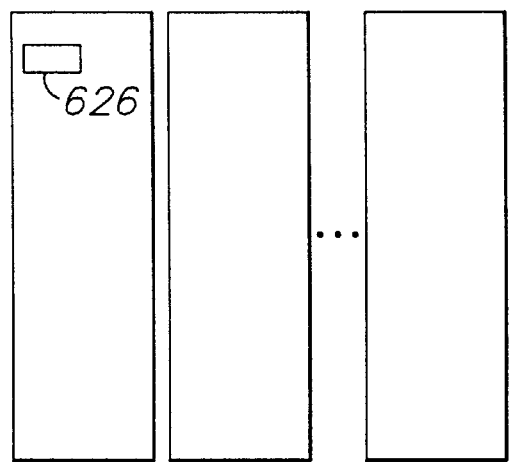

FIGS. 57G and 57H indicates the state of the parallelRun( ) after the section leaders have completed killing all of their players, and after they have all killed themselves, respectively. Those skilled in the art will understand that the exact state shown in FIG. 57G may never be reached, since one or more section leaders might be killed before all players. By the time the system reaches the state shown in FIG. 57H, the conductor process 626 is the only remaining process. At this point step 710 of parallelRun( ) closes all connections to the section leader and step 711 returns, completing the execution of the graph and completing the execution of parallelRun( ) shown in FIG. 54

Figure 59:
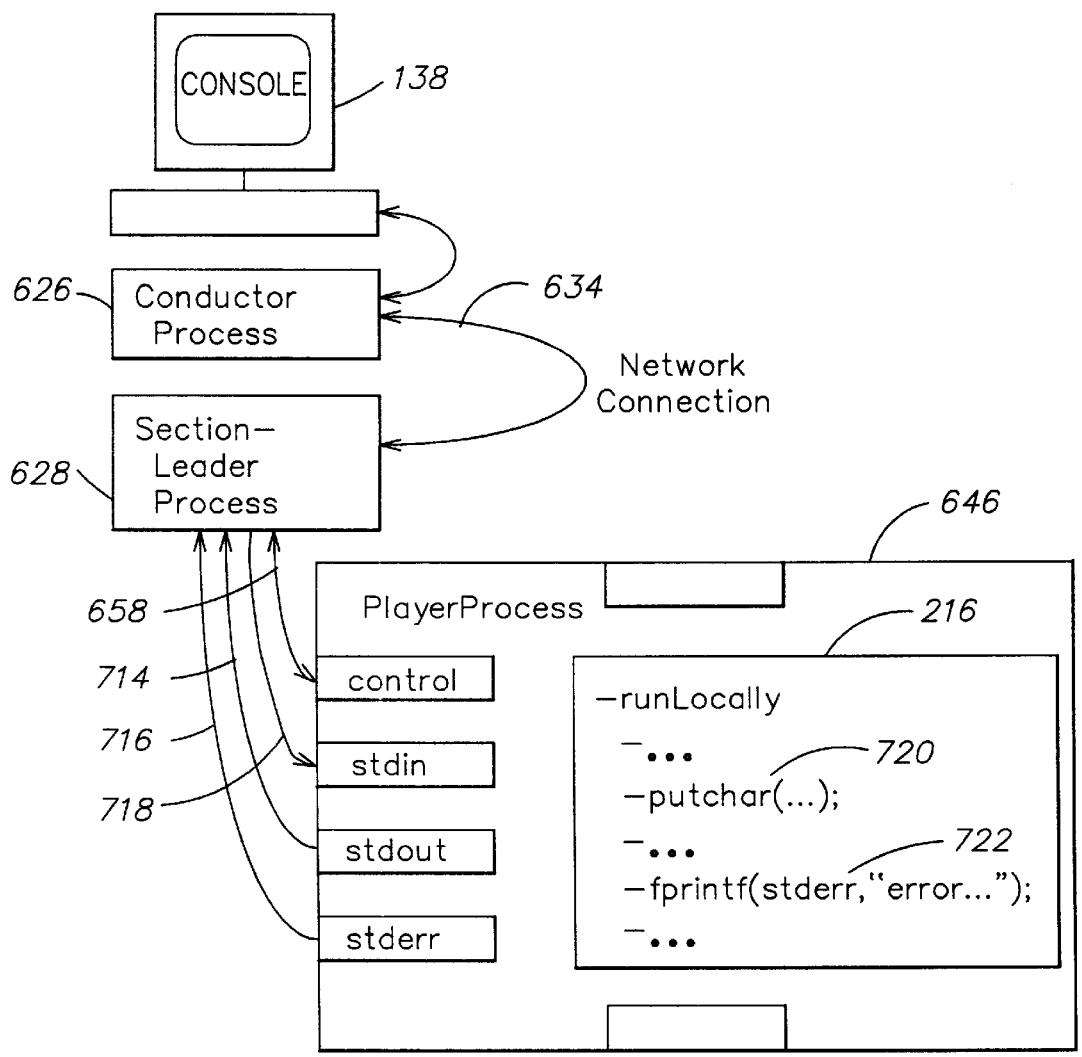
FIG. 59 is a more detailed description of the communication links between player, section leader, and conductor processes and the user console during the stage of parallel execution shown in FIG. 58.

Referring now to FIG. 59 a more detailed description of the communication links between each player process 646, section leader process 628, the conductor process 626, and the user console in workstation 138 will be described. During the actual execution of the graph, when the processes are connected as shown in FIG. 57F and FIG. 58 each of the player processes, unless they are associated with an operator, as will be discussed below, is connected to the section leader as is indicated in this FIG. 59. Not only is each such player connected to its section leader by the two-way control connection 658, shown in FIG. 57F and FIG. 58, but it is also connected to the section leader by one-way communication links from the standard output pipe 714 and the standard error 716 pipe which are normally associated with a UNIX process. The standard input pipe 718 of the process is disconnected after step 654 of the section leader code shown in FIG. 55 creates the control connection 658. (In other embodiments, analogous connections corresponding to the operating system in question would be established.)

The section leader relays any messages received from a player over the standard output and standard error pipes to the conductor process, after labelling each such message to indicate which of the player processes it came from. These messages can then be communicated to the user console of workstation 138, or to a log file, or both.

The fact that each player process is connected to the conductor process and the user console through the standard out and standard error pipes means that a runlocally( ) function 216 written for execution in a player process can perform output to the user console through C++ functions which use standard output, such as the putchar statement 720 shown in FIG. 59. It also means they can output standard error messages to the console through the use of statements such as that in the step 722 indicated schematically in FIG. 59.

In the current embodiment of the invention the user console will display these messages on the screen with an indication before them of the player process from which they came. In other embodiments of the invention the user console or the conductor process run windowing software which causes each such message to appear in a separate window associated with a given player.

Referring now to FIG. 60 and FIG. 61A through 61D, a more detailed explanation will be given of how a subprocess operator is executed during the parallel execution of a graph. FIG. 60 is a highly simplified pseudo code description of the runLocally( ) function 216F of a subprocess operator of the type shown above with regard to FIG. 30. FIGS. 61A through 61D provide a graphical representation of an instance of this subprocess operator during the execution of this runLocally( ) function.

When the parallel execution of a graph is in the phase in which it's runLocally( )s are just beginning to run, the portion of a graph containing the subprocess operator instance 724 on an individual processor node will have the general appearance shown in FIG. 61A. At this point the node's player instance of the subprocess operator will be connected with data set links 750 and 752 to the instances on the same processor of any other operators to which it is connected in the parallelized graph. In addition, it has the control link 658, the standard output link 714, and the standard error links 716 with its section leader, as described above with regard to FIG. 59.

When the subprocess operator's runLocally( ) starts executing, step 730 shown in FIG. 60 establishes standard in, and standard out, socket pairs for a fork. Then a step 732 performs a first fork creating an entire other instance of the subprocess player, instance 724A, shown in FIG. 61B.

After this fork, step 734 tests the return value of the fork to see if the current instance of the process returned from the fork is the parent or child of the fork. If it is the parent, step 734 calls the inputForkCode( ) routine 736, also shown in FIG. 60.

If the process is the child of the fork, step 738 causes steps 740, 742, and 744 to be performed. Step 740 forks the process again which creates a process 724B shown in FIG. 61A. tep 742 tests if the current process executing runLocally( ) is the parent process 742A of that fork of step 740, and, if so, calls the outputForkCode( ) routine 748. If the current process is the child process 742B of the fork 740, step 744 calls the subprocForkCode( ) subroutine 746.

At this point what used to be the single subprocess operator 724 before the forking process in the runLocally( ) routine began has now become three separate processes, 724, 724A, and 724B, as shown in FIG. 61B. When first created, all of these three processes share the same UNIX pipe connections 658, 714, and 716 with their section leader and all share the same network communication links 750 and 752 with any processes which have a data set connection into or out of the original subprocess operator 724.

The state of affairs shown in FIG. 61B rapidly changes as the processes 724, 724B, and 724A begin to execute the inputForkCode( ), subProcForkCode( ) and outputForkCode( ) routines shown in FIG. 60, respectively.

The inputForkCode( ) routine contains a step 754 which shuts down its process's output port 254 shown in FIG. 61B. Then step 756 of the routine connects an output pipe of the process 724 to the standard input of its child process 724B, which runs SubProcForkCode( ), creating the connection 758 shown in FIG. 61C. Then step 760 of inputForkCode( ) calls the runSource( ) routine 428 written by the user in the derivation of the given subprocess operator, as described above with regard to FIGS. 30 and 29. This runSource( ) routine performs the function of transferring records received at the input port of the instance 724 of the operator running the inputForkCode( ) routine 736 and supplying it over the output pipe 758 shown in FIG. 61C to the standard input port of the instance 724B of the operator, which is executing the subprocForkCode( ) routine 746 shown in FIG. 60.

The child process 724B created by the second fork 740 in FIG. 60, executes the subProcForkCode( ) routine 746 shown in FIG. 60. Step 764 of this routine shuts down the input and output interfaces 250 and 254 for the process. Then step 766 connects the standard input pipe of the process 724B executing the subProcForkCode( ) to the output pipe of the original parent process 724, completing the connection 758 shown in FIG. 61 C. Then step 768 connects the standard output of this process 724B to the standard input pipe of its direct parent process 724A. This starts to create the pipe 770 shown in FIG. 61C. Then step 772 of the subProcForkCode( ) executes the command line returned by a call to the commandLine( ) function 426, shown in FIGS. 30 and 29, which has been defined by the user in deriving the subprocess operator currently being executed.

Step 772 issue a command line statement to the operating system stating that an independent executable program 774, shown in FIG. 61C, is to be executed by the process 724B making the command line statement. The process will continue executing this independent executable program until that program returns, at which time step 776 will cause the process 724B running subProcForkCode( ) to exit.

The process 724A which is the parent of the second fork 740 in FIG. 60, executes the outputForkCode 748. This includes a step 778 which shuts down the input interface 250 for the process and a step 780 which connects the input pipe of process 724A to the standard output pipe of its child process 724B, completing the connection 770 shown in FIG. 61C. Then a step 782 calls the runSink( ) subroutine 430, described above with regard to FIG. 29 and FIG. 30. Process 724A continues executing runSink( ) until runSink( ) receives an indication over its input pipe that the independent program 774 has no more data for it, or it receives an indication that the independent program has ceased execution. At this point runSink( ) returns and step 784 of outputForkCode( ) will return to the runLocally( ) function 216F.

It can be seen that the operation of the runLocally( ) function 216F and the subroutines it causes to be called will cause process 724 to spend most of its time running the runSource( ) function 428; the process 724B to spend most of its time running the independent executable program 774; and the process 724A to spend most of its time running the runSink( ) process 430.

FIG. 61D shows parallel instances of this forked version of the subprocess operator running on each of a plurality of processors.

It should be understood that representation of the subprocess operator shown in FIG. 30 is meant to be a simplified version of the more detailed representation shown in FIGS. 61A through 61D. And that the subprocess operator 646C shown in FIG. 58's representation of the parallel execution of graph 108A behaves substantially as indicated in FIGS. 61A through 61D.

It should also be appreciated that the use of forking and interprocess communication of the type shown in the runLocally( ) described with regard to FIG. 60 is not limited to use in subprocess operators but is available for use in the runLocallyfunctions of user-defined operator classes. For example, given this disclosure, and programming environment shown in FIG. 4, and the documentation which accompanies system 00, a skilled C++ programmer would be able to design a subprocess operator of his own which ran multiple independent programs which communicated to input and output ports of the subprocess operator and to each other through UNIX pipes.

Figure 64:
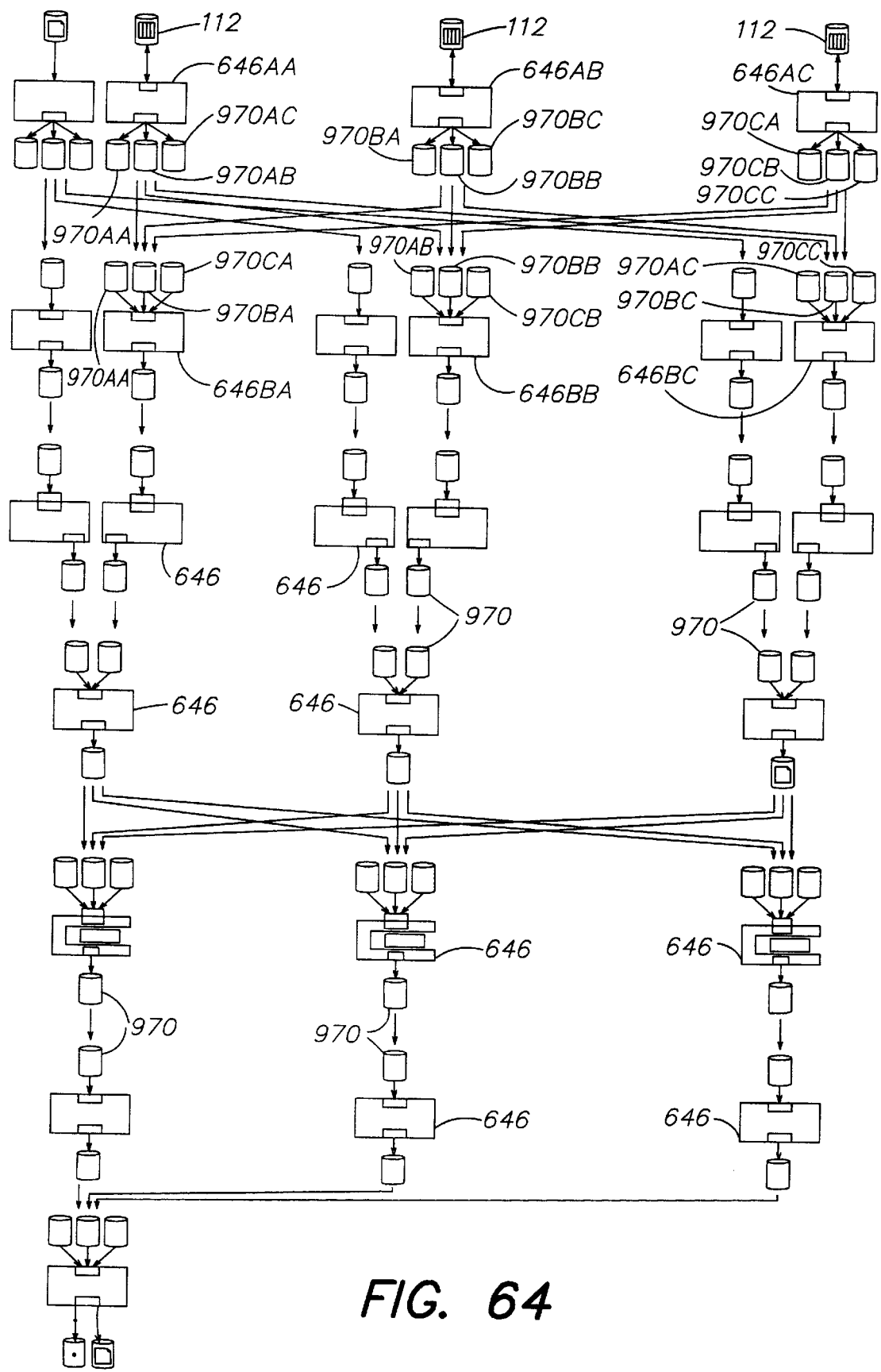
FIG. 64 is a schematic representation of the simulated parallel execution created by the simulateParallelRun( ) routine of FIG. 62 for the same data graph shown in actual parallel execution in FIG. 58.

Referring now to FIGS. 62–64, a description will be made of an aspect of the invention which makes graph programs much easier to debug. As one might imagine, it can be quite difficult to debug the execution of a graph while it has the number of processes and communications between processes, illustrated in FIG. 58. The user could place a debugger on each process of each node to track the process of the program, but this would be extremely difficult. To help address this program the inventors of the present invention have come up with a method for simulating parallel execution of such data flow graph while actually only using one or two processes. This makes the operation of the program much simpler to follow, enables only one or two debuggers to follow the path of execution, and it is likely to find a high percent of the program errors, or bugs which are likely to occur in the invention's data flow programming.

FIG. 64 provides a high level overview of the simulated parallel execution performed by the simulatedParallelRun( ) routine 627 of FIG. 62. Basically this routine takes the score 464, illustrated in FIG. 37, which is composed by the composer( ) routine of FIGS. 52A–B, and makes a separate call to the runLocally( ) of the operator associated with each player 646 identified in that score. Each such runLocally( ) reads and writes to any associated persistent data sets almost as if it were being executed in parallel as part of a separate process. But when it writes to a virtual data set, instead of communicating to a consuming process over a network link, it buffers its output to disk, with a separate set 970 of one or more files for each input port of the player feed. When the runLocally( ) reads from a virtual data set it reads in the one or more buffer file sets 970 which have been created by the one or more player processes which feed it. As illustrated in FIG. 64 this allows all the operators and data partitioning which would exist in actual parallel execution of the graph.

This is illustrated in FIG. 64 in which three player instances 646AA, 646AB, and 646AC of an operator each produce three buffer files sets, one for input to each of the three player instances 646BA, 646BB, and 646BC of a consuming operator. Player 646AA produces buffers files 970AA, 970AB, and 970AC. Player 646AB produces buffer files 970BA, 970BB, and 970BC. Finally, player 646AC produces buffer files 970CA, 970CB, and 970CC. The consuming player 646BA consumes the files 970AA, 970BA, and 970CA. The consuming player 646BB consumes files 970AB, 970BB, and 970CB. And the consuming player 646BC consumes files 970AC, 970BC, and 970CC.

The user has the choice of running this routine in three modes, indicated by three different values of the environmental variable RUNTYPE: ONE_PROCESS, TWO_PROCESS, or TWO_PROCESS_NO_SERIALIZE. With a value of ONE_PROCESS, the simulation will use only one process for all its functions, which makes debugging the easiest. With either TWO_PROCESS or TWO_PROCESS_NO_SERIALIZE, the simulation will, for each given player in the score, fork a child process of the program being executed, cause the runLocally( ) associated with that player to be called, and then terminate that child process. This means that each runLocally( ) call will be executed in a totally isolated memory space, as would the players in a parallel execution, tending to make visible any bugs which might result if runLocally( ) attempted to communicate with each other through global variables.

Both ONE_PROCESS and TWO_PROCESS serialized the score, save it to disk, read it back from disk, and then unserialize it to make sure the program can properly serialize all the objects in the score, as is necessary for parallel execution of the graph to communicate the score through computer network connections to multiple processors of its parallel computer. If the user wants to determine if the bug in his program might be caused by errors in such serialization, he or she can execute the program using the TWO_PROCESS_NO_SERIALIZATION mode to see if the program will run if no serialization of the score is performed.

FIG. 62 provides a simplified representations of the simulatedParallelRun( ) routine 627. In this illustration the first step, 900, test if the RUNTYPE environmental variable is set to TWO_PROCESS_NO_SERIALIZE. If not, it serializes the score which the composer( ) routine has created in memory to disk.

Next a loop 902 is performed for each player listed in the score in the order of their playerID, which is a number which gives each player a unique number within the entire score, and which orders the players in data flow order. Data flow order places the operators in an order such that, if the operators are executed in that order, by the time each operator preceding a given operator in that ordering has completed execution and output its data, the given operator will have all of the data necessary to complete its execution.

The loop 902 performs an "if then . . . else" conditional statement for each player in the score. The "if" statement of step 904 tests if RUNTYPE is ONE_PROCESS. If so, steps 906 and 908 are performed. Step 906 reads back into memory and unserialize the score which has been stored to disk for purposes of testing the program's serialization. Then step 908 calls executeSequentialPlayer( ) identifying that the reloaded score is to be used and identifying the playerID of the current player in the loop 902.

If RUNTYPE is not ONE_PROCESS, the else statement 910 causes steps 912–916 to be performed. Step 912 performs a fork, creating two executions of the current program, each with isolated memory spaces, which are identical except that one returns from the fork with an identification that it is the child of the fork and the other returns with an identifier of the child process, indicating it is the parent of the fork.

If the process executing step 914 is the parent of the fork, that step calls an operating system procedure that enables the loop 902 of the parent process to wait for execution of the current player's runLocally( ) to be executed by the child process.

If the process is the child of the fork, step 916 causes steps 918, 920, 921, and 922 to be performed. If RUNTYPE has been set to TWO_PROCESS, step 918 unserializes the score back from disk and points a variable "score" to it. If not, step 920 points "score" to the score still resident in the child process from the operation of the composer( ). Then step 921 calls executeSequentialPlayer( ) for the current player and for the score pointed to by "score". As is explained below with regard to FIG. 63, this will actually call the player's associated runLocally( ). When the call to executeSequentialPlayer( ) returns, step 922 terminates the child process created in fork of step 912.

FIG. 63 is a simplified representation of the executeSequentialPlayer( ) routine 924. In this illustration the first step of this routine performs a loop 926 for each output data set associated in the score with the identified player.

If the current data set of loop 926 is an RDBMS data set, step 928 will cause steps 930 and 932 to be performed.

Step 930 makes any necessary adjustment to the I/O manager functionality, provided by the Orchestrate Framework Library of FIG. 4, to account for the fact that getRecord( ) and putRecord( ) will be calling it from within a different process and on a different processor than indicated in the score. Although not described above, the I/O manager functionality is linked into a user program during the linking process shown in step 318 of FIG. 5. It interfaces between runLocally( ) calls to inputCursors and outputCursors and the actual files, communication channels, and RDBMS API links, with which those cursors are to read and write. The current I/O functionality automatically makes such connections during parallel execution based on information and objects contained in the score.

Step 932 performs the necessary interface with appropriate RDBMS API using the data set's RDBMS command string, and the player's bind variables, if any, identified in the score. This corresponds to steps 678–686 of the player( ) routine shown in FIG. 56.

If the data set of loop 926 is a file data set, step 934 causes steps 936 to connect the I/O manager to the data set for I/O by the player.

If the data set is a virtual data set, step 938 performs steps 940 and 942. Step 940 creates a separate disk file 970 shown in FIG. 64 to store the player's output for each input port that, according to the score, consumes a part of the data set produced by the player. Then step 942 connects the I/O manager to files for I/O by the player.

Step 944 performs a loop for each input data set associated with the player in the score.

If the current input data set of loop 944 is an RDBMS data set, step 946 performs steps 948 and 950. Step 948 connects the I/O manager to the RDBMS for I/O by the player. And step 950 performs functions similar to that in step 932, interfacing with appropriate RDBMS API using the data set's RDBMS command string identified in the score.

If the current input data set is a file data set, step 952 causes step 954 to connect the I/O manager to data set for I/O by player.

If the current input data set is a virtual data set, step 956 causes step 958 to connect the I/O manager to the disk files 970 shown in FIG. 64 corresponding to the buffer file set associated with the player's partition of the input data set which have been created by players whose runLocally( )s have been previously executed by calls to executeSequentialPlayer( ).

Finally, once the loops 926 and 944 have hooked up all the inputs and outputs for the player, step 960 calls the runLocally( ) of the operator associated with the player in the score.

Once this runLocally( ) returns a step 962 deletes all of the buffer files 970 which have been input by that runLocally( ) to free up disk space. Then step 964 returns.

Referring now to FIGS. 65 through 80, a description will be made of the analytic operators which are provided in the OrchestrateComponentsLibrary 166, indicated schematically in FIG. 4. These include the APT_BuildModelOperator 180 shown in FIG. 66; the APT_ParallelBuildModelOperator 786 shown in FIG. 67; and the APT_ApplyModelOperator 178 shown in FIG. 69.

FIG. 65 shows the public interface for the APT_BuildModelOperator and APT_ParallelBuildModelOperator class definitions. The main distinguishing factor of this public interface is the presence of an addModel( ) function 788 shown in FIG. 65 which enables a user to specify a particular APT_Model object instance 790, shown in FIGS. 66 and 67, which is to be used in conjunction with the build model operator.

An operator of type APT_BuildModelOperator is used to build or update an analytical model based on analytic algorithms such as neural networks, neural tree networks, KD tree, or Kohonen networks. As is well known in the art, such neural networks and decision trees can automatically be trained to detect patterns between the values of a set of one or more source fields in a set of records and the values of one or more target fields in that set of records, based on the mathematical relationships between the values of such fields. Once trained, the model can estimate the value of a new record's target field given the value of its source fields. A Kohonen network automatically classifies records into groups which best separate the records based on the values of a set of source fields.

FIGS. 68 and 69 describe the APT_ApplyModelOperator 178.

FIG. 68 shows the public interface of the APT_ApplyModelOperator 178 which is similar to that for the APT_BuildModelOperator and APT_ParallelBuildModelOperator shown above in FIG. 65. The APT_ApplyModelOperator is used once an APT_Model has been trained by an APT_BuildModelOperator or APT_ParallelBuildModelOperator. As shown in FIG. 69, APT_ApplyModelOperator receives a data set 793 which is supplied to its input port and in response it produces a corresponding output data set which contains a copy of each record from the input data set with an additional set of one or more new fields corresponding to each of the target fields which have been specified in the APT_Model file which has been specified for use with the apply model object by the addModel( ) function 788A. Each of these fields added to an output record includes an estimated value for the target field given the values of the source field in the individual record being labeled.

If the apply model object is used with a model object specifying a Kohonen network model, the field added to the output data set specifies in which class of records identified by the Kohonen network the individual record being output should be placed.

Figure 70:
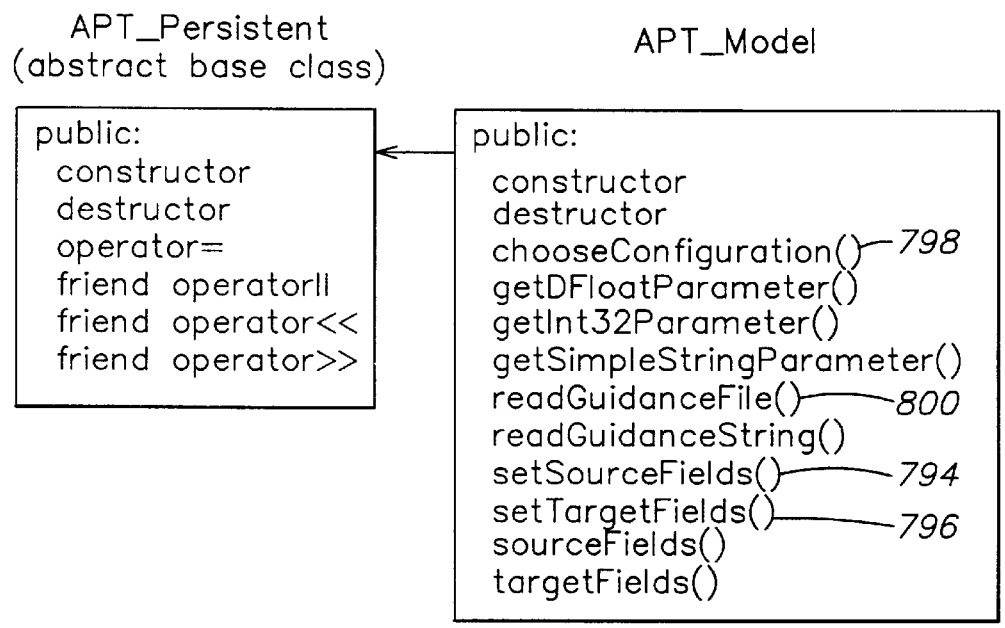
FIG. 70 represents the interface of the APT Model class.
Figure 71:
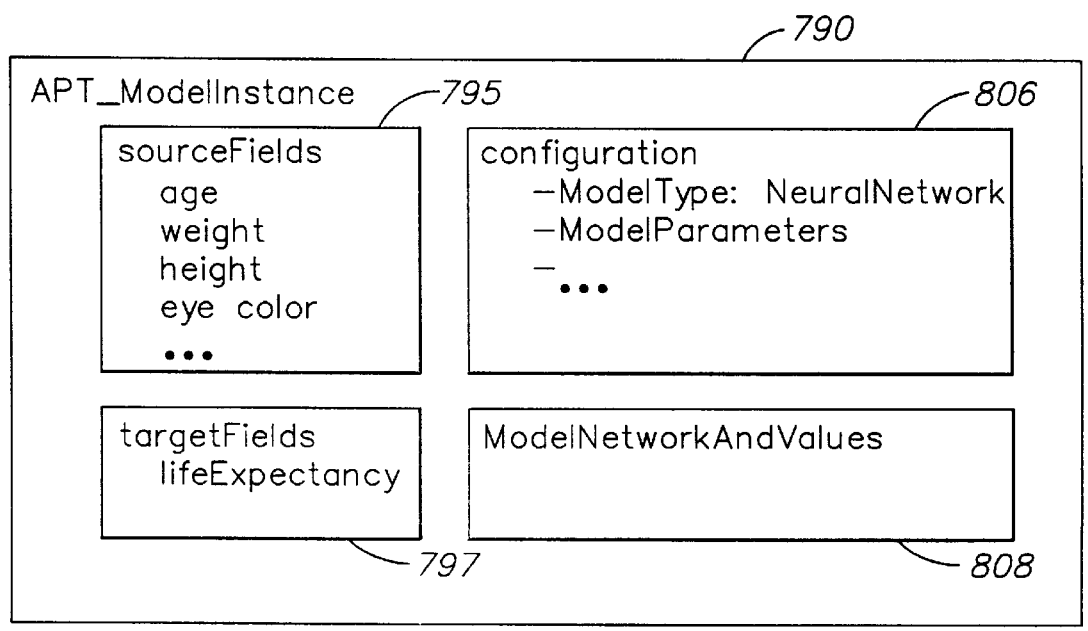
FIG. 71 is a schematic representation of an instance of the APT_Model class showing some of its internal data structures.

FIGS. 70 through 72 are used to describe the APT_Model objects which are associated with the model building operators shown in FIGS. 66 and 67. FIG. 70 shows the public interface of the APT_Model class definition. FIG. 71 is a schematic representation of some of the more important elements of an instance 790 of the APT_Model class. FIG. 72 is a schematic representation of a configuration file which is used to provide a flexible manner for altering the parameters of an analytical model represented by an APT_Model instance.

After a user constructs an APT_Model object instance he or she should call the setSourceFields( ) function 794 to specify the list of record fields which are to be used as source field inputs to the analytical model to be created in association with the model instance. Similarly, if the user is intending that the model instance be created using neural networks, neural tree networks, KD tree networks, or hybrids thereof, he or she should also call the setTargetFields function 796 shown in FIG. 70 to select one or more target fields for use in that model. If the user is intending that the APT_Model instance will only be used with Kohonen networks, there's no need to call APT_Model's setTargetFields( ) function, since Kohonen networks function to divide a set of training records into clusters based only on source fields.

In the model instance 790 shown in FIG. 71 a set of source fields 795 and a set of one target field 797 are shown after having been set by calls to setSourceFields( ) 794 and setTargetFields( ) 796.

A user specifies the actual modeling algorithm and model topology to be used with a given APT_Model instance by calling the chooseConfiguration( ) function 798 and the readGuidanceFile function 800 both shown in FIG. 70. ChooseConfiguration( ) specifies the name of a configuration identifier such as the strings "config1" "config2," and so on, shown at 802A through 802E in the guidance file 804 represented in FIG. 72. Each configuration identified by such an identifier within the guidance file specifies the type of analytical model to be used, such as, for example whether it is to be a neural network as is identified in the configurations 802A and 802B; a neural network tree, also known as a hybrid tree, or hybrid neural network, indicated in the configuration 802C; a KD tree, which is a type of binary classification tree well-known in the analytic arts, as indicated in the configuration 802D; or a Kohonen network as indicated in the configuration 802E. Note that the type of analytical model can be omitted when retraining a model. The type is required only when a model is first created.

Each such configuration also identifies model parameters. These parameters indicate such things as the number of dimensions in a Kohonen network, the number of layers and number of nodes per layer in a neural network; the maximum and minimum bucket size in the KD tree or hybrid tree; the attenuated learning rate in neural networks and in hybrid trees; the iteration limit in neural networks, hybrid trees, and Kohonen networks; and other variables commonly associated with each such type of analytical algorithm.

Once the user has specified a given configuration contained within the guidance file by use of a call to the chooseConfiguration( ) function 798, he or she should call the readGuidanceFile( ) function 800 with the name of the guidance file 804 in which that configuration is contained. This will cause the APT_Model object to read the specified configuration information into an internal data structure 806, shown in FIG. 71. Once this has been done, the APT_Model instance is ready for use by a build model or parallel build model operator of the type shown in FIGS. 66 and 67, respectively.

The model object is separate from either the build model or parallel build model operators so it can be used by an APT_ApplyModelOperator, of the type shown in FIG. 69. The configuration information is placed in a configuration file so it is easy to alter and fine-tune the model type and model configuration to be used by build and apply operators without having to recompile the programs in which those operators are used. For example, it would be possible to place both the execution of a graph which builds a model and the execution of a graph which applies the model just built to a set of test data within a loop which keeps calling a separate guidance file configuration for each iteration to automatically find which of a set of possible configurations provides the most accurate model for a given set of training and testing data.

When an APT_Model instance is first created, the actual values representing the weightings or classification thresholds associated with its model network in the data structure 808 shown in FIG. 71 are cleared. The model object should then be linked to a build model operator and that build model operator should be executed in order to train the model values in the data structure 808. Once a model has been trained, it is available either for use by an apply model operator or it can be reused by a build model operator to further train and update its model values 808.

FIGS. 73 and 74 illustrate the process of building and applying a neural net model.

In FIG. 73 a graph is run in which a persistent training data set 792 is applied to the input of a build model operator 180 to which a model file 790A has been attached. In the example of FIGS. 73 and 74, the model file 790A has been configured to define a neural network.

Currently, the System 100 can only build neural network models serially. Thus, the sequential-parallel flag 246 of the operator 180 will be set to sequential, and, as is shown in FIG. 73, the execution of the build model operator 180 will take place on only one processor node. As is indicated schematically in FIG. 73, the runLocally( ) 216G of the build model operator has two basic steps, step 810 and 812. Step 810 reads the entire training data sets into a disk buffer and then step 812 calls a trainModel( ) function, defined in the private interface of the APT_Model class, which performs the proper training algorithm for the current configuration of the build operator's associated model object 790A. This training function train the weights associated with the nodes 814 of the neural network model 808A associated with the model object.

FIG. 74 shows an apply process in which an apply model operator 179 receives an apply data set 793 at its input and causes a corresponding updated apply data set to be written out to the persistent data set 793A. As is indicated at 246 in FIG. 74, the apply operator is a parallel operator which can be executed in each of a plurality of processors.

The runLocally( ) 216H of the apply operator has a "while" loop 815 which causes it to perform steps 816 and 818 for each record supplied to it from the apply data set 793. Step 816 calls the applyModel( ) function of the model object represented by the model file 790A for the current record of the "while" loop 815 to apply the model. Step 818 then outputs the current record with the one or more estimated new target field values calculated by applyModel( ).

In the example of FIG. 74 it is assumed that the applied data set has a separate partition on each of the processors on which the apply operator has a corresponding player. Since it is assumed that the output updated apply data set 793A is being created in association with the execution of the graph shown in FIG. 74, it will automatically have a separate partition created on each of the processor nodes shown in FIG. 74. As a result, the apply operator will be able to read data from, and write data to, files contained on its own node, greatly reducing interprocessor communication.

FIG. 75 and FIG. 76 are identical to FIGS. 73 and 74, respectively, and represent execution of the same graphs shown therein. The only difference is that in FIG. 75 and FIG. 76 it is assumed that the model object represented by the file 790A has had different configuration data read into its configuration data structure 806 shown in FIG. 71, which causes it to train and apply a neural tree network, kd tree, or hybrid neural network or hybrid tree, analytical model.

The hybrid tree neural tree network available for use with build and apply operators of the system 100 is described in much greater detail in a patent application (the "'sibling patent") entitled "Systems for Analyzing and Computing Data Items" filed on the same day as this patent application, on behalf of the intended assignee of the present application. This sibling patent, which has as named inventors, Anthony Passera, Michael J. Beckerle, John R. Thorp, and Edward S. A. Zyszkowski, is hereby incorporated herein by reference in its entirety.

This hybrid tree algorithm uses a binary decision tree, each non-terminal node of which is a single layer neural network, to divide records into a set of bins 820, each of which is associated with a leaf node of the binary tree. Then the records associated with each of the bins 820 is supplied to train a separate hidden layer neural network 822. Once this has been done a composite model 808B is created which encodes both the binary tree 817 and the values representing the weights of the nodes of the neural net associated with each of its decision nodes 818, and the values representing the weights of the first and hidden layered nodes of each of the neural nets 822 associated with the leaf nodes of the tree 817.

FIG. 76 shows parallel application of the model 808B once it has been created by the training process indicated in FIG. 75.

Figure 77:
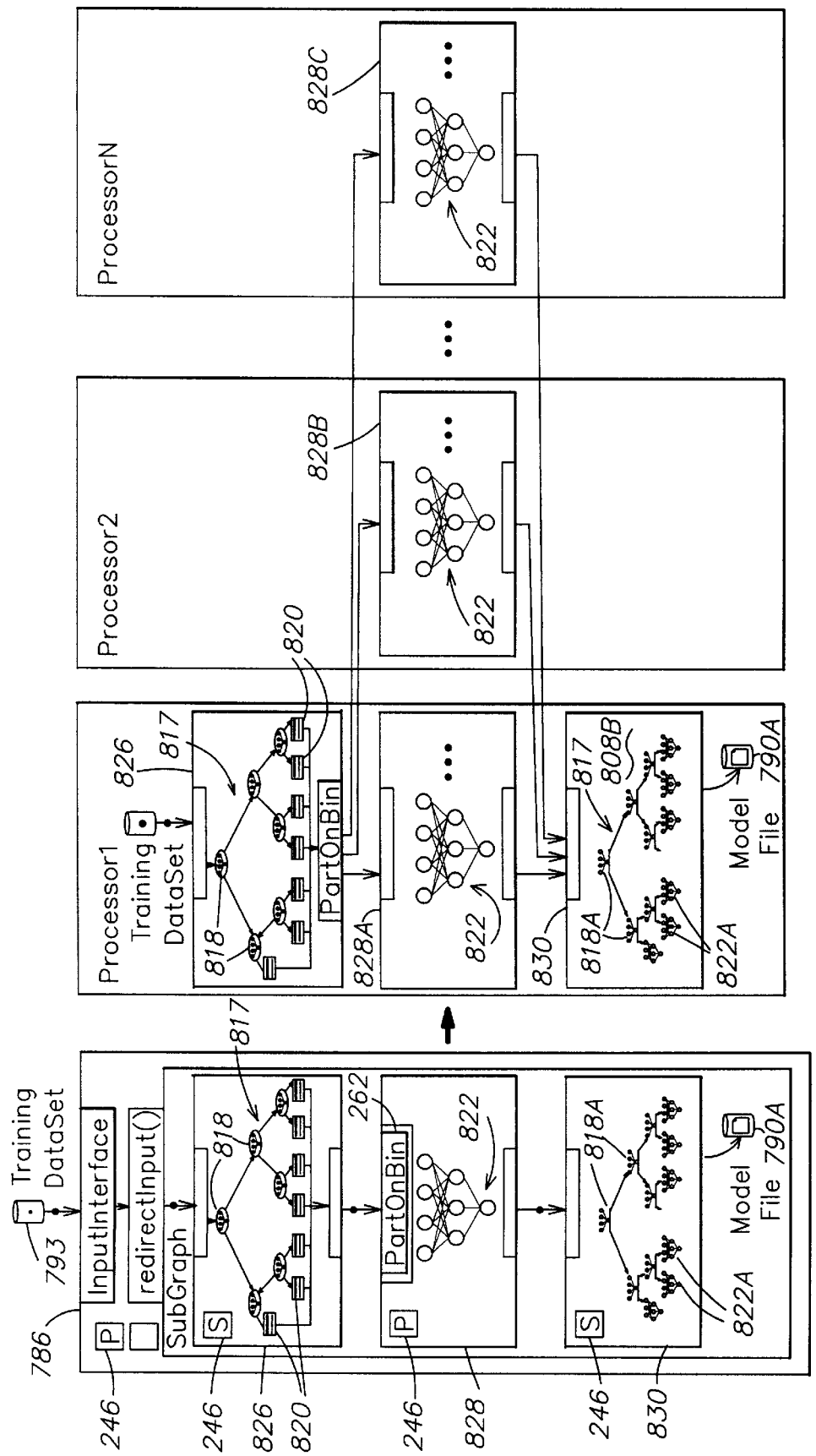
FIGS. 77 is similar to FIG. 75, except that is represents the parallel training of an APT_Model object representing a hybrid neural network using an APT_ParallelBuildModelOperator instance.

FIG. 77 represents an instance of the APT_ParallelBuildModelOperator shown in FIG. 67. Currently this class only supports parallel training of a model object whose configuration data has specified a neural tree network, or hybrid tree, model. The user can train a model file 790A which has been configured to represent such a hybrid tree model either sequentially with the APT_BuildModelOperator, as shown above in FIG. 75, or in parallel with the APT_ParallelBuildModelOperator, as shown in FIG. 77.

The APT_ParallelBuildModelOperator class, discussed above with regard to FIGS. 65 and 67, is derived from the APT_CompositeOperator class, described above with regards to FIGS. 31 through 33. It is similar to the APT_CompositeOperator shown in FIG. 31 except that it has no redirectOutput( ) function, nor any output interface, since the only output of its training operation is saved in an APT_Model object stored in a model file 790A. The sub-graph of this operator includes three sub-operators, 826, 828 and 830, the first and the last of which are sequential operators, and the middle one of which is a parallel operator.

The first sub-operator, 826, performs the process of training the neural networks in the decision nodes 818 of the decision tree 817, and of causing records in the training set 793 to be placed in bins 820 at the leaf, or terminal, nodes of that tree.

The second sub-operator, 828, causes a neural network model to be trained for the set of records in each of the bins 820. The input port of the operator 828 includes a partition method indication 262 that the input supplied to its various parallel instances is to be hash partitioned on the bin label of the records supplied to it. This is done so each parallel instance of operator 828 will receive records associated only with the one or more hidden layer neural networks 822, which is being trained within it.

The third sub-operator, 830, performs the process of building a complete hybrid tree model 808B which represents both the topology of the hybrid tree and the values of the weights 818A associated with its single-layer decision-node networks 818 and the weights 822A associated with the multi-layer neural network models 822.

FIGS. 78 through 80 are highly simplified pseudo code representations of the runLocally( ) functions of the operators 826, 828 and 830, respectively.

As shown in FIG. 78, the runLocally( ) function 832 of the TrainAndLabelOperator operator 826 includes steps 834 through 850. Step 834 reads in the entire training data set into memory. This is usually not a problem, since training sets are usually not very large compared to the memory capacity of the individual processors of most parallel computers. Next step 836 calls a neural tree network training function for training a model of the neural tree network 817 and for binning records passed to it into the bins 820. Then a step 838 reads each record out of each of the bins of the tree, labeling each such record with an added field identifying the bin in which it was placed by the decision tree, and calling the putRecord( ) of the operator's output port for the labeled record.

During execution of a graph including composite operator 786A, the hash partition method will be hoisted into the putRecord( ) function of the operator 826's output port. This will cause each labeled record with which putRecord( ) is called in step 838 to be allocated to one of the consuming instances of the operator 828 shown in FIG. 77 based on the value in the record's added label field.

After step 838 has read all of the records out of all of the bins of the tree, step 840 saves a compressed representation of the tree to a specified file. Then step 850 returns because the operation of the TrainAndLabelOperator 826 will be complete.

FIG. 79 schematically represents the runLocally( ) 852 of the parallelizable TrainNetletsOperator 828. This runLocally( ) performs an iteration of a loop 854 for each of the label training records supplied to its individual instance by the TrainAndLabelOperator 826. For each such record, step 856 tests to see if the current record has a leaf node, or bin, label number which the operator has not yet received before. If so, it creates a new netlet buffer for that leaf node number. Then a step 858 passes the current record to the netlet buffer corresponding to the record's leaf node, or bin, number. Once the loop 854 has placed all of the records received by a given instance of the TrainNetletsOperator into an appropriate netlet buffer, step 860 forms a loop comprised of steps 862 and 864 for each of the resulting netlet buffers. Step 862 calls a neural net training function for the buffer which trains a neural net 822 of the type shown in FIG. 77 based on the training records which have been associated with its netlet buffer. Then a step 864 outputs a compressed data structure representing the neural net which has been trained for that netlet and the weights of its first layer and hidden layer nodes. Then a step 866 returns, since the work of the TrainNetletsOperator instance is then done.

FIG. 80 shows the runlocally( ) function 868 of the assembleOperator 830, shown in FIG. 77. This runLocally( ) includes a step 870, which reads the tree representation saved by step 840 of FIG. 18 from the file and places it into the model data structure 808, indicated in FIG. 71, associated with the particular model object 790A which has been associated with the parallel training operator, as shown in FIG. 77. Then a loop 872 performs a step 874 for each record which the assembleOperator( ) receives at its input port. Each of these records is a data structure created by step 864 of FIG. 79 representing a neural net 822, of the type represented schematically in FIG. 77. Step 874 connects the netlet data structure represented by the current record to the model object's analytical model 808B. It links each netlet's compressed representation onto the compressed representation of the decision tree 817 at the location in the decision tree associated with the leaf node, or bin, from which the netlets associated training records came. Once this has been done, a step 876 serializes the APT_Model object and writes it to disk. At that point, the function of the assembleOperator is complete and a step 878 will return.

FIGS. 81 through 84 describe some of the flexibility in interacting with RDBMSs, which can be achieved with the present invention.

Figure 81:
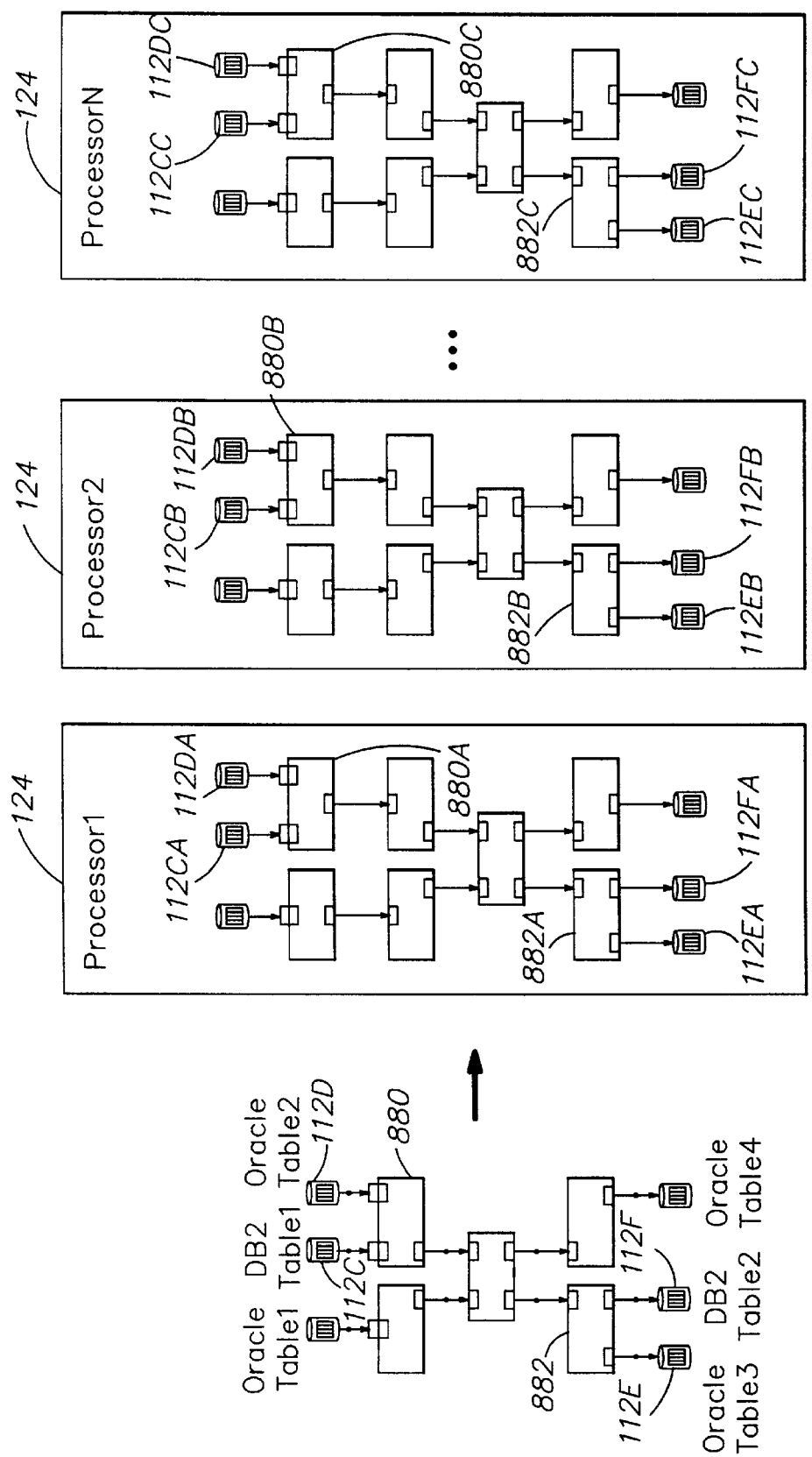
FIG. 81 is a schematic representation of parallel reads and writes which embodiments of the present invention can perform from or to each of a plurality of RDBMSs.

FIG. 81 illustrates that the parallel RDBMS I/O supported by the system 100, which is discussed above with regard to steps 578 through 608 of the composer routine shown in FIGS. 52A–B and steps 676 through 686 of the player( ) routine of FIG. 56, can be performed both on input and output, and can allow multiple database tables to be accessed for input and for output within a given graph or even a given operator. The parallel RDBMS I/O also allows tables from different types of RDBMSs to be read or written in parallel from a given graph or operator.

In the example of FIG. 81, the operator 880 is connected to a data set 112C, which is a DB2 table. It also has another input port connected to a data set 112D, which is an Oracle table. The composer code represented in the loop 574 of FIGS. 52A–B responds to database type specified within the declaration of an RDBMS data set, such as that contained within the statement 268A of FIG. 8A, by causing the query placed by instruction 600 of FIG. 52A(1) to be written in the RDBMS language associated with that database type. Similarly, the steps 676 through 686 of the player( ) routine in FIG. 56 use the data set's associated database type to determine which RDBMS API they are to communicate with.

Since the step 678 of each player( ) routine logs on to the appropriate RDBMS API on the player's node, this means that each instance of an operator communicating with an RDBMS table, such as the instances 880A–C shown in FIG. 81, will issue a separate query to that database through the RDBMS API located on its own processor node. The operator instances 880A, 880B and 880C running on each of the processors 124 shown in FIG. 81, each have an input port communicating with a separate data partition 112CA, 112CB, and 112CC of the DB2 table 112C. The other input port in each of the operator instances 880A–880C also communicate with a respective separate data partition 112DA–112DC of an Oracle table 112D.

The combination of steps 595 through 608 of the composer( ) in FIGS. 52A, 52A(2), and 52B, and steps 676 through 686 of the player( ) of FIG. 56 enable similar partitioned parallel writes to take place with tables from different RDBMSs. This is shown in FIG. 81 by the parallel instances 882A, 882B and 882C of operator 882. One output port of each of these operator instances writes a separate partition to Oracle Table 3 through a separate instance, 112EA, 112EB and 112EC, respectively of the Oracle RDBMS running on its associated processor node. At the same time, the other outputs of each instance of the operator 882 write a separate partition to DB2 Table2 through a separate instance, 112FA, 112FB and 112FC, respectively of the DB2 RDBMS running on its node.

FIG. 82 indicates that alternate embodiments of the invention allow creation of composite data sets, such as the composite data set 884. A composite data set is a data set object which actually represents a set of one or more data set objects.

In embodiments of the invention supporting such composite data sets, when the user links a composite data set into a data-flow graph, the APICheck routine, when creating the equivalent graph, decomposes the composite data set object into its corresponding sub-data set components, placing them in the graph in its place.

The loop 574 of the composer( ) routine and loops 676 of the player( ) routine described above will support the connection, to a given input port, of the multiple data sets resulting from such a decomposition. This is true even if the data sets are associated with different types of RDBMSs. When a graph containing a composite data set comprised of tables from two different RDBMSs is parallelized, if the operator receiving such a data set is parallelized, each parallelized instance of that operator will send a separate query for each such table to the instance of that table's associated RDBMS executing on its node, as indicated in FIG. 82.

In other embodiments of the invention, the composer( ) and player( ) code is modified to cause different parallel instances of an operator receiving data from a composite data set to access different sub-data sets, as is indicated schematically in FIG. 83.

FIG. 84 shows how an alternate embodiment of the invention can be used to parallelize input from a data set 112H representing the records returned by a user written RDBMS query. All that is required is for the step composer code shown in FIGS. 52A(1), 52A(2), and 52B to be modified so that step 586, instead of inserting a sequential repartition operator, as is shown in FIG. 53, would instead call a query planner for the RDBMS associated with the table. As is well known in RDBMS art, query planners can automatically decompose a user query into a plurality of separate partitioned queries to be executed by the instance of the RDBMS executing on each of a plurality of separate processor nodes. After this modified step 568 was performed, then a modified step 588 would place the set of partition queries returned by the query planner into the score, in association with the data set and with an indication of which player of the process consuming the data set is to be associated with each of those queries.

Figure 85B:
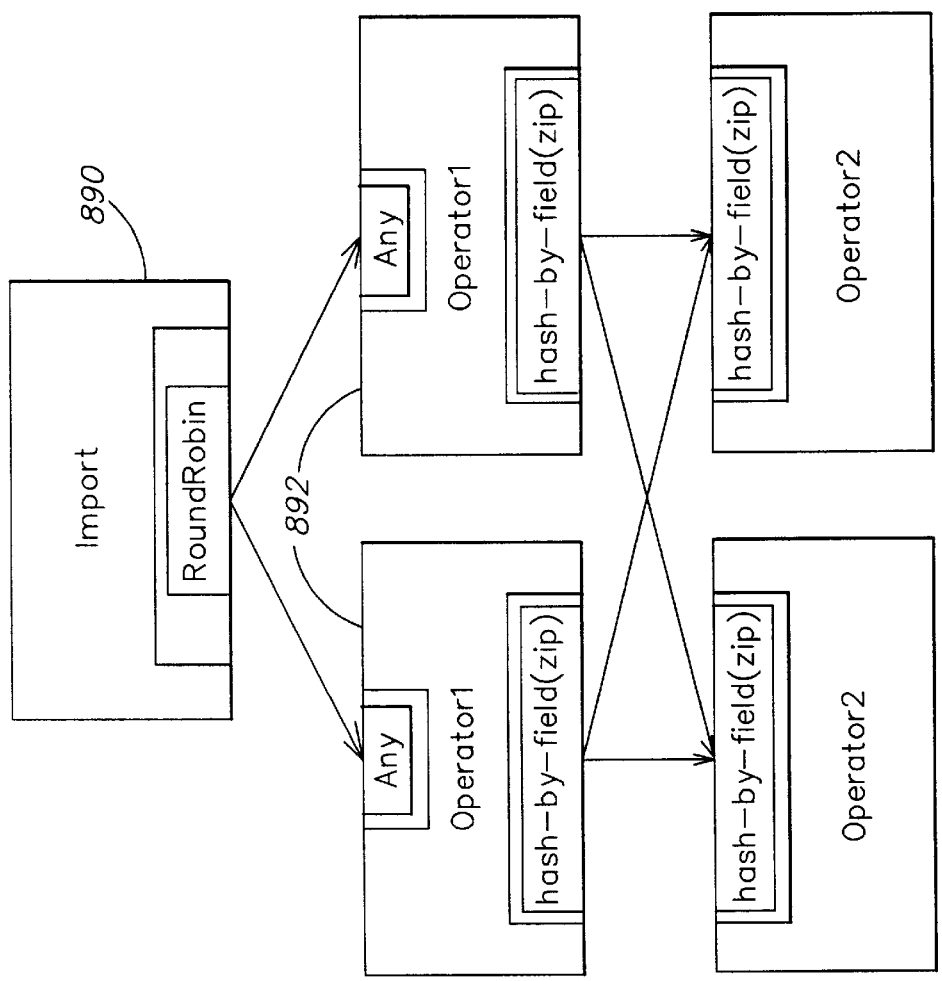
FIG. 85B is a schematic representation of how data is partitioned during parallel execution of the data flow graph of FIG. 85A when partition methods can only be hoisted one level from an input port to the output port which feeds it.
Figure 85A:
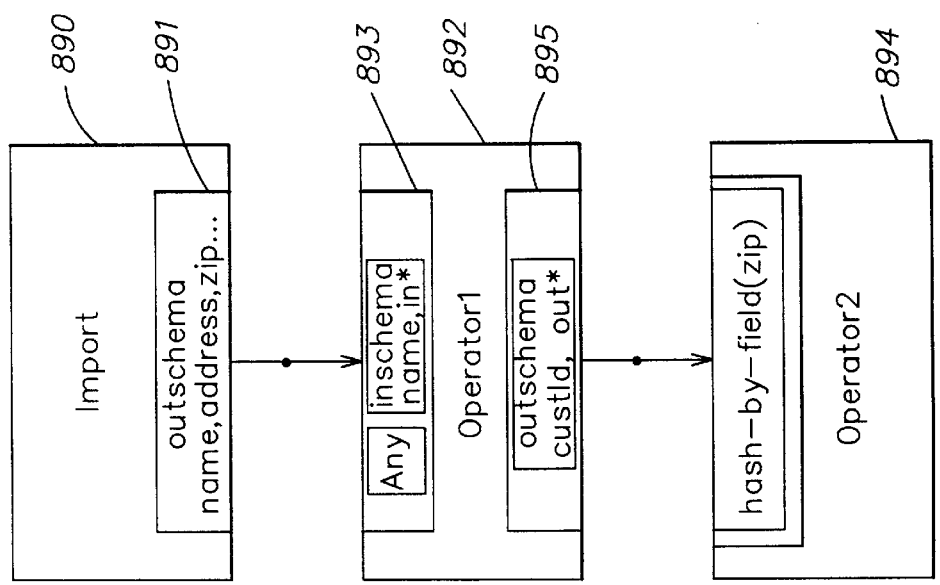
FIG. 85A is a schematic representation of a data flow graph, showing the partition method indications associated with the input ports of the operators of that graph and the output and input schemas relevant to the partition method indication of the bottom operator of that graph.
Figure 85C:
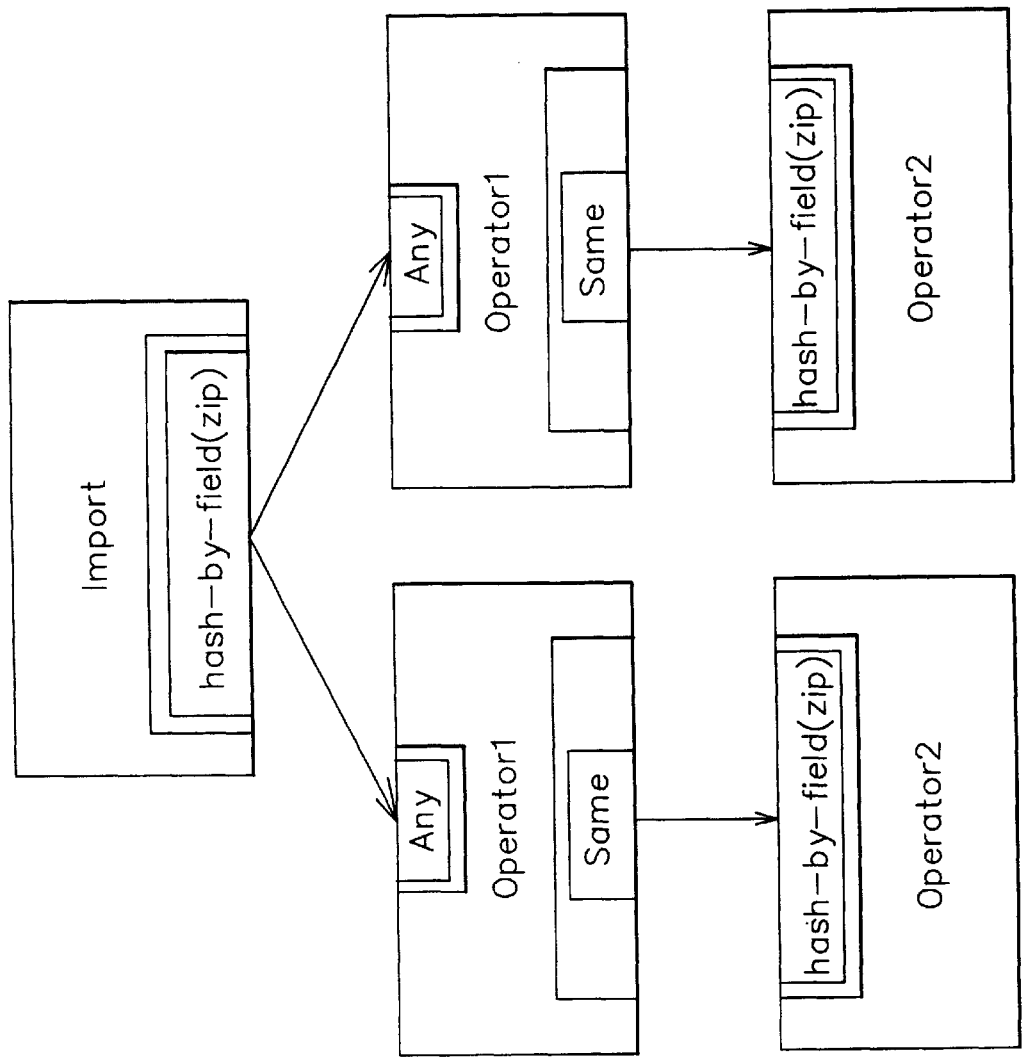
FIG. 85C is a schematic representation of how some embodiments of the invention allow more efficient partitioning of data during parallel execution of the data flow graph shown in FIG. 85A by hoisting partition methods more than the one level shown in FIG. 85B.

Referring now to FIGS. 85A through 85C, a description will be made of how the present invention can be used to hoist partition methods up the data stream multiple operator levels. In the APICheck code described above with regard to FIG. 38, step 510 hoists the partition method identified in the partition method indication 262 associated with a given input port to a partition method indication 262A associated with the output port which supplies the data set to that input port. This single level partitioner hoisting is indicated schematically by FIGS. 44 through 47. There are, however, instances where greater computational efficiency can be achieved by hoisting a partition method further upstream in the data-flow graph than merely from one input port to the output port which feeds it.

In the example of FIG. 85A it is assumed that an import operator 890 has an output schema 891 which specifies a name, address, zipcode and other fields. It is assumed that operator1, identified by the numeral 892, has an input schema 893 specifying the name field and an input variable of the type described with regard to numeral 338 FIGS. 16 through 18. The operator 892 has an output schema 895 which specifies a new field custID and an output schema variable of the type described with regard to the numeral 338A in with regard to FIGS. 20 through 22. The input port of operator 892 specifies the partitioning method "Any", and the input port of the operator 894 specifies a hash-by-field partition object which keys on the zipcode field.

As FIG. 85B indicates, with single-level partition hoisting of the type performed by step 510 of FIG. 38, the putRecord( ) functions of each instance of the output port of the operator 892 will perform hash-by-field partitioning on the zipcode field. Unfortunately, this results in some inefficiencies, since the data stream involved in the parallel execution of the graph shown in FIG. 85B requires two separate re-partitioning processes, one performed by the putRecord( ) functions of the parallel instances of operator 892, and one performed by the output of the operator 890 because it is supplying output to an operator which has a different number of instances than it does.

In some embodiments of the invention the code represented by step 510 in the APICheck routine shown in FIG. 38 can be replaced by code that takes into account the presence of schema variables in the input and output schemas of operators to determine whether or not the partitioning method can be hoisted more than one level. For example, as shown in FIG. 85A, the output schema of operator 890 shows that the zipcode field exists in its output data set. The input and output schemas of the operator 892 indicate, through their use of input and output schema variables and through their shared transferIndex (which is visible to step 510), that all of the fields specified in the output schema of the operator 890 get passed through to the input port of operator 894 without change. That means if the data supplied to operator 894 is to be partitioned based on zipcode that such partitioning could take place at the output of operator 890, without affecting the outcome of the graph's execution.

It should be understood that the foregoing description and drawings of this application are given merely to explain and illustrate the invention and that the invention is not limited thereto, except insofar as the interpretation of the appended claims are so limited. Those skilled in the art who have the disclosure before them will be able to make modifications and variations therein without departing from the scope of the invention.

For example, the functions, or devices for performing them, described in the claims below can be realized by many different programming structures and data structures, different programming languages, and by using different organization and sequencing. This is because programming is an extremely flexible art form in which a given idea of any complexity, once understood by those skilled in the art, can be manifested in a virtually unlimited number of ways.

Furthermore, it should be understood that the invention of the present application, as broadly claimed, is not limited to use with any one type of operating system or computer hardware. For example, although the system 100 is described above as operating in a UNIX environment, it is to be understood that alternate embodiments of the invention will be made using the Microsoft Windows NT operating system. It should also be understood that functions shown being performed in software in the specification could be performed in hardware in other embodiments, and vice versa.

It should be understood that in other embodiments of the invention other schemes could be used to buffer between producing and consuming operators. In other embodiments of the invention the composer might distribute player processes differently than shown above. For example, as the number of nodes of the parallel computer with which the system is used increases, it will become increasingly favorable to pipe-line fewer players on each node, particularly where there is repartitioning of the graph's data sets.

It is to be understood that other embodiments of the invention may use any form of interprocess communication mechanisms, including shared memory, pipes, or message passing libraries, where the described system 100 uses TCP/IP streams and pipes.

It is to be understood that the methods of decomposing an query to an RDBMS is described above for a particular version of Oracle. However, similar decomposition can be done by system 100 for other RDBMSs, taking into account the peculiarities of each such RDBMS.

It should be understood that in alternate embodiments of the invention, RDBMS persistent data sets could be supported using products other than the Oracle or IBM database products. When multiple APIs are available to a given RDBMS product, alternative embodiments might use an API other than the call level interface specified here.

It is to be understood that where system 100 currently uses operating system processes as its execution vehicle, modern operating systems provide other mechanisms, such as threads or lightweight processes, and an alternative embodiment of the invention may use these mechanisms in place of some or all of the processes described.

With regard to the description of analytical operators above, it is to be understood that system 100 currently implements a selected set of analytical techniques, but a broad collection of other analytic and decision tree techniques can be used in alternate embodiments of the invention.

In the discussion of APT_ParallelBuildModelOperator and API_ApplyModel Operator, it is to be understood that in alternate embodiments of the invention, any kind of analytic algorithms can be used to split the data in a manner analogous to that of the decision tree 817. Similarly, alternate embodiments of the invention may use analytic algorithms different form neural networks as the netlets 822.

What we claim is:

1. A method of parallel programming including the steps of:

storing a plurality of modular parallelizable operators in computer readable memory, each of which defines;
operation programming for performing an operation; and
one or more communication ports, each of which is either an input port for providing the operation programming a data stream of one or more records, or an output port for receiving a data stream of one or more records from the operation programming, and
an indication for each of the operator's input ports, if any, of a partitioning method to be applied to the data stream supplied to the input port;
specifying a specific data flow graph without use of a data base language, said graph including:
a specific set of one or more of said operators;
one or more specific data objects, each of which is capable of supplying or receiving a data stream of one or more records;
a data link associated with each of one or more of communication ports of the operators in said graph, each of which defines a communication path for the communication of a data stream of records between its associated communications port and either a specific data object or the specific communication port of another specific operator in said graph;
automatically parallelizing the execution of a data flow graph equivalent to said specified graph, said parallelizing step including:
automatically parallelizing the execution of one or more individual operators in said equivalent graph by causing a separate instance of each such operator, including its associated operation programming, to be run on each of multiple processors, with each instance of a given operator having a corresponding input and output port for each input and output port of the given operator; and automatically partitioning the data stream supplied to the corresponding inputs of the instances of a given operator as a function of the partitioning method indication for the given operator's corresponding input.

2. A publicly available computer system providing an environment for parallel programming including:

a plurality of modular parallelizable operators stored in a computer readable memory, each of which defines:

operation programming for performing an operation;

one or more communication ports, each of which is either an input port including means for providing the operation programming a data stream of records, or an output port including means for receiving a data stream of records from the operation programming, and an indication for each of the operator's input ports, if any, of a partitioning method to be applied to the data stream supplied to the input port;

a publicly defined interface for enabling users to define a data flow graph, including means for enabling the users to give:

instructions to select a specific one of said operators for inclusion in said graph instructions to select a specific data object, which is capable of supplying or receiving a data stream of one or more records, for inclusion in said graph, and instructions to associate a data link with a specific communication port of an operator in the graph, which data link defines a path for the communication of a data stream of one or more records between its associated communications port and either a specific data object or the specific communication port of another specific operator in said graph;

means for automatically parallelizing the execution of a data flow graph equivalent to that defined by the users, said graph parallelizing means including:

means for automatically parallelizing the execution of individual operators selected by said instructions for inclusion in the graph by causing a separate instance of each such operator, including its associated operation programming, to be run on each of multiple processors, with each instance of a given operator having a corresponding input and output port for each input and output port of the given operator; and means for automatically partitioning the data stream supplied to the corresponding inputs of the instances of a given operator as a function of the partitioning method indication for the given operator's corresponding input.

3. A computer system as in claim 2, wherein each of said modular parallelizable operators is defined by an object-oriented operator class definition stored in said memory, and further including:

means for enabling users to derive new operator classes from a publicly defined operator base class stored in said memory; said means including means for enabling users to specify new operation programming for each such new derived operator class;

wherein said means for enabling users to selectively identify operators for inclusion in the graph enables the users to selectively identify operator classes, including one or more of said new operator classes, and to cause instances of the identified operator classes to be included in the graph, and wherein said means for automatically parallelizing the execution of individual operators automatically parallelizes instances of said operator classes, including instances of said new operator classes.

4. A computer system as in claim 3, wherein:

the means for enabling users to derive new operator classes includes means for enabling users to define the operating programming of a new derived class as a subroutine written in a general purpose computer language under an operating system, and the publicly defined base class, publicly defined interface, and means for parallelizing place no other restrictions on what a subroutine can be other than that it be able to run on the computer resources available on each individual processor which the graph parallelizing means causes it to run on.

5. A computer system as in claim 3, wherein the operator base class includes members enabling users to define the names and data types of variables used by the operation programming of a user derived operator class, and wherein the computer system further includes:

an adapter programming structure capable of being connected in a data flow graph between a given communication port of an operator and the data object or other communication port to which said given communication port is connected, and capable of converting the name or type of one or more named fields in the records of the data stream connected to said given communication port;

means for enabling users to create an instance of said adapter structure and to specify the one or more named fields to be converted by the adapter structure and how the name or type of each of those named fields is to be converted; and means for enabling users to selectively connect a particular instance of an adapter structure in a particular place in a data flow graph between a given communication port and either the data object or other communication port to which the given communication port is connected.

6. A publicly available computer system as in claim 4, wherein:

the publicly defined interface enables users to individually select the one or more operators, zero or more data objects, and zero or more data links of a complete specific data flow graph directly by use of said instructions; and the graph parallelizing means includes means for parallelizing a graph equivalent to a specific graph whose operators, data objects, and data links have been defined by such instructions.

7. A publicly available computer system as in claim 6, wherein said user given instructions to associate a data link with a specific communication port include user given instructions to explicitly represent a data link and explicitly define what operator or data object such a data link is connected to.

8. A publicly available computer system as in claim 2, wherein the plurality of modular operators include a one or more publicly available modular operators, each of which includes an indication of one or more processor attributes; and the means for automatically parallelizing the execution of individual operators includes means for responding to the inclusion of one or more processor attributes in a given operator included in a graph by determining what processors a given operator will be run on as a function of whether or not said processors contain one or more corresponding processor attributes.

9. A publicly available computer system as in claim 2, wherein the system includes means for indicating for each of one or more of said processors, attributes of that processor, and a preference indication, indicating of which of one or more of said processors having a given set of attributes should be given preference in running an operator which has an indication requesting a given processor attribute; and the means for automatically parallelizing the execution of individual operators includes means for responding to said preference indication in determining which operators are run on which of a plurality of processors.

10. A computer system comprising:

a plurality of modular parallelizable operators stored in a computer readable memory, each of which defines:

operation programming for performing an operation;

one or more communication ports, each of which is either an input port including means for providing the operation programming a data stream, or an output port including means for receiving a data stream from the operation programming, and an indication for each of the operator's input ports, if any, of a partitioning method to be applied to the data stream supplied to the input port;

means for enabling a user to define a specific data flow graph including at least two of said operators, said means including:

means for enabling the user to explicitly instruct said system to individually select each one or more of said operators in said graph;

means for enabling the user to explicitly instruct said system to individually select each of one or more data objects for inclusion in said graph, each of which is capable of supplying or receiving a data stream;

means for enabling a user to explicitly instruct said system to individually connect a specific data link between a given communication port in said graph and either a specific communication port of another operator in said graph selected by the user in said instruction or a specific user selected data object selected by the user in said instruction;

means for automatically parallelizing the execution of a data flow graph equivalent to that defined by the user, said graph parallelizing means including:

means for automatically parallelizing the execution of individual operators selected by the user for inclusion in the graph by causing a separate instance of each such operator, including its associated operation programming, to be run on each of multiple processors, with each instance of a given operator having a corresponding input and output port for each input and output port of the given operator; and means for automatically partitioning the data stream supplied to the corresponding inputs of the instances of a given operator as a function of the partitioning method indication for the given operator's corresponding input.

11. A computer system as in claim 10, wherein said means for enabling a user to define a specific data flow graph enables a user to define such a graph as if each operator and data link were to be executed on a single processor.

12. A computer system as in claim 10, further including:

one or more modular non-parallelizable operators stored in said memory, each of which defines:

operation programming for performing an operation; and one or more communication ports, each of which is either an input port including means for providing the operation programming a data stream, or an output port including means for receiving a data stream from the operation programming;

and wherein:

the parallelizable and non-parallelizable operators each contain an indication of whether they are parallelizable or not;

the means for enabling a user to define a data flow graph enables a user to define such a graph without the need to treat parallelizable and non-parallelizable operators differently;

the means for automatically parallelizing the execution of individual operators in said graph includes means for automatically parallelizing operators which have an indication that they are parallelizable;

the graph parallelizing means includes means for causing a single instance of operators having an indication that they are non-parallelized to be run on one processor; and the means for automatically partitioning, includes means for partitioning the data stream supplied to the corresponding inputs of the instances of a given operator as a function of the number of processors on which instances of the operator are being run.

13. A computer system as in claim 12, wherein said means for enabling a user to define a data flow graph, including said means for enabling the user to explicitly instruct the system include a computer program written in a general purpose programming language.

14. A computer system as in claim 13, wherein the program includes:

one or more instructions for defining said given data flow graph and an graph execution instruction for indicating that said graph parallelizing means should cause parallel execution of the graph to take place when execution of the program advances to said graph execution instruction.

15. A computer system as in claim 14, wherein the program defines a plurality of said data flow graphs a corresponding plurality of said graph execution instructions.

16. A computer system as in claim 10, wherein each of said modular parallelizable operators is represented by an object-oriented operator class definition stored in said memory and further including:

means for enabling a user to derive a new operator class from an operator class definition previously stored in said memory; said class deriving means including means for enabling the user to specify new operation programming for the derived new operator class;

wherein said means for enabling the user to instruct the system to select an operator for inclusion in the graph enables the user to instruct the system to select an operator class, including said new operator class, and to cause an instance of the selected class to be included in the graph, and wherein said graph parallelizing means automatically parallelizes instances of said operator classes, including instances of said new operator class.

17. A computer system as in claim 16, wherein said class deriving means includes means for enabling the user to select which partitioning method is indicated by the partitioning method indication of the new operator class.

18. A computer system as in claim 17, wherein:
the means for enabling the user to select the partitioning method indication includes means for enabling the user to program a new partitioning method and have the new operator class's partitioning method identify the new partitioning method, and
the means for automatically partitioning includes means for using the new partitioning method identified by a new operator class's partitioning method indication to partition data supplied to the inputs of instances of said new operator class.

19. A computer system as in claim 18, wherein said class deriving means includes means for enabling the user to specify the number of input and output ports the new operator class has.

20. A computer system as in claim 10, wherein:
at least one of said operator class definitions stored in memory is of a program-execution operator base class having:
operation programming for issuing a command to execute an instance of a separate computer program, and
means for communicating through said program-execution operator's communication port between said instance of a separate program and a data stream indicated by said communication port's associated data link; and
the means for enabling a user to derive a new operator class from an operator class definition previously stored in said memory includes means enabling a user to derive, from said program execution operator base class, a new program-execution operator for executing instances of a separate computer program selected by the user; and
the means for automatically parallelizing the execution of individual operators includes means for automatically running parallel instances of said new program-execution operator derived by said user, with each parallel instance of said new operator executing a different instance of said separate program.

21. A computer system as in claim 10, wherein:
at least one of said operator class definitions stored in memory is of a composite operator base class which has:
means for connecting to a data flow sub-graph including which can include one or more others of said parallelizable operators and one or more data links connecting an output port and an input port of different operators in the sub-graph; and
one or more external communication ports, either an input or output port, for linking to data links external to said composite operator, each of which external ports includes associated means for connecting a data stream connected to said external port to a communication port of one of the operators of said sub-graph; and
the means for enabling a user to derive a new operator class from an operator class definition previously stored in said memory includes means enabling a user to define a new sub-graph and to derive, from said composite operator base class, a new composite operator connected to that subgraph;
the means for automatically parallelizing the execution of individual operators includes means for automatically parallelizing execution of a composite operator by automatically parallelizing execution of each parallelizable operator in said composite operator's subgraph.

22. A computer system as in claim 21, further including means for checking the specific graph defined by the user for one or more indications that the graph parallelizing means may not be able to successfully parallelize the execution of a graph equivalent to said specific graph and, for producing an action as a function of whether or not such indications of possible difficulties are detected.

23. A computer system as in claim 22, wherein:
the operation programming of each of individual operators is programmed to operate on one or more fields in records communicated through one or more given communication port of said operator;
each of said given communication ports has an associated interface schema for specifying the name and data types of said one or more fields upon which said operation programming operates; and
said means for checking includes means for checking whether the data types of fields specified in a schema associated with a communication port of an operator in said graph are likely to be matched by fields having corresponding name and data type in the records associated with the port's corresponding data link in said graph.

24. A computer system as in claim 23, wherein
the means for enabling the user to define a specific data flow graph includes means for enabling users to associate one or more field adapters with the schema of a given communication port for converting the name or type of a given named field in a record being passed between the data stream and the communication port to a different name or type; and
the means for checking whether the data type of fields specified in a schema are likely to be matched takes into account the conversions performed by said one or more field adapters.

25. A process of executing a computer program comprising performing the following steps during the execution of said program:
storing each of a plurality of modular parallelizable operators, each of which defines:
operation programming for performing an operation; and
one or more communication ports, each of which is either an input port for providing the operation programming a data stream, or an output port for receiving a data stream from the operation programming, and
an indication for each of the operator's input ports, if any, of a partitioning method to be applied to the data stream supplied to the input port;
storing a specific data flow graph which has been defined prior to the execution of said program, said graph including:
individual identification of each of two or more of said operators which have been selected for inclusion in said graph; and
definition of each of a plurality of data links each associated with an individual communication port of an operator in said graph, each of which data link definitions identifies a specific communication port of a specific operator at one end and, at the other end, identifies either a specific communication port of another specific operator or a data object, each of which is capable of supplying or receiving a data stream to or from said data link;
automatically parallelizing the execution of a data flow graph equivalent to the stored pre-defined graph, said graph parallelizing step including:

automatically parallelizing the execution of individual operators in said equivalent graph by causing a separate instance of each such operator, including its associated operation programming, to be run on each of multiple processors, with each instance of a given operator having a corresponding input and output port for each input and output port of the given operator; and automatically partitioning the data stream supplied to the corresponding inputs of the instances of a given operator as a function of the partitioning method indication for the given operator's corresponding input.

26. A process as in claim 25, wherein the program is a compiled program and said step of storing a specific graph includes storing said graph in compiled computer programming code which is part of said computer program.

27. A process as in claim 25, wherein said parallelization step is performed by code contained in a library which has been linked into said compiled program.

28. A process as in claim 27, wherein said program has been compiled from a general purpose computer source code language by a sequential compiler.

29. A process as in claim 28, wherein said compiled program includes:

instructions for defining each of a plurality of said graphs; and instructions located at different points in said program indicating that when program execution advances to each such point said graph parallelizing step should cause parallel execution of one of said graphs associated such point.

30. A computer system comprising:

a plurality of modular parallelizable operators stored in a computer readable memory, each of which defines:
  operation programming for performing an operation; and
  one or more communication ports, each of which is either an input port including means for providing the operation programming a data stream of records, or an output port including means for receiving a data stream of records from the operation programming, and
  an indication for each of the operator's input ports, if any, of a partitioning method to be applied to the data stream supplied to the input port;

means for defining a specific data flow graph including:
  one or more of said operators
  a data link associated with the communication ports of the operators in said graph, each of which indicates a data stream of one or more records from the output port of one operator to the input port of another, from a data-supplying object to the input port of an operator, or from the output port of an operator to a data-receiving object;

means for automatically parallelizing the execution of a data flow graph equivalent to said specific graph, said graph parallelizing means including:
  means for automatically parallelizing the execution of individual operators in said equivalent graph by causing a separate instance of each such operator, including its associated operation programming, to be run on each of multiple processors, with each instance of a given operator having a corresponding input and output port for each input and output port of said given operator; and means for automatically partitioning the data stream supplied to the corresponding inputs of the instances of a given operator as a function of the partitioning method indication for the given operator's corresponding input, and means for checking the specific graph or equivalent graph for one or more indications that the graph parallelizing means may not be able to successfully parallelize the execution of the specific graph and, for producing an action as a function of whether or not such indications of possible difficulties are detected.

31. A computer system as in claim 30, wherein said action produced by in response to indications of possible difficulties includes preventing said means for automatically parallelizing the execution of a data flow graph from causing the parallel execution of a graph.

32. A computer system as in claim 31, wherein said action produced in response to indications of possible difficulties includes providing a warning to a user of the system informing him of the problem.

33. A computer system as in claim 30, wherein said means for checking includes means for checking whether the specific graph includes a combination of operators and data links which defines a possible circular flow of records.

34. A computer system as in claim 30, wherein said means for checking includes means for checking whether the specific graph includes a combination of operators and data links which would allow records leaving two separate output ports of a first operator to reach two separate input ports of a second operator.

35. A computer system as in claim 30, wherein:

the operation programming of each of individual operators is programmed to communication with one or more fields in records communicated through a given communication port of said operator;

the given communication port has an associated interface schema for specifying the data types of said one or more fields; and the means for checking includes means for checking whether the data types of fields specified in a schema associated with a communication port of an operator in said graph are likely to be matched by fields having corresponding data types in the records associated with the port's corresponding data link in said graph.

36. A computer system as in claim 35, wherein said means for checking whether schema fields are matched includes means for comparing the schemas of individual pairs of communication ports which are connected by a data link in said graph.

37. A computer system as in claim 35, wherein the schemas define the name as well as the data type of individual fields wherein the computer system includes:

means for selecting an individual field from among one or more fields in a record supplied to an input port as corresponding to a given field in the input port's schema as a function of whether the record field has a name and data type corresponding to the given schema field.

38. A computer system as in claim 30, wherein said means for defining a specific data flow graph includes means for associating field adapters with the schema of a given input port for automatically converting the name or type of a field having a first name in a records supplied to the given input port to a different name or type before the record field is supplied to said means for selecting.

39. A computer system as in claim 38, further including:

means for converting certain individual data types into certain other corresponding data types; and wherein said means for checking whether schema fields are matched includes means for considering the data type of a schema field to be matched by the data type of a record field if said means for converting can convert the record field's type into the schema field's type.

40. A computer as in claim 39, wherein at least one of said operators includes both an input port and an output port, and the input port includes an interface schema which includes means for explicitly specifying that a set of fields of records supplied to the input port is to be transferred to records output by the operator's output port without alteration.

41. A computer system comprising:
means defining a data flow graph, including:
one or more of operators each defining operation programming for performing an operation; and
one or more communication ports, each of which is either an input port including means for providing the operation programming a data stream, or an output port including means for receiving a data stream from the operation programming, and
a data link associated with each of individual communication ports, each of which indicates a data stream from the output port of one operator to the input port of another, from a data-supplying object to the input of an operator, or from the output of an operator to a data-receiving object;
wherein at least one of the operators is a program-execution operator having:
operation programming for issuing a command to execute an instance of a separate computer program, and
means for communicating through said program-execution operator's communication port between the instance of the separate program and a data stream indicated by said communication port's associated data link; and
means for automatically parallelizing the execution of the data flow graph, said graph parallelizing means including:
means for automatically parallelizing the execution of the graph by causing a separate instance of each of one or more operators in the graph, including said program-execution operator, to be run on each of multiple processors, with each instance of a given operator separately executing its operation programming and with each such instance of a given operator having a corresponding input or output port for each input or output port of the given operator; and
means for automatically partitioning the data stream indicated by the data link corresponding to each input of the instances of a given operator between the inputs of the individual instances of the given operator.

42. A computer system as in claim 41, wherein:
the program-executing operator has at least one input port and has information on how the data stream supplied to the input port is to be partitioned between multiple instances of the program-execution operator;
the data flow graph has a data link connected to the input of the program-execution operator; and
the means for automatically partitioning includes means for partitioning the data stream indicated by the data link connected to the program-execution operator between the inputs of the individual instances of the program-execution operator.

43. A computer system as in claim 41, wherein
the computer system includes an object oriented programming environment;
each of the operators is an instance of an operator class;
the computer system includes a base class from which one of said program-execution operators can be derived, which base class includes one or more methods:
for calling an instance of a specified separate program;
for receiving a data stream from a first external object and supplying it to the instance of the separate program; and
for receiving a data stream from the instance of the separate program and supplying it to a second external object.

44. A computer system including:
a plurality of modular parallelizable operators stored in a computer readable memory, each of which defines:
operation programming for performing an operation; and
one or more communication ports, each of which is either an input port including means for providing the operation programming a data stream, or an output port including means for receiving a data stream from the operation programming, and
an indication for each of the operator's input ports, if any, of a partitioning method to be applied to the data stream supplied to the input port;
means for defining a data flow graph including:
one or more of said operators for inclusion in said graph, and
a data link associated with the communication ports of the operators in said graph, each of which indicates a data stream from the output port of one operator to the input port of another, from a data-supplying object to the input of an operator, or from the output of an operator to a data-receiving object;
means for automatically parallelizing the execution of a data flow graph equivalent to that defined by the user, said graph parallelizing means including:
means for automatically parallelizing the execution of individual operators selected by the user for inclusion in the graph by causing a separate instance of each such operator, including its associated operation programming, to be run on each of multiple processors, with each instance of a given operator having a corresponding input and output port for each input and output port of the given operator; and
means for automatically partitioning the data stream supplied to the corresponding inputs of the instances of a given operator as a function of the given operator's partitioning indication for the corresponding input, wherein at least one of said modular parallelizable operators is a composite operator which defines:
a data flow sub-graph including:
two or more others of said operators;
one or more data links each connecting an output port and an input port of different operators in the sub-graph; and
one or more external communication ports, either an input or output port, for linking to data links external to said composite operator, each of which external ports includes associated means for connecting a data stream connected to said external port to a communication port of one of
  the operators of said sub-graph;
said means for automatically parallelizing the execution
  of individual operators includes means for automatically parallelizing each parallelizable operator in said
  subgraph; and
said means for automatically partitioning includes means
  for partitioning the data stream supplied to corresponding inputs of the instances of each given parallelized
  operator of the sub-graph as a function of the given
  operator's partitioning method indication for the corresponding input.
45. A computer system comprising:
a plurality of modular parallelizable operators stored in a
  computer readable memory, each of which defines:
  operation programming for performing an operation;
    and
  one or more communication ports, each of which is
    either an input port including means for providing
    the operation programming a data stream of one or
    more records, or an output port including means for
    receiving a data stream of one or more records from
    the operation programming, and
  an indication for each of the operator's input ports, if
    any, of a partitioning method to be applied to the data
    stream supplied to the input port;
means for defining a data flow graph including:
  one or more of said operators
  a data link associated with the communication ports of
    the operators in said graph, each of which indicates
    a data stream of one or more records from the output
    port of one operator to the input port of another, from
    a data-supplying object to the input of an operator, or
    from the output of an operator to a data-receiving
    object;
means for automatically parallelizing the execution of a
  data flow graph equivalent to that accessed, said graph
  parallelizing means including:
  means for automatically parallelizing the execution of
    individual operators in said equivalent graph by
    causing a separate instance of each such operator,
    including its associated operation programming, to
    be run on each of multiple processors, with each
    instance of a given operator having a corresponding
    input and output port for each input and output port
    of the given operator; and
  means for automatically partitioning the data stream
    supplied to the corresponding inputs of the instances
    of a given operator as a function of the partitioning
    method indication for the given operator's corresponding input,
  wherein at least one of the parallelizable operators is an
    analytical apply operator having:
    an input port;
    modeling values which have been trained from the
      values of multiple different fields in each of a plurality of records; and
    operation programming for performing an operation
      based on the values of multiple different fields in an
      individual record supplied to it as a function of said
      modeling values.
46. A computer system as in claim 45, wherein the
operation programming of said analytical operator includes
programming for classifying individual records supplied to
it as a function said modeling values and of the values of
multiple different fields of in each such respective individual
record.

47. A computer system as in claim 45, wherein the
operation programming of said analytical operator includes
programming for estimating the value of one or more fields
of individual records supplied to it as a function said
modeling values and of the value of multiple other fields of
in each such respective individual record.
48. A computer system as in claim 47, wherein the
modeling values are weights of a neural network, each of
which has been trained from the values of multiple different
fields in each of a plurality of records.
49. A computer system as in claim 48, wherein the
modeling values are those of a decision tree which has been
trained from the values of multiple different fields in each of
a plurality of records.
50. A computer system comprising:
a plurality of modular operators stored in a computer
  readable memory, each of which defines:
  operation programming for performing an operation;
    and
  one or more communication ports, each of which is
    either an input port including means for providing
    the operation programming a data stream of one or
    more records, or an output port including means for
    receiving a data stream of one or more records from
    the operation programming, and
  an indication for each of the operator's input ports, if
    any, of a partitioning method to be applied to the data
    stream supplied to the input port;
  an indication for each operator of whether or not it is
    intended to be parallelizable;
means for defining a data flow graph including:
  one or more of said operators
  a data link associated with the communication ports of
    the operators in said graph, each of which indicates
    a data stream of one or more records from the output
    port of one operator to the input port of another, from
    a data-supplying object to the input of an operator, or
    from the output of an operator to a data-receiving
    object;
means for automatically parallelizing the execution of a
  data flow graph equivalent to that accessed, said graph
  parallelizing means including:
  means for automatically parallelizing the execution of
    individual operators in said equivalent graph which
    have an indication that they are intended to be
    parallelizable by causing a separate instance of each
    such operator, including its associated operation
    programming, to be run on each of multiple
    processors, with each instance of a given operator
    having a corresponding input and output port for
    each input and output port of the given operator and
    for causing a single instance of operators which an
    indication that they are not intended to be parallelized to be run on one processor; and
  means for automatically partitioning the data stream
    supplied to the corresponding inputs of the instances
    of a given operator as a function of the partitioning
    method
    indication for the given operator's corresponding input
    and the number of processors instances of the operator are being run on; and
  wherein at least one of the operator is an analytical build
    operator having an input port and operator programming for building an analytical model of records supplied to said input port, which model, when built,
    includes modeling values trained from the values of
    multiple fields in each of a plurality of records supplied
    to the operator's input port.

51. A computer system as in claim 50, wherein:
at least a portion of the operating programming of said analytical build operator can be executed in parallel; and
the means for automatically parallelizing the execution of a data flow graph includes means for causing parallel execution of said portion of the analytic build operator's programming which can be executed in parallel.

52. A computer system comprising:
a plurality of modular parallelizable operators stored in a computer readable memory, each of which defines:
operation programming for performing an operation; and
one or more communication ports, each of which is either an input port including means for providing the operation programming a data stream of one or more records, or an output port including means for receiving a data stream of one or more records from the operation programming, and
an indication for each of the operator's input ports, if any, of a partitioning method to be applied to the data stream supplied to the input port;
means for defining a data flow graph including:
one or more of said operators
a data link associated with the communication ports of the operators in said graph, each of which indicates a data stream of one or more records from the output port of one operator to the input port of another, from a data-supplying object to the input of an operator, or from the output of an operator to a data-receiving, object;
means for automatically parallelizing the execution of a data flow graph equivalent to that accessed, said graph parallelizing means including:
means for automatically parallelizing the execution of individual operators in said equivalent graph by causing a separate instance of each such operator, including its associated operation programming, to he run on each of multiple processors, with each instance of a given operator having a corresponding input and output port for each input and output port of the given operator; and
means for automatically partitioning the data stream supplied to the corresponding inputs of the instances of a given operator as a function of the partitioning method indication for the given operator's corresponding input, and
wherein at least one parallelizable operators includes an operator which includes operation programming for performing I/O with a persistent data object other than through a communication port of said operator.

53. A computer system as in claim 52, wherein said operation programming for performing i/o with a persistent data object includes programming for writing information to a persistent data storage object.

54. A computer system as in claim 52, wherein said operation programming for performing i/o with a persistent data object includes programming for reading information from a persistent data storage object.

55. A computer system comprising:
a plurality of modular parallelizable operators stored in a computer readable memory, each of which defines:
operation programming for performing an operation; and
one or more communication ports, each of which is either an input port including means for providing the operation programming a data stream of one or more records, or an output port including means for receiving a data stream of one or more records from the operation programming, and
an indication for each of the operator's input ports, if any, of a partitioning method to be applied to the data stream supplied to the input port;
means for defining a data flow graph including:
one or more of said operators
a data link associated with the communication ports of the operators in said graph, each of which indicates a data stream of one or more records from the output port of one operator to the input port of another, from a data-supplying object to the input of an operator, or from the output of an operator to a data-receiving object;
means for automatically parallelizing the execution of a data flow graph equivalent to that accessed, said graph parallelizing means including:
means for automatically parallelizing the execution of individual operators in said equivalent graph by causing a separate instance of each such operator, including its associated operation programming, to be run on each of multiple processors under a given operating system, with each instance of a given operator having a corresponding input and output port for each input and output port of the given operator; and
means for automatically partitioning the data stream supplied to the corresponding inputs of the instances of a given operator as a function of the partitioning method indication for the given operator's corresponding input,
wherein at least one of said parallelizable operators includes operation programming for performing I/O with inter-process communication mechanisms provided by said given operating system, so that parallel instances of said operator perform such I/O in parallel.

56. A computer system comprising:
a plurality of modular parallelizable operators stored in a computer readable memory, each of which defines:
operation programming for performing an operation; and
one or more communication ports, each of which is either an input port including means for providing the operation programming a data stream of one or more records, or an output port including means for receiving a data stream of one or more records from the operation programming, and
an indication for each of the operator's input ports, if any, of a partitioning method to be applied to the data stream supplied to the input port;
means for defining a data flow graph including:
one or more of said operators
a data link associated with the communication ports of the operators in said graph, each of which indicates a data stream of one or more records from the output port of one operator to the input port of another, from a data-supplying object to the input of an operator, or from the output of an operator to a data-receiving object;
means for automatically parallelizing the execution of a data flow graph equivalent to that accessed, said graph parallelizing means including:
means for automatically parallelizing the execution of individual operators in said equivalent graph by causing a separate instance of each such operator, including its associated operation programming, to be run on each of multiple processors under a given operating system, with each instance of a given operator having a corresponding input and output port for each input and output port of the given operator; and means for automatically partitioning the data stream supplied to the corresponding inputs of the instances of a given operator as a function of the partitioning method indication for the given operator's corresponding input, wherein at least one of said parallelizable operators includes operation programming for performing i/o with a user console, so that when parallelized each instance of said operator will separately communicate with a user console.

57. A computer system comprising:

a plurality of modular parallelizable operators stored in a computer readable memory, each of which defines:
  operation programming for performing an operation; and
  one or more communication ports, each of which is either an input port including means for providing the operation programming a data stream of one or more records, or an output port including means for receiving a data stream of one or more records from the operation programming, and
  an indication for each of the operator's input ports, if any, of a partitioning method to be applied to the data stream supplied to the input port;

means for defining a data flow graph including:
  one or more of said operators
  a data link associated with the communication ports of the operators in said graph, each of which indicates a data stream of one or more records from the output port of one operator to the input port of another, from a data-supplying object to the input of an operator, or from the output of an operator to a data-receiving object;

means for automatically parallelizing the execution of a data flow graph equivalent to that accessed, said graph parallelizing means including:
  means for automatically parallelizing the execution of individual operators in said equivalent graph by causing a separate instance of each such operator, including its associated operation programming, to be run on each of multiple processors, with each instance of a given operator having a corresponding input port and an output port for each input and output port of said given operator; and
  means for automatically partitioning the data stream supplied to the corresponding inputs of the instances of a given operator as a function of the partitioning method indication for the given operator's corresponding input, and wherein:
  at least a one of said parallelizable operators is a two-output operator which includes at least two output ports and operation programming for supplying a data stream of one or more records to each of said two output ports;
  the means for defining a graph includes means for defining a given graph including a down stream fork comprised of at least one of said two-output operators, in which each of said two-output operator's two output ports is connected by a data link to either the input port of another operator or a data-receiving object; and
  the means for parallelizing includes means for automatically parallelizing said graph including said downstream fork.

58. A computer system as in claim 57, wherein said means for defining a data flow graph includes means for enabling a user to define said graph by explicitly selecting individual operators and individual data objects, and by explicitly connecting individual communication ports of selected operators to selected data objects or communication ports of other selected operators.

59. A computer system as in claim 58, wherein said two-output operator has operation programming for supplying the same data stream of records to each of said operator's two output ports.

60. A computer system as in claim 59, wherein said means for defining said given graph includes means for defining said given graph in which the data link associated with a first of said two-output operator's output ports is connected to the input port of another parallelizable operator and the data link associated with a second of said two-output operator's output ports is connected to a persistent data storage object for receiving and storing a copy of the data stream output by said second output port.

61. A computer system comprising:

a plurality of modular parallelizable operators stored in a computer readable memory, each of which defines:
  operation programming for performing an operation; and
  one or more communication ports, each of which is either an input port including means for providing the operation programming a data stream of one or more records, or an output port including means for receiving a data stream of one or more records from the operation programming, and
  an indication for each of the operator's input ports, if any, of a partitioning method to be applied to the data stream supplied to the input port;

means for defining a data flow graph including:
  one or more of said operators
  a data link associated with the communication ports of the operators in said graph, each of which indicates a data stream of one or more records from the output port of one operator to the input port of another, from a data-supplying object to the input of an operator, or from the output of an operator to a data-receiving object;

means for automatically parallelizing the execution of a data flow graph equivalent to that accessed, said graph parallelizing means including:
  means for automatically parallelizing the execution of individual operators in said equivalent graph by causing a separate instance of each such operator, including its associated operation programming, to be run on each of multiple processors under a given operating system, with each instance of a given operator having a corresponding input and output port for each input and output port of the given operator; and
  means for automatically partitioning the data stream supplied to the corresponding inputs of the instances of a given operator as a function of the partitioning method indication for the given operator's corresponding input, wherein at least one of said parallelizable operators includes a field transfer definition, existing independently of any graph in which that operator occurs, specifying which fields of a records supplied to an input port of said operator will have their value copied un-changed to a corresponding record supplied by the operator to an output port of the operator.

62. A computer system comprising:

a plurality of modular parallelizable operators stored in a computer readable memory, each of which defines:
   an operator routine which can be called for performing an operation; and
   one or more communication ports, each of which is either an input port including means for providing the operator routine a data stream of one or more records, or an output port including means for receiving a data stream of one or more records from the operator routine, and means for defining a given data flow graph including:
   one or more of said operators;
   a data link associated with the communication ports of the operators in said graph, each of which indicates a data stream of one or more records from the output port of one operator to the input port of another, from a data-supplying object to the input of an operator, or from the output of an operator to a data-receiving object;

means for automatically simulating parallel execution of a data flow graph equivalent to said given graph, said graph simulation means including:
   means for automatically simulating parallel execution of each of one or more individual operators in said equivalent graph by making a plurality of separate sequential calls to the operator routine of each such operator, with each such call having an associated input and output port for each input and output port of the call's associated individual operator, enabling each such call to the operator routine to receive and output one or more data streams, respectively, if its associated operator has one or more input or output ports; and
   means for automatically buffering a data stream produced at an output port associated with an individual call to an operator routine where the operator routine's associated operator has an output port connected by a data link to the input port of another operator in said graph;
   means for automatically supplying a buffered data stream produced at the output port associated with one of multiple calls to the operator routine of a first operator to the input port associated with one of multiple calls to the operator routine of a second operator where the output port of the first operator is connected to the input port of the second operator in said equivalent graph.

63. A computer system as in claim 62, wherein:

each of said parallelizable operators defines an indication for each of the operator's input ports, if any, of a partitioning method to be applied to the data stream supplied to the input port; and the means for simulating parallel execution includes means for automatically partitioning the data stream produced at a given output port by each given call to an operator routine as a function of the partitioning method indication associated with the input port which is connected by a data link to the output port corresponding to the given output port in said equivalent graph; and the means for automatically buffering buffers each such partition produced by the given output port of the given call; and the means for automatically supplying a buffered data stream to an input port associated with a given call includes means for supplying different partitions of a data stream produced at the output port of a given call to the operator routine of said first operator to the input ports associated with different calls to said second operator and for supplying such partitions produced by each of a plurality of calls to the operator routine of said first operator to a given single input port associated with a given call to the operator routine of said second operator.

64. A computer system as in claim 62, further including:

means for automatically parallelizing the execution of said equivalent graph, said graph parallelizing means including:
   means for automatically parallelizing the execution of individual operators in said equivalent graph by causing a separate instance of each such operator, including its associated operator routine, to be run on each of multiple processors, with each instance of a given operator having a corresponding input and output port for each input and output port of the given operator; and
   means for automatically partitioning the data stream supplied to the corresponding inputs of the instances of a given operator as a function of the partitioning method indication for the given operator's corresponding input; and means for enabling a user to select between operation of said means for automatically simulating parallel execution and said means for automatically parallelizing execution.

65. A computer system as in claim 62, further including one or more modular non-parallelizable operators stored in said memory, each of which defines:

an operator routine for performing an operation; and one or more communication ports, each of which is either an input port including means for providing the operator routine a data stream, or an output port including means for receiving a data stream from the operator routine; and wherein:
   said parallelizable and non-parallelizable operators each contain an indication of whether they are parallelizable or not;
   said data flow graph can contain parallelizable and non-parallelizable operators with ports connected by said data links;
   said means for automatically simulating parallel execution includes means for sequentially making a plurality of separate sequential calls to the operator routines of the operators in said equivalent graph, and for making a plurality of such calls to the operator routine of each parallelizable operator in said graph and one call to the operator routine of each non-parallelizable operator in said graph, with each such call having an associated input and output port for each input and output port of the call's associated individual operator, enabling each such call to an operator routine to receive and output one or more data streams, respectively, if its associated operator has one or more input or output ports; and
   said means for buffering data streams and said means for supplying buffered data streams operate with the input and output ports of parallelizable and non-parallelizable operators.

66. A computer system as in claim 65, wherein said means for sequentially making a plurality of separate sequential calls include means for making such calls in data flow order as defined by said equivalent graph.

* * * * *